«12» United States Patent
Christensen et al.

«10» Patent No.: US 12,446,511 B2
«45» Date of Patent: Oct. 21, 2025

«54» MAIZE EVENT DP-056113-9 AND METHODS OF USE THEREOF

«71» Applicant: PIONEER HI-BRED INTERNATIONAL, INC., Johnston, IA (US)

«72» Inventors: Heather Marie Christensen, Ankeny, IA (US); Sarah Collinson, Woodland, CA (US); Tim Fox, Des Moines, IA (US); Kristin Haug Collet, Des Moines, IA (US); Mary Trimnell, West Des Moines, IA (US)

«73» Assignee: PIONEER HI-BRED INTERNATIONAL, INC., Johnston, IA (US)

«*» Notice: Subject to any disclaimer, the term of this patent is extended or adjusted under 35 U.S.C. 154(b) by 46 days.

«21» Appl. No.: 17/759,557

«22» PCT Filed: Jan. 26, 2021

«86» PCT No.: PCT/US2021/014989
§ 371 (c)(1),
(2) Date: Jul. 27, 2022

«87» PCT Pub. No.: WO2021/154674
PCT Pub. Date: Aug. 5, 2021

«65» Prior Publication Data
US 2023/0102527 A1     Mar. 30, 2023

Related U.S. Application Data

«60» Provisional application No. 63/011,615, filed on Apr. 17, 2020, provisional application No. 62/966,055, filed on Jan. 27, 2020.

«51» Int. Cl.
*A01H 6/46*     (2018.01)
*A01H 5/10*     (2018.01)

«52» U.S. Cl.
CPC ............ *A01H 6/4684* (2018.05); *A01H 5/10* (2013.01)

«58» Field of Classification Search
None
See application file for complete search history.

«56» References Cited

U.S. PATENT DOCUMENTS

| 2004/0241651 | A1* | 12/2004 | Olek ................ C07K 14/4703 435/6.16 |
| 2011/0177228 | A1  | 7/2011  | Alexandrov et al. |
| 2015/0082491 | A1  | 3/2015  | Albertsen et al. |
| 2019/0320607 | A1  | 10/2019 | Christensen et al. |

FOREIGN PATENT DOCUMENTS

WO    2013138289 A2    9/2013

OTHER PUBLICATIONS

GenBank Accession AC171158.3 "Atelerix albiventris clone LB4-335J5, Working Draft Sequence, 11 ordered pieces" dated Aug. 18, 2006 https://www.ncbi.nlm.nih.gov/nuccore/AC171158.3 (Year: 2006).*
GenBank Accession AF501836.1 "*Arabidopsis thaliana* small RNA 95 sequence" dated Jul. 25, 2002 https://www.ncbi.nlm.nih.gov/nuccore/AF501836.1 (Year: 2002).*
Genbank, AC171158.3, "Ateterix albiventris clone LB4-335J5", Aug. 18, 2006.
African Centre for Biodiversity "Objection against Pioneer Hi-Bred's Application for Field Trials of RNAi/gene silencing (DP-566113-9) GM maize", Mar. 25, 2021.
International Search Report and Written Opinion for International Application No. PCT/US21/14989, Mailed Jul. 9, 2021.
International Preliminary Report on Patentability for International Application No. PCT/US2021/014989, mailed Aug. 11, 2022, 10 Pages.

* cited by examiner

*Primary Examiner* — Amjad Abraham
*Assistant Examiner* — Kelsey L McWilliams

«57» ABSTRACT

The compositions and methods disclosed relate to DNA compositions, plant cells, seeds, plant parts that relate to maize maintainer plants. Also provided are assays for detecting the presence of the maize DP-056113-9 event based on the DNA sequence of the recombinant DNA construct inserted into the maize genome and the DNA sequences flanking the insertion site. Kits and conditions useful in conducting the assays are provided.

8 Claims, 9 Drawing Sheets

Specification includes a Sequence Listing.

MAIZE EVENT DP-056113-9 AND METHODS OF USE THEREOF

CROSS REFERENCE TO RELATED APPLICATIONS

This patent application is a 371 National Stage Entry of PCT patent application no. PCT/US2021/14989, filed on Jan. 26, 2021, which claims the benefit of and priority to U.S. Provisional Application No. 63/011,615, filed Apr. 17, 2020, and to U.S. Provisional Application No. 62/966,055, filed Jan. 27, 2020, the entire contents of each is herein incorporated by reference in its entirety.

FIELD

Embodiments disclosed herein relate to the field of plant molecular biology. Embodiments disclosed herein more specifically relate to maize plants, genes, cells, seeds, plant parts, DNA, processed plant product and constructs relating to maize event DP-056113-9 and methods and compositions thereof.

REFERENCE TO SEQUENCE LISTING SUBMITTED ELECTRONICALLY

The official copy of the sequence listing is submitted electronically via EFS-Web as an ASCII formatted sequence listing with a file named "8199WOPCT_ST25.txt" created on Jan. 18, 2021, and having a size of 96 kilobytes and is filed concurrently with the specification. The sequence listing contained in this ASCII formatted document is part of the specification and is herein incorporated by reference in its entirety.

BACKGROUND

Corn is an agriculturally important crop and serves as a food and feed source for animal, human, and industrial uses. Performance of a transgene in a plant including the agronomic parameters, may be impacted by a variety of factors such as the use of expression elements including promoter/regulatory elements, the genomic location of the insert sequence, copy number of the inserted transgene and genetic (germplasm) and environmental factors such as soil, temperature, light and moisture. The identification of constructs, testing of orthologs and transformation events that result in desirable characteristics of a maize plant for use in commercial production are the result of substantial and significant developmental efforts. Accordingly, it would be desirable to have maize plants that demonstrate such desirable characteristics.

SUMMARY

A corn seed includes Event DP-056113-9, wherein said seed comprises a DNA molecule selected from the group consisting of SEQ ID NOS: 7, 8, 9, 10, 11, 12, 13, 14 and a combination thereof, wherein a representative sample of corn event DP-056113-9 seed of has been deposited with American Type Culture Collection (ATCC) with Accession No. PTA-126589. In some embodiments, a corn plant, or part thereof, grown from the seed of PTA-126589 is described herein.

A corn plant, seed, cell or part thereof includes event DP-056113-9, wherein the event comprises the nucleotide sequence set forth in SEQ ID NO: 7 and SEQ ID NO: 8. In some embodiments, the event comprises the nucleotide sequence set forth in SEQ ID NO: 9 and SEQ ID NO: 10. In some embodiments, the event comprises the nucleotide sequence set forth in SEQ ID NO: 11 and SEQ ID NO: 12. In some embodiments, the event comprises the nucleotide sequence set forth in SEQ ID NO: 13 or SEQ ID NO: 14. In some embodiments, the plant part is selected from the group consisting of pericarp, pollen, ovule, flower, grain, shoot, root, stalk, silk, tassel, ear, and leaf tissue.

A corn plant, seed, cell or part thereof includes event DP-056113-9, wherein a representative sample of seed of said corn event has been deposited with American Type Culture Collection (ATCC) with Accession No. PTA-126589. In some embodiments, the plant part is selected from the group consisting of pericarp, pollen, ovule, flower, grain, shoot, root, stalk, silk, tassel, ear, and leaf tissue.

An isolated nucleic acid molecule includes a nucleotide sequence selected from the group consisting of SEQ ID NOS: 7, 8, 9, 10, 11, and 12 and in some embodiments, an amplicon includes the nucleic acid sequence selected from the group consisting of SEQ ID NOS: 7, 8, 9, 10, 11, 12 and full length complements thereof. In some embodiments, the amplicon is less than about 500 bp, 1 kb, 1.5 kb, 2.0 kb, 3.0 kb, 5.0 kb, and 10 kb.

A biological sample derived from corn event DP-056113-9 plant, tissue, or seed, wherein said sample comprises a nucleotide sequence which is or is complementary to a sequence selected from the group consisting of SEQ ID NOS: 7, 8, 9, 10, 11, and 12, wherein said nucleotide sequence is detectable in said sample using a nucleic acid amplification or nucleic acid hybridization method, wherein a representative sample of said corn event DP-056113-9 seed has been deposited with American Type Culture Collection (ATCC) with Accession No. PTA-126589. In some embodiments, the biological sample comprises plant, tissue, or portions of seed, pericarp of seed of transgenic corn event DP-056113-9. In some embodiments, the biological sample is a DNA sample extracted from the transgenic corn plant event DP-056113-9, and wherein said DNA sample comprises one or more of the nucleotide sequences selected from the group consisting of SEQ ID NOS: 7, 8, 9, 10, 11, 12, and the complements thereof.

An extract derived from corn event DP-056113-9 plant, tissue, or seed and comprising a nucleotide sequence which is or is complementary to a sequence selected from the group consisting of SEQ ID NOS: 7, 8, 9, 10, 11, and 12, wherein a representative sample of said corn event DP-056113-9 seed has been deposited with American Type Culture Collection (ATCC) with Accession No. PTA-126589. In some embodiments, said nucleotide sequence is detectable in said extract using a nucleic acid amplification or nucleic acid hybridization method.

In some embodiments, a method for increasing male-sterile inbred maize seed, the method comprising;
  a. self-pollinating DP-056113-9 maintainer plants;
  b. producing progeny seed homozygous for a mutation in an endogenous maize Ms44 gene that confers dominant male-sterility phenotype to plants obtained from the progeny seed;
  c. identifying those seeds homozygous for the endogenous Ms44 gene mutation conferring male-sterility and comprising the recombinant DNA construct in the DP-056113-9 maintainer line;
  d. identifying those seeds homozygous for the endogenous Ms44 gene mutation conferring male-sterility and lacking the recombinant DNA construct in DP-056113-9 as seed for a dominant male-sterile female inbred maize line; and e. pollinating the male-sterile female inbred maize line with pollen from the DP-056113-9 maintainer plants to increase the dominant male-sterile female inbred maize line by producing seed that are homozygous dominant Ms44 male-sterile and lack the recombinant DNA construct from the DP-056113-9 maintainer line.

The DP-056113-9 maintainer line has a recombinant DNA construct that includes three expression cassettes, where the cassettes in operable linkage includes a maize alpha amylase gene cassette, a DsRed2 gene cassette, and a zm-Ms44 artificial microRNA (amiRNA) cassette.

In some embodiments, a method of producing hybrid maize seed using a three way cross includes:

a. self-pollinating maize plants obtained from corn event DP-056113-9 to produce maize progeny seed, wherein the progeny seed comprises seed homozygous for an endogenous Ms44 gene mutation, wherein the mutation confers male-sterility to the plant, and the recombinant DNA construct of DP-056113-9, wherein the recombinant DNA construct comprises three expression cassettes, wherein the cassettes in operable linkage includes a maize alpha amylase gene cassette, a DsRed2 gene cassette, and a zm-Ms44 artificial microRNA (amiRNA) cassette, as seeds for the DP-056113-9 maintainer line, and seed homozygous for the endogenous Ms44 gene mutation conferring male-sterility and lacking the recombinant DNA construct of DP-056113-9 as seeds for a dominant male-sterile female inbred maize line;

b. separating from the progeny seed the seed homozygous for the endogenous Ms44 gene mutation that confers male-sterility to the plant and lacking the recombinant DNA construct of DP-056113-9;

c. growing the seed homozygous for the endogenous Ms44 gene mutation into maize male-sterile female plants;

d. pollinating the male-sterile female inbred maize line with pollen from a first male-fertile line to produce progeny seed heterozygous for the endogenous Ms44 gene mutation that confers male-sterility;

e. growing the progeny seed from step d into male-sterile female plants; and f. pollinating the male-sterile female plants from step e with pollen from a second inbred maize line to produce hybrid maize seed segregating 1:1 for the endogenous Ms44 gene mutation conferring male-sterility.

In some embodiments, a method of producing hybrid maize seed using a single cross includes:

a) self-pollinating maize plants obtained from corn event DP-056113-9 to producing maize progeny seed, wherein the progeny seed comprises seed homozygous for an endogenous Ms44 gene mutation, wherein the mutation confers male-sterility to the plant, and the recombinant DNA construct of DP-056113-9, wherein the recombinant DNA construct comprises three expression cassettes, wherein the cassettes in operable linkage includes a maize alpha amylase gene cassette, a DsRed2 gene cassette, and a zm-Ms44 artificial microRNA (amiRNA) cassette, as seeds for the DP-056113-9 maintainer line, and seed homozygous for the endogenous Ms44 gene mutation conferring male-sterility and lacking the recombinant DNA construct of DP-056113-9 as seeds for a dominant male-sterile female inbred maize line;

b) separating from the progeny seed the seed homozygous for the endogenous Ms44 gene mutation that confers male-sterility to the plant and lacking the recombinant DNA construct of DP-056113-9;

c) growing the seed homozygous for the endogenous Ms44 gene mutation into maize male-sterile female plants;

d) pollinating the male-sterile female inbred maize line with pollen from a male-fertile inbred maize line, wherein the male-fertile inbred maize line is the same as the male-sterile female plants but wild-type with respect to the Ms44 gene, to produce inbred maize seed heterozygous for the endogenous Ms44 gene mutation that confers male-sterility;

e) growing the inbred maize seed from step d into male-sterile female maize plants; and f) pollinating the male-sterile female maize plants from step (e) with pollen from a different inbred male-fertile maize line than in step (d) to produce hybrid maize seed segregating 1:1 for the endogenous Ms44 gene mutation conferring male-sterility.

In some embodiments, a method of producing hybrid maize seed includes:

a. pollinating a male-sterile female inbred maize line, wherein the male-sterile female inbred maize line is heterozygous for an endogenous Ms44 gene mutation conferring male-sterility to the inbred maize line, with pollen from a male-fertile maize line to produce progeny hybrid maize seed that segregates 1:1 for the endogenous Ms44 gene mutation conferring male-sterility; and b. growing the maize seed into hybrid plants, wherein the hybrid plants that segregate 1:1 male-sterile:male fertile.

Also included is a method of producing grain on hybrid maize plants, the method comprising a. growing hybrid maize plants from the hybrid seed produced by any of the methods described herein; and b. allowing open-pollination of the hybrid maize plants.

The method may also include harvesting grain from the hybrid maize plants.

Also provided herein is a breeding pair of maize plants comprising: a first maize plant and a second maize plant, wherein the first maize plant has a dominant male-sterility phenotype conferred by a mutation in a maize Ms44 gene, and wherein the second maize plant comprises a recombinant DNA construct comprising three expression cassettes, wherein the cassettes in operable linkage includes a maize alpha amylase gene cassette, a DsRed2 gene cassette, and a zm-Ms44 artificial microRNA (amiRNA) cassette. In some embodiments, the maize alpha amylase cassette comprises *Zea mays* Pg47 promoter, a polynucleotide sequence encoding *Zea mays* alpha amylase, a *Zea mays* In2-1 terminator; the DsRed2 cassette comprises a Barley Ltp2 promoter, a polynucleotide sequence encoding Discosoma sp. DsRed2, *Solanum tuberosum* pinII terminator; the zm-Ms44 amiRNA cassette comprises a *Zea mays* Ms44 promoter, a polynucleotide sequence for *Zea mays* Ms-44 ami-RNA, and a *Zea mays* Ms44 terminator. In some embodiments, the Ms44 amiRNA comprises a sequence that expresses a transcript forming an amiRNA that targets and silences the maize dominant male sterile zm-Ms44 gene.

In one embodiment, the zm-Ms44 amiRNA from the zm-Ms44 amiRNA cassette suppresses the expression of the dominant male-sterile Ms44 gene, thereby suppressing the dominant male-sterility phenotype conferred by a mutation in this Ms44 gene and restoring male-fertility to the maize plant. See herein, for example, Example 4; Table 1, SEQ ID NO:35.

In an embodiment, the endogenous non-mutated maize Ms44 gene includes a polynucleotide sequence of SEQ ID NO: 35. In an embodiment, a non-mutated maize Ms44 polypeptide includes a polypeptide with an amino acid sequence of SEQ ID NO: 36.

Any mutation in the endogenous maize Ms44 gene that confers dominant male-sterility to a maize plant may be used as a male-sterile female maize inbred in the methods described herein so long as its male-fertility may be restored by the DP-056113-maintainer. For example, in an embodiment, a mutation in the endogenous maize Ms44 gene encodes for a polypeptide of SEQ ID NO: 38, where the polypeptide has an amino acid change at amino acid 37, from Alanine to Threonine, as compared to position 37 in the Ms44 polypeptide of SEQ ID NO:36. The amino acid change to Threonine confers a dominant male-sterility phenotype in a maize plant. In an embodiment, the endogenous mutated maize Ms44 gene includes a polynucleotide sequence of SEQ ID NO:37 which has a single nucleotide substitution of guanine for adenine at position 186 as compared to SEQ ID NO:35, resulting in an amino acid change at amino acid 37, from Alanine to Threonine in the polypeptide (SEQ ID NO:38). This nucleotide change also created a BsmF1 restriction site in the mutant allele which is not found in the wildtype, which allows for distinguishing the two alleles by amplification of both Ms44 alleles by PCR and subsequent digestion of the products by BsmF1. In an embodiment, a mutation in the endogenous maize Ms44 gene encodes for a polypeptide of SEQ ID NO: 40, where the polypeptide has an amino acid change at amino acid 37, from Alanine to Valine, as compared to position 37 in the maize Ms44 polypeptide of SEQ ID NO:36. The amino acid change to Valine confers a dominant male-sterility phenotype in a maize plant. In an embodiment, the endogenous mutated maize Ms44 gene includes a polynucleotide sequence of SEQ ID NO:39 and encodes the polypeptide of SEQ ID NO:40. In an embodiment, the endogenous mutated maize Ms44 gene includes a polynucleotide sequence of SEQ ID NO:39 which has a single nucleotide substitution of cytosine for thymine at position 187 compared to SEQ ID NO:35, resulting in an amino acid change at amino acid 37, from Alanine to Valine in the polypeptide (SEQ ID NO:40). This nucleotide change may be detected using any suitable technique known to one skilled in the art, for example, using PCR, markers, and SNPs.

The DP-056113-9 maintainer has a mutation in the endogenous maize Ms44 gene that encodes for the polypeptide of SEQ ID NO: 38, where the polypeptide has an amino acid change at amino acid 37, from Alanine to Threonine, as compared to position 37 in the Ms44 polypeptide of SEQ ID NO:36. The amino acid change to Threonine confers a dominant male-sterility phenotype in a maize plant and the Ms44amiRNA in the recombinant DNA construct is capable of suppressing Ms44 and restoring male fertility to the maintainer plant. The DP-056113-9 maintainer has an endogenous mutated maize Ms44 gene that has the polynucleotide sequence of SEQ ID NO:37 which has a single nucleotide substitution of guanine for adenine at position 186 as compared to SEQ ID NO:35, resulting in an amino acid change at amino acid 37, from Alanine to Threonine in the polypeptide (SEQ ID NO:38). This nucleotide change also created a BsmF1 restriction site in the mutant allele which is not found in the wildtype, which allows for distinguishing the two alleles by amplification of both Ms44 alleles by PCR and subsequent digestion of the products by BsmF1.

Accordingly, one embodiment includes a recombinant DNA construct comprising three expression cassettes, wherein the cassettes in operable linkage includes a maize alpha amylase gene cassette, a DsRed2 gene cassette, and a zm-Ms44 artificial microRNA (amiRNA) cassette. In some embodiments, the maize alpha amylase cassette comprises *Zea mays* Pg47 promoter, a polynucleotide sequence encoding *Zea mays* alpha amylase, a *Zea mays* In2-1 terminator; the DsRed2 cassette comprises a Barley Ltp2 promoter, a polynucleotide sequence encoding Discosoma sp. DsRed2, *Solanum tuberosum* pinII terminator; the zm-Ms44 amiRNA cassette comprises a *Zea mays* Ms44 promoter, a polynucleotide sequence for *Zea mays* Ms-44 ami-RNA, and a *Zea mays* Ms44 terminator.

In some embodiments, a plant includes the recombinant DNA construct described herein and the plant is a corn plant. In some embodiments, the plant includes the sequence that is at least 95% identical to the polynucleotide sequence set forth in SEQ ID NO: 6.

A method of determining zygosity of DNA of a corn plant comprising corn event DP-056113-9 in a biological sample comprising:
a) contacting said sample with a first pair of DNA molecules and a second distinct pair of molecules such that: (i) when used in a nucleic acid amplification reaction comprising corn event DP-056113-9 DNA, produces a first amplicon that is diagnostic for corn event DP-056113-9, and (ii) when used in a nucleic acid amplification reaction comprising corn genomic DNA other than DP-056113-9 DNA, produces a second amplicon that is diagnostic for corn genomic DNA other than DP-056113-9 DNA;
b) performing a nucleic acid amplification reaction; and
c) detecting the first and second amplicons so produced, wherein detection of the presence of the first and second amplicons indicates that said sample is heterozygous for corn event DP-056113-9 DNA, wherein detection of the first amplicon indicates that said sample is homozygous for corn event DP-056113-9 DNA.

In some embodiments, the first pair of DNA molecules comprise primer pairs that amplify a DNA fragment that comprises a sequence selected from the group consisting of SEQ ID NOS: 7, 8, 9, 10, 11, 12 and reverse complements thereof. In some embodiments, the first and second pair of DNA molecules comprise a detectable label. In some embodiments, the detectable label is a fluorescent label. In some embodiments, the detectable label is covalently associated with one or more of the primer molecules. In some embodiments, the primer pair comprises SEQ ID NOS: 15 and 16.

A method of detecting the presence of a nucleic acid molecule that is unique to or discriminates event DP-056113-9 in a sample, the method includes:
a) contacting the sample with a pair of primers or a probe that, when used in a nucleic-acid amplification reaction with genomic DNA from event DP-056113-9 produces a nucleic acid molecule that is diagnostic for event DP-056113-9;
b) performing a nucleic acid amplification reaction, thereby producing the nucleic acid molecule that is diagnostic for event DP-056113-9; and
c) detecting the nucleic acid molecule that is diagnostic for event DP-056113-9.

In some embodiments, the nucleic acid molecule that is diagnostic for event DP-056113-9 is an amplicon produced by the nucleic acid amplification chain reaction. In some embodiments, the probe comprises a detectable label. In some embodiments, the detectable label is a fluorescent label. In some embodiments, the detectable label is covalently associated with the probe.

A plurality of polynucleotide primers comprising one or more polynucleotides comprising a length of at least 10 contiguous bases which target event DP-056113-9 DNA template in a sample to produce an amplicon diagnostic for event DP-056113-9 as a result of a polymerase chain reaction amplification method. In some embodiments, polynucleotide primers are characterized by:
 a) a first polynucleotide primer comprises at least 10 contiguous nucleotides of a nucleotide sequence selected from the group consisting of nucleotides 1-1440 OF SEQ ID NO: 31, nucleotides 1-1331 OF SEQ ID NO: 32, and the complements thereof; and
 b) a second polynucleotide primer comprises at least 10 contiguous nucleotides from nucleotides of SEQ ID NO: 6, or the complements thereof.

In some embodiments, the polynucleotide primers are characterized by:
 a) the first polynucleotide primer comprises a polynucleotide sequence comprising SEQ ID NO: 15 and the complements thereof; and
 b) the second polynucleotide primer comprises a polynucleotide sequence comprising SEQ ID NO: 16 and the complements thereof.

In some embodiments, said first primer and said second primer are at least 18 nucleotides.

A method of detecting the presence of DNA corresponding to the DP-056113-9 event in a sample, the method includes:
 a) contacting the sample comprising maize DNA with a polynucleotide probe that hybridizes under stringent hybridization conditions with DNA from maize event DP-056113-9 and does not hybridize under said stringent hybridization conditions with a non-DP-056113-9 maize plant DNA;
 b) subjecting the sample and probe to stringent hybridization conditions; and
 c) detecting hybridization of the probe to the DNA; wherein detection of hybridization indicates the presence of the DP-056113-9 event.

A kit for detecting a nucleic acid that is unique to event DP-056113-9 includes at least one nucleic acid molecule of sufficient length of contiguous polynucleotides to function as a primer or probe in a nucleic acid detection method, and which upon amplification of or hybridization to a target nucleic acid sequence in a sample followed by detection of the amplicon or hybridization to the target sequence, are diagnostic for the presence of the nucleic acid sequence unique to event DP-056113-9 in the sample. In some embodiments, the nucleic acid molecule comprises a nucleotide sequence from SEQ ID NO: 7 or 8.

In some embodiments, the nucleic acid molecule is a primer pair comprising a pair of polynucleotide sequences, each comprising at least 10 contiguous bases, wherein the primer pair amplifies a junction sequence of the event DP-056113-9, the junction comprising a polynucleotide sequence selected from the group consisting of SEQ ID NOS: 7, 8, 9, 10, 11, 12, 13, 14, 31, and 32 and complements thereof.

An antibody generated to target a polypeptide produced from the event DP-056113-9. In some embodiments, the antibody is a monoclonal antibody and comprises a detectable label.

According to some embodiments, compositions and methods are provided for identifying a novel corn plant designated DP-056113-9 (ATCC Deposit Number PTA-126589). The methods are based on primers or probes which specifically recognize the 5' and/or 3' flanking sequence of DP-056113-9. DNA molecules are provided that comprise primer sequences that when utilized in a PCR reaction will produce amplicons unique to the transgenic event DP-056113-9. In one embodiment, the corn plant and seed comprising these molecules is contemplated. Further, kits utilizing these primer sequences for the identification of the DP-056113-9 event are provided.

Additional embodiments relate to the specific flanking sequence of DP-056113-9 as described herein, which can be used to develop specific identification methods for DP-056113-9 in biological samples. More particularly, the disclosure relates to the 5' and/or 3' flanking regions of DP-056113-9, which can be used for the development of specific primers and probes. Further embodiments relate to identification methods for the presence of DP-056113-9 in biological samples based on the use of such specific primers or probes.

According to another embodiment, methods of detecting the presence of DNA corresponding to the corn event DP-056113-9 in a sample are provided. Such methods comprise: (a) contacting the sample comprising DNA with a DNA primer set, that when used in a nucleic acid amplification reaction with genomic DNA extracted from corn event DP-056113-9 produces an amplicon that is diagnostic for corn event DP-056113-9, respectively; (b) performing a nucleic acid amplification reaction, thereby producing the amplicon; and (c) detecting the amplicon. In some aspects, the primer set comprises SEQ ID NO: 15 and/or 16, a polynucleotide that detects at least one junction sequence selected from the group consisting of SEQ ID NOS: 7-12 and a combination thereof.

According to another embodiment, methods of detecting the presence of a DNA molecule corresponding to the DP-056113-9 event in a sample, such methods comprising: (a) contacting the sample comprising DNA extracted from a corn plant with a DNA probe molecule that hybridizes under stringent hybridization conditions with DNA extracted from corn event DP-056113-9 and does not hybridize under the stringent hybridization conditions with a control corn plant DNA; (b) subjecting the sample and probe to stringent hybridization conditions; and (c) detecting hybridization of the probe to the DNA. More specifically, a method for detecting the presence of a DNA molecule corresponding to the DP-056113-9 event in a sample, such methods, consisting of (a) contacting the sample comprising DNA extracted from a corn plant with a DNA probe molecule that consists of sequences that are unique to the event, e.g. junction sequences, wherein said DNA probe molecule hybridizes under stringent hybridization conditions with DNA extracted from corn event DP-056113-9 and does not hybridize under the stringent hybridization conditions with a control corn plant DNA; (b) subjecting the sample and probe to stringent hybridization conditions; and (c) detecting hybridization of the probe to the DNA.

In addition, a kit and methods for identifying event DP-056113-9 in a biological sample which detects a DP-056113-9 specific region are provided.

DNA molecules are provided that comprise at least one junction sequence of DP-056113-9; wherein a junction sequence spans the junction between heterologous DNA inserted into the genome and the DNA from the corn cell flanking the insertion site, i.e. flanking DNA, and is diagnostic for the DP-056113-9 event.

Another embodiment further relates to a DNA detection kit for identifying maize event DP-056113-9 in biological samples. The kit includes a first primer or probe which specifically amplifies or detects the 5' or 3' flanking region of DP-056113-9, and a second primer or probe which specifically amplifies or detects a sequence within the insert DNA of DP-056113-9, respectively, or within the flanking DNA, for use in a PCR identification protocol. A further embodiment relates to a kit for identifying event DP-056113-9 in biological samples, which kit comprises a specific probe having a sequence which corresponds or is complementary to, a sequence having between 80% and 100% sequence identity with a specific region of event DP-056113-9. The sequence of the probe corresponds to a specific region comprising part of the 5' or 3' flanking region of event DP-056113-9. In some embodiments, the first or second primer or an appropriate probe comprises SEQ ID NO: 15, 16, 17, 1, 2, or 3, and reverse complements thereof.

The methods and kits encompassed by the embodiments disclosed herein can be used for different purposes such as, but not limited to the following: to identify event DP-056113-9 in plants, plant material or in products such as, but not limited to, food or feed products (fresh or processed) comprising, or derived from plant material; additionally or alternatively, the methods and kits can be used to identify transgenic plant material for purposes of segregation between transgenic and non-transgenic material; additionally or alternatively, the methods and kits can be used to determine the quality of plant material comprising maize event DP-056113-9. The kits may also contain the reagents and materials necessary for the performance of the detection method.

A further embodiment relates to the DP-056113-9 maize plant or its parts, including, but not limited to, pollen, ovules, pericarp, vegetative cells, the nuclei of pollen cells, and the nuclei of egg cells of the corn plant DP-056113-9 and the progeny derived thereof. In another embodiment, specific amplicons produced from the maize plant and seed of DP-056113-9 are included.

DESCRIPTION OF THE DRAWINGS

FIG. 5A) SbS results aligned against the intended insertion (11,364 bp; FIG. 3). Coverage was obtained for the entire intended insertion, indicating efficient capture by the probe library of sequence from the PHP70533 plasmid added to maize genomic DNA.

FIG. 5B) SbS results aligned against the PHP70533 T-DNA originally transformed into maize (20,081 bp). Coverage was obtained across the full length of the T-DNA.

FIG. 5C) SbS results aligned against the plasmid PHP70533 sequence (29,511 bp). Coverage was obtained across the full length of the plasmid, again indicating successful capture of PHP70533 sequences by the SbS probe library.

FIG. 6, part A. A maize inbred line heterozygous for dominant male sterility Ms44 gene is transformed with a recombinant DNA construct comprising three cassettes: a maize alpha amylase gene cassette, a DsRed2 gene cassette, and a zm-Ms44 artificial microRNA (amiRNA) cassette to make the DP56113 SPTA maintainer (event DP56113-9). Expression of the cassettes in this recombinant DNA construct in the maize inbred line renders the plant male-fertile.

FIG. 6, part B. The male-fertile DP56113 SPTA maintainer (event DP56113-9) plants are self-pollinated to produce seed.

FIG. 6, part C and FIG. 6, part D. Seeds or progeny plants are phenotyped, for example, sorted by color, to identify those which are carrying or lacking the construct.

FIG. 6, part E. The Male-sterile Inbred Line A homozygous for the dominant male sterility Ms44 gene and lacking the recombinant DNA construct may be pollinated with a Male-fertile Inbred Line B to produce male-sterile single cross seed (Male-sterile Single Cross Line AB seed).

FIG. 6, part F. The dominant Ms44 male-sterile hybrid plants (Male-sterile Single Cross Line AB) are pollinated by a second male-fertile inbred (Male-fertile Inbred C) to produce hybrid seed (Three-way cross seed ABC).

FIG. 6, part G—Hybrid plants obtained from the Three-way cross seed ABC would segregate 1:1 for the presence of the Ms44 male sterile phenotype. 50% of the hybrid plants are expected to produce pollen and 50% of the hybrid plants are expected not to produce pollen.

FIG. 7, part A. A maize inbred line heterozygous for dominant male sterility Ms44 gene is transformed with a recombinant DNA construct comprising three cassettes: a maize alpha amylase gene cassette, a DsRed2 gene cassette, and a zm-Ms44 artificial microRNA (amiRNA) cassette to make the DP56113 SPTA maintainer (event DP56113-9). Expression of the cassettes in this recombinant DNA construct in the maize inbred line renders the plant male-fertile.

FIG. 7, part B. The male-fertile DP56113 SPTA maintainer (event DP56113-9) plants are self-pollinated to produce seed.

FIG. 7, part C and FIG. 7, part D. Seeds or progeny plants are phenotyped, for example, sorted by color, to identify those which are carrying or lacking the construct.

FIG. 7, part E. The Male-sterile Inbred Line A homozygous for the dominant male sterility Ms44 gene and lacking the recombinant DNA construct may be pollinated with a Male-fertile Inbred Line A that is the same as the Male-sterile Inbred Line A plants but wild-type with respect to Ms44 (no male-sterility conferring Ms44 mutation) to produce Male-sterile Inbred Line A seed.

FIG. 7, part F. The dominant Ms44 male-sterile inbred plants (Male-sterile Inbred Line A plants) are pollinated by a different male-fertile inbred (Male-fertile Inbred B) to produce hybrid seed (Single cross hybrid seed AB).

FIG. 7, part G—Hybrid plants obtained from the Single cross hybrid AB seed would segregate 1:1 for the presence of the Ms44 male sterile phenotype. ~50% of the hybrid plants are expected to produce pollen and ~50% of the hybrid plants are not expected to produce pollen.

BRIEF DESCRIPTION OF THE SEQUENCES

Figure 1:
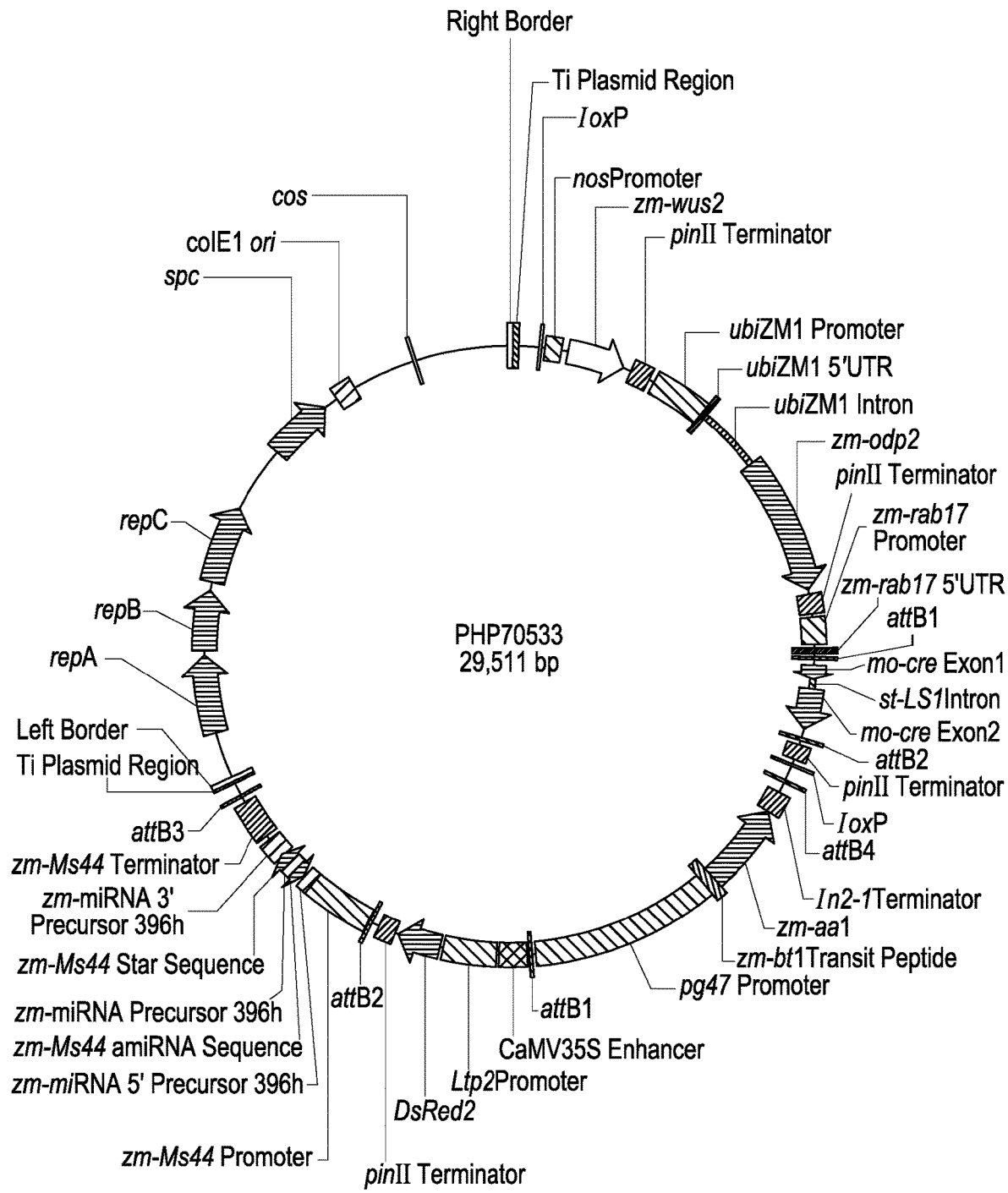
FIG. 1. shows a schematic diagram of plasmid PHP70533 with genetic elements indicated (SEQ ID NO: 1). Plasmid size is 29,511 bp.

The disclosure can be more fully understood from the following detailed description and the accompanying drawings and Sequence Listing that form a part of this application.

The sequence descriptions summarize the Sequence Listing attached hereto, which is hereby incorporated by reference. The Sequence Listing contains one letter codes for nucleotide sequence characters and the single and three letter codes for amino acids as defined in the IUPAC-IUB standards described in *Nucleic Acids Research* 13:3021-3030 (1985) and in the *Biochemical Journal* 219(2):345-373 (1984).

TABLE 1

| | Sequence Listing Description |
|---|---|
| SEQ ID NO: | Description |
| 1 | Maize Ms44 amiRNA forward primer |
| 2 | Maize Ms44 amiRNA reverse primer |
| 3 | Maize Ms44 amiRNA probe |
| 4 | Maize Ms44 amiRNA amplicon |
| 5 | T-DNA region of plasmid PHP70533 |
| 6 | Insert DNA |
| 7 | Event DP-056113-9 junction sequence 5' end (10 bp; 5 bp genomic + 5 bp insert) |
| 8 | Event DP-056113-9 junction sequence 3' end (10 bp; 5 bp insert + 5 bp genomic) |
| 9 | Event DP-056113-9 junction sequence 5' end (20 bp; 10 bp genomic + 10 bp insert) |
| 10 | Event DP-056113-9 junction sequence 3' end (20 bp; 10 bp insert + 10 bp genomic) |
| 11 | Event DP-056113-9 junction sequence 5' end (30 bp; 15 bp genomic + 15 bp insert) |
| 12 | Event DP-056113-9 junction sequence 3' end (30 bp; 15 bp insert + 15 bp genomic) |
| 13 | Event DP-056113-9 insert DNA + genomic flanking sequence (10 bp on both 5' and 3' ends) |
| 14 | Event DP-056113-9 insert DNA + genomic flanking sequence (20 bp on both 5' and 3' ends) |
| 15 | DP-056113-9 forward primer |
| 16 | DP-056113-9 reverse primer |
| 17 | DP-056113-9 probe |
| 18 | Alpha amylase forward primer |
| 19 | Alpha amylase reverse primer |
| 20 | Alpha amylase probe |
| 21 | DS-Red2 forward primer |
| 22 | DS-Red2 reverse primer |
| 23 | DS-Red2 probe |
| 24 | DP-056113-9 assay amplicon sequence |

TABLE 1-continued

| | Sequence Listing Description |
|---|---|
| SEQ ID NO: | Description |
| 25 | Alpha amylase assay amplicon sequence |
| 26 | DS-Red2 assay amplicon sequence |
| 27 | hmg-A forward primer |
| 28 | hmg-A reverse primer |
| 29 | hmg-A probe |
| 30 | hmg-A assay amplicon sequence |
| 31 | 5' end 1430 bp genomic + 10 bp insert DNA - junction-sequence |
| 32 | 3' end 10 bp insert + 1321 bp genomic DNA - junction-sequence |
| 33 | Deduced Amino Acid Sequence of the maize alpha amylase protein |
| 34 | Deduced Amino Acid Sequence of the DS-Red2 Protein |
| 35 | Non-mutated maize Ms44 gene |
| 36 | Non-mutated maize Ms44 polypeptide |
| 37 | Maize Ms44 gene with a mutation (change from g to a at position 186) |
| 38 | Mutated maize Ms44 polypeptide with change from A to T at position 37 |
| 39 | Maize Ms44 gene with a mutation (change from c to t at position 187) |
| 40 | Mutated maize Ms44 polypeptide with change from A to V at position 37 |

DETAILED DESCRIPTION

As used herein the singular forms "a", "and", and "the" include plural referents unless the context clearly dictates otherwise. Thus, for example, reference to "a cell" includes a plurality of such cells and reference to "the protein" includes reference to one or more proteins and equivalents thereof, and so forth. All technical and scientific terms used herein have the same meaning as commonly understood to one of ordinary skill in the art to which this disclosure belongs unless clearly indicated otherwise.

Compositions of this disclosure include a representative sample of seeds which was deposited as Patent Deposit No. PTA-126589 and plants, plant cells, and seed derived therefrom. Applicant(s) have made a deposit of at least 600 seeds of maize event DP-056113-9 (Patent Deposit No. PTA-126589) with the American Type Culture Collection (ATCC), Manassas, VA 20110-2209 USA, on Dec. 26, 2019. These deposits will be maintained under the terms of the Budapest Treaty on the International Recognition of the Deposit of Microorganisms for the Purposes of Patent Procedure. The seeds deposited with the ATCC on Dec. 26, 2019 were taken from a representative sample deposit maintained by Pioneer Hi-Bred International, Inc., 7250 NW $62^{nd}$ Avenue, Johnston, Iowa 50131-1000. Access to this ATCC deposit will be available during the pendency of the application to the Commissioner of Patents and Trademarks and persons determined by the Commissioner to be entitled thereto upon request, in accordance with applicable laws and regulations. Upon issuance of a patent, this deposit of seed of maize Event DP-056113-9 is intended to meet all the necessary requirements of 37 C.F.R. §§ 1.801-1.809, and will be maintained in the ATCC depository, for a period of 30 years, or 5 years after the most recent request, or for the enforceable life of the patent, whichever is longer, and will be replaced if it becomes nonviable during that period. Unauthorized seed multiplication prohibited. The seed may be regulated under one or more applicable National, State or other local regulations and ordinances imposed by one or more competent governmental agencies.

As used herein, the term "corn" means *Zea mays* or maize and includes all plant varieties that can be bred with corn, including wild maize species.

As used herein, the terms "insect resistant" and "impacting insect pests" refers to effecting changes in insect feeding, growth, and/or behavior at any stage of development, including but not limited to: killing the insect; retarding growth; reducing reproductive capability; inhibiting feeding; and the like.

As used herein, the terms "pesticidal activity" and "insecticidal activity" are used synonymously to refer to activity of an organism or a substance (such as, for example, a protein) that can be measured by numerous parameters including, but not limited to, pest mortality, pest weight loss, pest attraction, pest repellency, and other behavioral and physical changes of a pest after feeding on and/or exposure to the organism or substance for an appropriate length of time. For example, "pesticidal proteins" are proteins that display pesticidal activity by themselves or in combination with other proteins.

As used herein, "insert DNA" refers to the heterologous DNA within the expression cassettes used to transform the plant material while "flanking DNA" can exist of either genomic DNA naturally present in an organism such as a plant, or foreign (heterologous) DNA introduced via the transformation process which is extraneous to the original insert DNA molecule, e.g. fragments associated with the transformation event. A "flanking region" or "flanking sequence" as used herein refers to a sequence of at least 20 bp, for some embodiments, at least 50 bp, and up to 5000 bp, which is located either immediately upstream of and contiguous with or immediately downstream of and contiguous with the original foreign insert DNA molecule. Transformation procedures of the foreign DNA will result in transformants containing different flanking regions characteristic and unique for each transformant. When recombinant DNA is introduced into a plant through traditional crossing, its flanking regions will generally not be changed. Transformants will also contain unique junctions between a piece of heterologous insert DNA and genomic DNA, or two (2) pieces of genomic DNA, or two (2) pieces of heterologous DNA. A "junction" is a point where two (2) specific DNA fragments join. For example, a junction exists where insert DNA joins flanking DNA. A junction point also exists in a transformed organism where two (2) DNA fragments join together in a manner that is modified from that found in the native organism. "Junction DNA" refers to DNA that comprises a junction point. Two junction sequences set forth in this disclosure are the junction point between the maize genomic DNA and the 5' and the 3' end of the insert as set forth in one of SEQ ID NOS: 7-14, 31-32 (see Table 1 and the accompanying sequence listing for description).

In an embodiment, the junction sequences of Event DP-056113-9, for example, one or more SEQ ID NOS: 7-14, 31-32 may include polymorphisms (e.g., SNPs) or mutations that may occur spontaneously in the endogenous genomic region of the junction sequence. These may include insertion, deletion or substitution of one or more nucleotides in the junction sequence. Polynucleotide sequences that are at least 90%, 91%, 92%, 93%, 94%, 95%, 96%, 97%, 98%, and 99% to one or more of the junction sequences represented by one of SEQ ID NOS: 7-14, 31-32 are disclosed herein.

As used herein, "heterologous" in reference to a nucleic acid sequence is a nucleic acid sequence that originates from a foreign species, or, if from the same species, is substantially modified from its native form in composition and/or genomic locus by deliberate human intervention. For example, a promoter operably linked to a heterologous nucleotide sequence can be from a species different from that from which the nucleotide sequence was derived, or, if from the same species, the promoter is not naturally found operably linked to the nucleotide sequence. A heterologous protein may originate from a foreign species, or, if from the same species, is substantially modified from its original form by deliberate human intervention.

The term "regulatory element" refers to a nucleic acid molecule having gene regulatory activity, i.e. one that has the ability to affect the transcriptional and/or translational expression pattern of an operably linked transcribable polynucleotide. The term "gene regulatory activity" thus refers to the ability to affect the expression of an operably linked transcribable polynucleotide molecule by affecting the transcription and/or translation of that operably linked transcribable polynucleotide molecule. Gene regulatory activity may be positive and/or negative and the effect may be characterized by its temporal, spatial, developmental, tissue, environmental, physiological, pathological, cell cycle, and/or chemically responsive qualities as well as by quantitative or qualitative indications.

"Promoter" refers to a nucleotide sequence capable of controlling the expression of a coding sequence or functional RNA. In general, a coding sequence is located 3' to a promoter sequence. The promoter sequence comprises proximal and more distal upstream elements, the latter elements are often referred to as enhancers. Accordingly, an "enhancer" is a nucleotide sequence that can stimulate promoter activity and may be an innate element of the promoter or a heterologous element inserted to enhance the level or tissue-specificity of a promoter. Promoters may be derived in their entirety from a native gene, or be composed of different elements derived from different promoters found in nature, or even comprise synthetic nucleotide segments. It is understood by those skilled in the art that different regulatory elements may direct the expression of a gene in different tissues or cell types, or at different stages of development, or in response to different environmental conditions. Promoters that cause a nucleic acid fragment to be expressed in most cell types at most times are commonly referred to as "constitutive promoters".

The "translation leader sequence" refers to a nucleotide sequence located between the promoter sequence of a gene and the coding sequence. The translation leader sequence is present in the fully processed mRNA upstream of the translation start sequence. The translation leader sequence may affect numerous parameters including, processing of the primary transcript to mRNA, mRNA stability and/or translation efficiency. Examples of translation leader sequences have been described (Turner and Foster (1995) *Mol. Biotechnol.* 3:225-236).

The "3' non-coding sequences" refer to nucleotide sequences located downstream of a coding sequence and include polyadenylation recognition sequences and other sequences encoding regulatory signals capable of affecting mRNA processing or gene expression. The polyadenylation signal is usually characterized by affecting the addition of polyadenylic acid tracts to the 3' end of the mRNA precursor. The use of different 3' non-coding sequences is exemplified by Ingelbrecht et al. (1989) *Plant Cell* 1:671-680.

A DNA construct is an assembly of DNA molecules linked together that provide one or more expression cassettes. The DNA construct may be a plasmid that is enabled for self-replication in a bacterial cell and contains various endonuclease enzyme restriction sites that are useful for introducing DNA molecules that provide functional genetic elements, i.e., promoters, introns, leaders, coding sequences, 3' termination regions, among others; or a DNA construct may be a linear assembly of DNA molecules, such as an expression cassette. The expression cassette contained within a DNA construct comprises the necessary genetic elements to provide transcription of a messenger RNA. The expression cassette can be designed to express in prokaryote cells or eukaryotic cells. Expression cassettes of the embodiments are designed to express in plant cells.

"Recombinant" refers to an artificial combination of two otherwise separated segments of sequence, e.g., by chemical synthesis or by the manipulation of isolated segments of nucleic acids by genetic engineering techniques. "Recombinant" also includes reference to a cell or vector, that has been modified by the introduction of a heterologous nucleic acid or a cell derived from a cell so modified, but does not encompass the alteration of the cell or vector by naturally occurring events (e.g., spontaneous mutation, natural transformation/transduction/transposition) such as those occurring without deliberate human intervention. "Recombinant DNA construct" refers to a combination of nucleic acid fragments that are not normally found together in nature. Accordingly, a recombinant DNA construct may comprise regulatory sequences and coding sequences that are derived from different sources, or regulatory sequences and coding sequences derived from the same source, but arranged in a manner different than that normally found in nature.

The DNA molecules disclosed herein are provided in expression cassettes for expression in an organism of interest. The cassette will include 5' and 3' regulatory sequences operably linked to a coding sequence. "Operably linked" means that the nucleic acid sequences being linked are contiguous and, where necessary to join two protein coding regions, contiguous and in the same reading frame. Operably linked is intended to indicate a functional linkage between a promoter and a second sequence, wherein the promoter sequence initiates and mediates transcription of the DNA sequence corresponding to the second sequence. The cassette may additionally contain at least one additional gene to be co-transformed into the organism. Alternatively, the additional gene(s) can be provided on multiple expression cassettes or multiple DNA constructs.

The expression cassette may include in the 5' to 3' direction of transcription: a transcriptional and translational initiation region, a coding region, and a transcriptional and translational termination region functional in the organism serving as a host. The transcriptional initiation region (i.e., the promoter) may be native or analogous, or foreign or heterologous to the host organism. Additionally, the promoter may be the natural sequence or alternatively a synthetic sequence. The expression cassettes may additionally contain 5' leader sequences in the expression cassette construct. Such leader sequences can act to enhance translation.

A transgenic "event" is produced by transformation of plant cells with a heterologous DNA construct(s), including a nucleic acid expression cassette that comprises a transgene of interest, the regeneration of a population of plants resulting from the insertion of the transgene into the genome of the plant, and selection of a particular plant characterized by insertion into a particular genome location. An event is characterized phenotypically by the expression of the transgene. At the genetic level, an event is part of the genetic makeup of a plant. The term "event" also refers to progeny produced by a sexual outcross between the transformant and another variety that include the heterologous DNA. Even after repeated back-crossing to a recurrent parent, the inserted DNA and flanking DNA from the transformed parent is present in the progeny of the cross at the same chromosomal location. The term "event" also refers to DNA from the original transformant comprising the inserted DNA and flanking sequence immediately adjacent to the inserted DNA that would be expected to be transferred to a progeny that receives inserted DNA including the transgene of interest as the result of a sexual cross of one parental line that includes the inserted DNA (e.g., the original transformant and progeny resulting from selfing) and a parental line that does not contain the inserted DNA.

As used herein, the term "plant" includes reference to whole plants, parts of plants, plant organs (e.g., leaves, stems, roots, etc.), seeds, plant cells, and progeny of same. In some embodiments, parts of transgenic plants comprise, for example, plant cells, protoplasts, tissues, callus, embryos as well as flowers, stems, fruits, leaves, and roots originating in transgenic plants or their progeny previously transformed with a DNA molecule disclosed herein, and therefore consisting at least in part of transgenic cells.

As used herein, the term "plant cell" includes, without limitation, seeds, suspension cultures, embryos, meristematic regions, callus tissue, leaves, roots, shoots, gametophytes, sporophytes, pollen, and microspores. The class of plants that may be used is generally as broad as the class of higher plants amenable to transformation techniques, including both monocotyledonous and dicotyledonous plants.

"Transformation" refers to the transfer of a nucleic acid fragment into the genome of a host organism, resulting in genetically stable inheritance. Host organisms containing the transformed nucleic acid fragments are referred to as "transgenic" organisms. Examples of methods of plant transformation include *Agrobacterium*-mediated transformation (De Blaere et al. (1987) *Meth. Enzymol.* 143:277) and particle-accelerated or "gene gun" transformation technology (Klein et al. (1987) *Nature* (London) 327:70-73; U.S. Pat. No. 4,945,050, incorporated herein by reference). Additional transformation methods are disclosed below.

As used herein, the term "progeny" denotes the offspring of any generation of a parent plant which comprises corn event DP-056113-9.

Isolated polynucleotides disclosed herein may be incorporated into recombinant constructs, typically DNA constructs, which are capable of introduction into and replication in a host cell. Such a construct may be a vector that includes a replication system and sequences that are capable of transcription and translation of a polypeptide-encoding sequence in a given host cell. A number of vectors suitable for stable transfection of plant cells or for the establishment of transgenic plants have been described in, e.g., Pouwels et al., (1985; Supp. 1987) *Cloning Vectors: A Laboratory Manual*, Weissbach and Weissbach (1989) *Methods for Plant Molecular Biology*, (Academic Press, New York); and Flevin et al., (1990) *Plant Molecular Biology Manual*, (Kluwer Academic Publishers). Typically, plant expression vectors include, for example, one or more cloned plant genes under the transcriptional control of 5' and 3' regulatory sequences and a dominant selectable marker. Such plant expression vectors also can contain a promoter regulatory region (e.g., a regulatory region controlling inducible or constitutive, environmentally- or developmentally-regulated, or cell- or tissue-specific expression), a transcription initiation start site, a ribosome binding site, an RNA processing signal, a transcription termination site, and/or a polyadenylation signal.

During the process of introducing an insert into the genome of plant cells, it is not uncommon for some deletions or other alterations of the insert and/or genomic flanking sequences to occur. Thus, the relevant segment of the plasmid sequence provided herein might comprise some minor variations. The same is true for the flanking sequences provided herein. Thus, a plant comprising a polynucleotide having some range of identity with the subject flanking and/or insert sequences is within the scope of the subject disclosure. Identity to the sequence of the present disclosure may be a polynucleotide sequence having at least 65% sequence identity, for some embodiments at least 70% sequence identity, for some embodiments at least 75% sequence identity, for some embodiments at least 80% identity, and for some embodiments at least 85% 86%, 87%, 88%, 89%, 90%, 91%, 92%, 93%, 94%, 95%, 96%, 97%, 98%, 99%, 99.5% sequence identity with a sequence exemplified or described herein. Hybridization and hybridization conditions as provided herein can also be used to define such plants and polynucleotide sequences of the subject disclosure. The sequence which comprises the flanking sequences plus the full insert sequence can be confirmed with reference to the deposited seed.

A "probe" is an isolated nucleic acid to which is attached a conventional detectable label or reporter molecule, e.g., a radioactive isotope, ligand, chemiluminescent agent, or enzyme. Such a probe is complementary to a strand of a target nucleic acid, for example, to a strand of isolated DNA from corn event DP-056113-9 whether from a corn plant or from a sample that includes DNA from the event. Probes may include not only deoxyribonucleic or ribonucleic acids but also polyamides and other probe materials that bind specifically to a target DNA sequence and can be used to detect the presence of that target DNA sequence. An exemplary probe to detect the event DP-056113-9 comprises SEQ ID NO: 17. In addition, any labeled probe that binds to or exhibits high-stringency complementarity to one or more of the junction sequences, e.g., 5' and/or 3' junctions of the insert DNA adjacent to the genomic DNA of maize event DP-056113-9 comprising a sequence that is at least 99% identical to SEQ ID NOS: 7-14, 31, and 32 are suitable for use as probes.

"Primers" are isolated nucleic acids that anneal to a complementary target DNA strand by nucleic acid hybridization to form a hybrid between the primer and the target DNA strand, then extended along the target DNA strand by a polymerase, e.g., a DNA polymerase. Primer pairs refer to their use for amplification of a target nucleic acid sequence, e.g., by PCR or other conventional nucleic-acid amplification methods. "PCR" or "polymerase chain reaction" is a technique used for the amplification of specific DNA segments (see, U.S. Pat. Nos. 4,683,195 and 4,800,159; herein incorporated by reference).

Probes and primers are of sufficient nucleotide length to bind to the target DNA sequence specifically in the hybridization conditions or reaction conditions determined by the operator. This length may be of any length that is of sufficient length to be useful in a detection method of choice. Generally, 11 nucleotides or more in length, 18 nucleotides or more, and 22 nucleotides or more, are used. Such probes and primers hybridize specifically to a target sequence under high stringency hybridization conditions. Probes and primers according to embodiments may have complete DNA sequence similarity of contiguous nucleotides with the target sequence, although probes differing from the target DNA sequence and that retain the ability to hybridize to target DNA sequences may be designed by conventional methods. Probes can be used as primers, but are generally designed to bind to the target DNA or RNA and are not used in an amplification process.

Specific primers may be used to amplify an integration fragment to produce an amplicon that can be used as a "specific probe" for identifying event DP-056113-9 in biological samples. When the probe is hybridized with the nucleic acids of a biological sample under conditions which allow for the binding of the probe to the sample, this binding can be detected and thus allow for an indication of the presence of event DP-056113-9 in the biological sample. Such identification of a bound probe has been described in the art. In an embodiment of the disclosure, the specific probe is a sequence which, under optimized conditions, hybridizes specifically to a region within the 5' or 3' flanking region of the event and also comprises a part of the foreign DNA contiguous therewith. The specific probe may comprise a sequence of at least 80%, between 80 and 85%, between 85 and 90%, between 90 and 95%, and between 95 and 100% identical (or complementary) to a specific region of the event.

Probes and primers (and amplicons) are generally 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, or 500 polynucleotides or more in length. Such probes and primers hybridize specifically to a target sequence under high stringency hybridization conditions. In some embodiments, probes and primers have complete sequence similarity with the target sequence, although probes differing from the target sequence and that retain the ability to hybridize to target sequences may be designed by conventional methods.

Methods for preparing and using probes and primers are described, for example, in Sambrook et al., *Molecular Cloning: A Laboratory Manual*, 2$^{nd}$ ed., vol. 1-3, Cold Spring Harbor Laboratory Press, Cold Spring Harbor, N.Y. 1989 (hereinafter, "Sambrook et al., 1989"); Ausubel et al. eds., *Current Protocols in Molecular Biology*, Greene Publishing and Wiley-Interscience, New York, 1995 (with periodic updates) (hereinafter, "Ausubel et al., 1995"); and Innis et al., *PCR Protocols: A Guide to Methods and Applications*, Academic Press: San Diego, 1990. PCR primer pairs can be derived from a known sequence, for example, by using computer programs intended for that purpose such as the PCR primer analysis tool in Vector NTI version 6 (Informax Inc., Bethesda MD); PrimerSelect (DNASTAR Inc., Madison, WI); and PRIMER (Version 0.5©, 1991, Whitehead Institute for Biomedical Research, Cambridge, Mass.). Additionally, the sequence can be visually scanned and primers manually identified using guidelines known to one of skill in the art.

A "kit" as used herein refers to a set of reagents for the purpose of performing the method embodiments of the disclosure, more particularly, the identification of event DP-056113-9 in biological samples. A kit of may be used, and its components can be specifically adjusted, for purposes of quality control (e.g. purity of seed lots), detection of event DP-056113-9 in plant material, or material comprising or derived from plant material, such as but not limited to food or feed products. "Plant material" as used herein refers to material which is obtained or derived from a plant.

Primers and probes based on the flanking DNA and insert sequences disclosed herein can be used to confirm (and, if necessary, to correct) the disclosed sequences by conventional methods, e.g., by re-cloning and sequencing such sequences. The nucleic acid probes and primers hybridize under stringent conditions to a target DNA sequence. Any conventional nucleic acid hybridization or amplification method may be used to identify the presence of DNA from a transgenic event in a sample. Nucleic acid molecules or fragments thereof are capable of specifically hybridizing to other nucleic acid molecules under certain circumstances.

A nucleic acid molecule is said to be the "complement" of another nucleic acid molecule if they exhibit complete complementarity or minimal complementarity. As used herein, molecules are said to exhibit "complete complementarity" when every nucleotide of one of the molecules is complementary to a nucleotide of the other. Two molecules are said to be "minimally complementary" if they can hybridize to one another with sufficient stability to permit them to remain annealed to one another under at least conventional "low-stringency" conditions. Similarly, the molecules are said to be "complementary" if they can hybridize to one another with sufficient stability to permit them to remain annealed to one another under conventional "high-stringency" conditions. Conventional stringency conditions are described by Sambrook et al., 1989, and by Haymes et al., In: *Nucleic Acid Hybridization, a Practical Approach*, IRL Press, Washington, D.C. (1985), departures from complete complementarity are therefore permissible, as long as such departures do not completely preclude the capacity of the molecules to form a double-stranded structure. In order for a nucleic acid molecule to serve as a primer or probe it needs to be sufficiently complementary in sequence to be able to form a stable double-stranded structure under the particular solvent and salt concentrations employed.

In hybridization reactions, specificity is typically the function of post-hybridization washes, the relevant factors being the ionic strength and temperature of the final wash solution. The thermal melting point ($T_m$) is the temperature (under defined ionic strength and pH) at which 50% of a complementary target sequence hybridizes to a perfectly matched probe. For DNA-DNA hybrids, the $T_m$ can be approximated from the equation of Meinkoth and Wahl (1984) *Anal. Biochem.* 138:267-284: $T_m$=81.5° C.+16.6 (log M)+0.41 (% GC)−0.61 (% form)−500/L; where M is the molarity of monovalent cations, % GC is the percentage of guanosine and cytosine nucleotides in the DNA, % form is the percentage of formamide in the hybridization solution, and L is the length of the hybrid in base pairs. $T_m$ is reduced by about 1° C. for each 1% of mismatching; thus, $T_m$, hybridization, and/or wash conditions can be adjusted to hybridize to sequences of the desired identity. For example, if sequences with >90% identity are sought, the $T_m$ can be decreased 10° C. Generally, stringent conditions are selected to be about 5° C. lower than the $T_m$ for the specific sequence and its complement at a defined ionic strength and pH. However, severely stringent conditions can utilize a hybridization and/or wash at 1, 2, 3, or 4° C. lower than the $T_m$; moderately stringent conditions can utilize a hybridization and/or wash at 6, 7, 8, 9, or 10° C. lower than the $T_m$; low stringency conditions can utilize a hybridization and/or wash at 11, 12, 13, 14, 15, or 20° C. lower than the $T_m$.

Using the equation, hybridization and wash compositions, and desired $T_m$, those of ordinary skill will understand that variations in the stringency of hybridization and/or wash solutions are inherently described. If the desired degree of mismatching results in a $T_m$ of less than 45° C. (aqueous solution) or 32° C. (formamide solution), it is preferred to increase the SSC concentration so that a higher temperature can be used. An extensive guide to the hybridization of nucleic acids is found in Tijssen (1993) *Laboratory Techniques in Biochemistry and Molecular Biology—Hybridization with Nucleic Acid Probes*, Part I, Chapter 2 (Elsevier, New York); and Ausubel et al., eds. (1995) and Sambrook et al. (1989).

The principle of hybridization analysis is that a single-stranded DNA or RNA molecule of a known sequence (e.g., the probe) can base-pair to a second DNA or RNA molecule that contains a complementary sequence (the target), with the stability of the hybridization depending on the extent of base pairing that occurs under the conditions tested. Appropriate stringency conditions for DNA hybridization, include for example, 6× sodium chloride/sodium citrate (SSC) at about 45° C., followed by a wash of 2.0×SSC at 50° C., are known to those skilled in the art or can be found in Current Protocols in Molecular Biology, John Wiley & Sons, N.Y. (1989), 6.3.1-6.3.6. For example, the salt concentration in the wash step can be selected from a low stringency of about 2.0×SSC at 50° C. to a high stringency of about 0.2×SSC at 50° C. or up to 0.1×SSC or 0.2×SSC, at 55° C. or 65° C. In addition, the temperature in the wash step can be increased from low stringency conditions at room temperature, about 22° C., to high stringency conditions at about 65° C. Both temperature and salt may be varied, or either the temperature or the salt concentration may be held constant while the other variable (e.g., time) is changed. In one embodiment, a nucleic acid of the present disclosure will specifically hybridize to one or more of the nucleic acid molecules set forth in SEQ ID NOS: 6-14, or complements or fragments thereof under high stringency conditions. The hybridization of the probe to the target DNA molecule can be detected by methods known to those skilled in the art. These can include, but are not limited to, fluorescent tags, radioactive tags, antibody based tags, and chemiluminescent tags.

In some embodiments, a complementary sequence has the same length as the nucleic acid molecule to which it hybridizes. In some embodiments, the complementary sequence is 1, 2, 3, 4, 5, 6, 7, 8, 9, or 10 nucleotides longer or shorter than the nucleic acid molecule to which it hybridizes. In some embodiments, the complementary sequence is 1%, 2%, 3%, 4%, or 5% longer or shorter than the nucleic acid molecule to which it hybridizes. In some embodiments, a complementary sequence is complementary on a nucleotide-for-nucleotide basis, meaning that there are no mismatched nucleotides (each A pairs with a T and each G pairs with a C). In some embodiments, a complementary sequence comprises 1, 2, 3, 4, 5, 6, 7, 8, 9, 10 or less mismatches. In some embodiments, the complementary sequence comprises 1%, 2%, 3%, 4%, 5%, 6%, 7%, 8%, 9%, or 10% or less mismatches.

"Percent (%) sequence identity" with respect to a reference sequence (subject) is determined as the percentage of amino acid residues or nucleotides in a candidate sequence (query) that are identical with the respective amino acid residues or nucleotides in the reference sequence, after aligning the sequences and introducing gaps, if necessary, to achieve the maximum percent sequence identity, and not considering any amino acid conservative substitutions as part of the sequence identity. Alignment for purposes of determining percent sequence identity can be achieved in various ways that are within the skill in the art, for instance, using publicly available computer software such as BLAST, BLAST-2. Those skilled in the art can determine appropriate parameters for aligning sequences, including any algorithms needed to achieve maximal alignment over the full length of the sequences being compared. The percent identity between the two sequences is a function of the number of identical positions shared by the sequences (e.g., percent identity of query sequence=number of identical positions between query and subject sequences/total number of positions of query sequence×100). For example, Clustal W method of aligning multiple sequences is described in Thompson J, Higgins D and Gibson T (1994). Clustal W: improving the sensitivity of progressive multiple sequence alignment through sequence weighting." Nucleic Acids Research, Vol 22: pp. 4673-80. Another method is Clustal V, described in Higgins D G and Sharp P M (1989). "Fast and sensitive multiple sequence alignments on a microcomputer." CABIOS, Vol. 5, No. 2: pp. 151-153.

Regarding the amplification of a target nucleic acid sequence (e.g., by PCR) using a particular amplification primer pair, stringent conditions permit the primer pair to hybridize only to the target nucleic-acid sequence to which a primer having the corresponding wild-type sequence (or its complement) would bind to produce a unique amplification product, the amplicon, in a DNA thermal amplification reaction.

As used herein, "amplified DNA" or "amplicon" refers to nucleic acid generated as a result of the amplification of a target nucleic acid sequence that is part of a nucleic acid template. For example, in an embodiment, such amplified DNA or amplicons may contain a nucleic acid sequence that is specific to the Events disclosed herein, for example, DP-056113-9. DNA extracted from a plant tissue sample may be subjected to a nucleic acid amplification method using a DNA primer pair that includes a first primer derived from flanking sequence adjacent to the insertion site of inserted heterologous DNA, and a second primer derived from the inserted heterologous DNA to produce an amplicon that is diagnostic for the presence of the event DNA, e.g., DP-056113-9. Alternatively, the second primer may be derived from the flanking genomic sequence. The amplicon may be of any suitable length and has a nucleic acid sequence that is also diagnostic for the Event. Alternatively, primer pairs can be derived from flanking sequence on both sides of the inserted DNA so as to produce an amplicon that includes the entire insert nucleotide sequence as well as the sequence flanking the insert. A primer or a pair of primers derived from the flanking genomic sequence may be located at a distance from the inserted DNA sequence, this distance can range from one nucleotide base pair up to the limits of the amplification reaction, for example 10,000 or about 20,000 bp.

Nucleic acid amplification can be accomplished by any of the various nucleic acid amplification methods known in the art, including PCR. A variety of amplification methods are known in the art and are described, inter alia, in U.S. Pat. Nos. 4,683,195 and 4,683,202 and in Innis et al., (1990) supra. PCR amplification methods have been developed to amplify up to 22 Kb of genomic DNA and up to 42 Kb of bacteriophage DNA (Cheng et al., *Proc. Natl. Acad. Sci. USA* 91:5695-5699, 1994). These methods as well as other methods known in the art of DNA amplification may be used in the practice of the embodiments of the present disclosure. It is understood that a number of parameters in a specific PCR protocol may need to be adjusted to specific laboratory conditions and may be slightly modified and yet allow for the collection of similar results. These adjustments will be apparent to a person skilled in the art.

The amplicon produced by these methods may be detected by a plurality of techniques, including, but not limited to, Genetic Bit Analysis (Nikiforov, et al. *Nucleic Acid Res.* 22:4167-4175, 1994) where a DNA oligonucleotide is designed which overlaps both the adjacent flanking DNA sequence and the inserted DNA sequence. The oligonucleotide is immobilized in wells of a microwell plate. Following PCR of the region of interest (using one primer in the inserted sequence and one in the adjacent flanking sequence) a single-stranded PCR product can be hybridized to the immobilized oligonucleotide and serve as a template for a single base extension reaction using a DNA polymerase and labeled ddNTPs specific for the expected next base. Readout may be fluorescent or ELISA-based. A signal indicates presence of the insert/flanking sequence due to successful amplification, hybridization, and single base extension.

Another detection method is the pyrosequencing technique as described by Winge (2000) *Innov. Pharma. Tech.* 00:18-24. In this method an oligonucleotide is designed that overlaps the adjacent DNA and insert DNA junction. The oligonucleotide is hybridized to a single-stranded PCR product from the region of interest (one primer in the inserted sequence and one in the flanking sequence) and incubated in the presence of a DNA polymerase, ATP, sulfurylase, luciferase, apyrase, adenosine 5' phosphosulfate and luciferin. dNTPs are added individually and the incorporation results in a light signal which is measured. A light signal indicates the presence of the transgene insert/flanking sequence due to successful amplification, hybridization, and single or multi-base extension.

Fluorescence polarization as described by Chen et al., (1999) *Genome Res.* 9:492-498 is also a method that can be used to detect an amplicon. Using this method an oligonucleotide is designed which overlaps the flanking and inserted DNA junction. The oligonucleotide is hybridized to a single-stranded PCR product from the region of interest (one primer in the inserted DNA and one in the flanking DNA sequence) and incubated in the presence of a DNA polymerase and a fluorescent-labeled ddNTP. Single base extension results in incorporation of the ddNTP. Incorporation can be measured as a change in polarization using a fluorometer. A change in polarization indicates the presence of the transgene insert/flanking sequence due to successful amplification, hybridization, and single base extension.

TAQMAN® quantitative amplification reaction (qPCR) (PE Applied Biosystems, Foster City, Calif.) is a quantitative amplification reaction (qPCR) for detecting and quantifying the presence of a DNA sequence and is commercially available. Briefly, TaqMan probes are designed such that they anneal within a DNA region amplified by a specific set of primers and include a fluorophore (FRET) oligonucleotide probe that overlaps the flanking and insert DNA junction. The FRET probe and PCR primers (one primer in the insert DNA sequence and one in the flanking genomic sequence) are cycled in the presence of a thermostable polymerase and dNTPs. Hybridization of the FRET probe results in cleavage and release of the fluorescent moiety away from the quenching moiety on the FRET probe. A fluorescent signal indicates the presence and/or the amount of the flanking/transgene insert sequence due to successful amplification and hybridization.

Molecular beacons have been described for use in sequence detection as described in Tyangi et al. (1996) *Nature Biotech*. 14:303-308. Briefly, a FRET oligonucleotide probe is designed that overlaps the flanking and insert DNA junction. The unique structure of the FRET probe results in it containing secondary structure that keeps the fluorescent and quenching moieties in close proximity. The FRET probe and PCR primers (one primer in the insert DNA sequence and one in the flanking sequence) are cycled in the presence of a thermostable polymerase and dNTPs. Following successful PCR amplification, hybridization of the FRET probe to the target sequence results in the removal of the probe secondary structure and spatial separation of the fluorescent and quenching moieties. A fluorescent signal results. A fluorescent signal indicates the presence of the flanking/transgene insert sequence due to successful amplification and hybridization.

The term "allele" refers to an alternative form of a gene, whereby two genes can differ in DNA sequences. Such differences may result from at least one mutation (e.g., deletion, insertion, and/or substitution) in the nucleic acid sequence. Alleles may result in modified mRNAs or polypeptides whose structure or function may or may not be modified. Any given gene may have none, one, or many allelic forms. Each of these types of changes may occur alone, or in combination with the others, one or more times in a given sequence.

A hybridization reaction using a probe specific to a sequence found within the amplicon is yet another method used to detect the amplicon produced by a PCR reaction. The term "zygosity" generally refers to the similarity of alleles for a gene or trait in an organism (e.g., a plant). If both alleles are the same, the organism is homozygous for the allele. If the two alleles are different, the organism is heterozygous for the gene or trait. If one allele is not present, the organism is hemizygous. If both alleles are not present, the organism is nullizygous. For example, a plant is homozygous for the trait of interest if the insert DNA along with the junction sequence is present at the same location on each chromosome of a chromosome pair (both the alleles). For example, a maize plant having Event DP-056113-9 at the same location on both the copies of the chromosome. Similarly, a plant is considered heterozygous if the transgene insert along with the junction sequence (e.g., Event DP-056113-9) is present on only one of the chromosomes of a chromosome pair (only one allele). A wild-type plant is considered "null" when compared to the transgenic Event DNA.

The term "label" when used herein refers to a detectable compound or composition that is conjugated directly or indirectly to a probe to generate a "labeled" probe. The label may be detectable by itself (e.g. radioisotope labels or fluorescent labels) or, in the case of an enzymatic label, may catalyze chemical alteration of a substrate compound or composition that is detectable (e.g., avidin-biotin).

As used herein, a "line" is a group of plants that display little or no genetic variation between individuals for at least one trait. Such lines may be created by several generations of self-pollination and selection, or vegetative propagation from a single parent using tissue or cell culture techniques.

As used herein, the terms "cultivar" and "variety" are synonymous and refer to a line which is used for commercial production. "Stability" or "stable" means that with respect to the given component, the component is maintained from generation to generation and, for some embodiments, at least three generations at substantially the same level, e.g., for some embodiments ±15%, for some embodiments ±10%, most for some embodiments ±5%. The stability may be affected by temperature, location, stress and the time of planting.

"Agronomically elite" means that a line has desirable agronomic characteristics such as maturity, disease resistance, standability, ear height, plant height, and the like, in addition to yield increase due to the subject event(s).

In some embodiments the DP-056113-9 maize event may further comprise a stack of additional traits. Plants comprising stacks of polynucleotide sequences can be obtained by either or both of traditional breeding methods or through genetic engineering methods. These methods include, but are not limited to, breeding individual lines each comprising a polynucleotide of interest, transforming a transgenic plant comprising a gene disclosed herein with a subsequent gene and co-transformation of genes into a single plant cell. As used herein, the term "stacked" includes having the multiple traits present in the same plant (i.e., both traits are incorporated into the nuclear genome, one trait is incorporated into the nuclear genome and one trait is incorporated into the genome of a plastid or both traits are incorporated into the genome of a plastid). Additional traits can include for example, drought tolerance and other abiotic stress tolerance traits. Such traits can be introduced by breeding with maize plants containing other recombinant events or with maize plants containing native variations or genome edited variations.

In some embodiments, DP-056113-9 maize event can be stacked with one or more additional input traits (e.g., herbicide resistance, fungal resistance, virus resistance, stress tolerance, disease resistance, male sterility, stalk strength, and the like) or output traits (e.g., increased yield, modified starches, improved oil profile, balanced amino acids, high lysine or methionine, increased digestibility, improved fiber quality, drought resistance, and the like). In a further embodiment, the DP-056113-9 maize event may be combined with one or more additional Bt insecticidal toxins or other non-Bt insecticidal proteins.

In some embodiments, corn plants containing DP-056113-9 event can be crossed with corn plants containing other corn Events or combination thereof and the resulting properties of the progeny plants are evaluated. For example, corn plants containing DP-056113-9 Event can be crossed or combined with corn plants including one or more combinations, of the following: MON810; DAS-59122-7; MIR604; MON89034; MON863; MON87411; MON87403; MON87427; MON-00603-6 (NK603); MON-87460-4; MON-88017-3; LY038; TC1507; 5307; DAS-06275-8; BT176; BT11; MIR162; GA21; MZDT09Y; SYN-05307-1; DP-004114-3; and DAS-40278-9.

A corn seed includes Event DP-056113-9, wherein said seed comprises a DNA molecule selected from the group consisting of SEQ ID NOS: 7, 8, 9, 10, 11, 12, 13, 14 and a combination thereof, wherein a representative sample of corn event DP-056113-9 seed of has been deposited with American Type Culture Collection (ATCC) with Accession No. PTA-126589. In some embodiments, a corn plant, or part thereof, grown from the seed of PTA-126589 is described herein.

A corn plant, seed, cell or part thereof includes event DP-056113-9, wherein the event comprises the nucleotide sequence set forth in SEQ ID NO: 7 and SEQ ID NO: 8. In some embodiments, the event comprises the nucleotide sequence set forth in SEQ ID NO: 9 and SEQ ID NO: 10. In some embodiments, the event comprises the nucleotide sequence set forth in SEQ ID NO: 11 and SEQ ID NO: 12. In some embodiments, the event comprises the nucleotide sequence set forth in SEQ ID NO: 13 or SEQ ID NO: 14. In some embodiments, the plant part is selected from the group consisting of pericarp, pollen, ovule, flower, grain, shoot, root, stalk, silk, tassel, ear, and leaf tissue.

A corn plant, seed, cell or part thereof includes event DP-056113-9, wherein a representative sample of seed of said corn event has been deposited with American Type Culture Collection (ATCC) with Accession No. PTA-126589. In some embodiments, the plant part is selected from the group consisting of pericarp, pollen, ovule, flower, grain, shoot, root, stalk, silk, tassel, ear, and leaf tissue.

An isolated nucleic acid molecule includes a nucleotide sequence selected from the group consisting of SEQ ID NOS: 7, 8, 9, 10, 11, and 12 and in some embodiments, an amplicon includes the nucleic acid sequence selected from the group consisting of SEQ ID NOS: 7, 8, 9, 10, 11, 12 and full length complements thereof. In some embodiments, the amplicon is less than about 500 bp, 1 kb, 1.5 kb, 2.0 kb, 3.0 kb, 5.0 kb, and 10 kb.

A biological sample derived from corn event DP-056113-9 plant, tissue, or seed, wherein said sample comprises a nucleotide sequence which is or is complementary to a sequence selected from the group consisting of SEQ ID NOS: 7, 8, 9, 10, 11, and 12, wherein said nucleotide sequence is detectable in said sample using a nucleic acid amplification or nucleic acid hybridization method, wherein a representative sample of said corn event DP-056113-9 seed has been deposited with American Type Culture Collection (ATCC) with Accession No. PTA-126589. In some embodiments, the biological sample comprises plant, tissue, or portions of seed, pericarp of seed of transgenic corn event DP-056113-9. In some embodiments, the biological sample is a DNA sample extracted from the transgenic corn plant event DP-056113-9, and wherein said DNA sample comprises one or more of the nucleotide sequences selected from the group consisting of SEQ ID NOS: 7, 8, 9, 10, 11, 12, and the complements thereof.

An extract derived from corn event DP-056113-9 plant, tissue, or seed and comprising a nucleotide sequence which is or is complementary to a sequence selected from the group consisting of SEQ ID NOS: 7, 8, 9, 10, 11, and 12, wherein a representative sample of said corn event DP-056113-9 seed has been deposited with American Type Culture Collection (ATCC) with Accession No. PTA-126589. In some embodiments, said nucleotide sequence is detectable in said extract using a nucleic acid amplification or nucleic acid hybridization method.

In some embodiments, a method for increasing male-sterile inbred maize seed, includes self-pollinating the DP-056113-9 maize plants to produce progeny seed. The progeny seed is homozygous for a mutation in a maize Ms44 gene that confers dominant male-sterility phenotype. Progeny seed homozygous for the Ms44 gene mutation conferring male-sterility and the recombinant DNA construct in the DP-056113-9 maintainer line may be identified as seed that, when planted, will give rise to the DP-056113-9 maintainer plants. Seeds homozygous for the Ms44 gene mutation conferring male-sterility to the plant and lacking the recombinant DNA construct in DP-056113-9 may be identified as seed that, when planted, will give rise to a dominant-male-sterile female inbred maize lines. To increase the dominant-male-sterile female inbred maize line, seeds homozygous for the Ms44 gene mutation may be pollinated with pollen from the DP-056113-9 maintainer plants and produce seed homozygous dominant Ms44 male-sterile and lack the recombinant DNA construct from the DP-056113-9 maintainer line. The DP-056113-9 maintainer line has a recombinant DNA construct that includes three expression cassettes, where the cassettes in operable linkage includes a maize alpha amylase gene cassette, a DsRed2 gene cassette, and a zm-Ms44 artificial microRNA (amiRNA) cassette.

Also provided herein, are methods of producing hybrid maize seed using a three-way cross. A three-way cross hybrid is produced from three different inbred lines where two of the inbred lines are crossed (A×B) and then the resulting $F_1$ hybrid is crossed with the third inbred (A×B)×C. See also, FIG. 6. In some embodiments, the steps of producing hybrid maize seed using a three-way cross may include self-pollinating maize plants obtained from corn event DP-056113-9 to produce maize progeny seed, identifying those progeny seeds homozygous for the Ms44 gene mutation conferring male-sterility and lacking the recombinant DNA construct of DP-056113-9 as seeds for a dominant male-sterile female inbred maize line. The seeds may be grown into dominant-male-sterile female inbred maize lines and pollinated with pollen from a first male-fertile line that is the same as the male-sterile female inbred maize lines but wild-type with respect to Ms44, to produce single-cross progeny seed heterozygous for the Ms44 mutation that confers dominant male-sterility to the maize plant. The single-cross progeny seed heterozygous for the Ms44 mutation may be grown into male-sterile female plants and pollinated with pollen from a second, different inbred maize line to produce hybrid maize seed segregating 1:1 for the Ms44 gene mutation conferring male-sterility.

Also provided herein, are methods of producing hybrid maize seed using a single cross. A single cross hybrid is produced when two inbred lines are crossed to produce the $F_1$ progeny. See also, FIG. 7. In some embodiments, the steps of producing hybrid maize seed using a single cross may include self-pollinating maize plants obtained from corn event DP-056113-9 to produce maize progeny seed, identifying those progeny seeds homozygous for the Ms44 gene mutation conferring male-sterility and lacking the recombinant DNA construct of DP-056113-9 as seeds for a dominant-male-sterile female inbred maize line. The seeds may be grown into dominant-male-sterile female inbred maize lines and pollinated with pollen from the same wild type inbred line (a first male-fertile line that is the same as the male-sterile female plants but wild-type with respect to Ms44) to produce progeny inbred seed heterozygous for the Ms44 mutation that confers dominant male-sterility to the maize plant. The progeny inbred seed heterozygous for the Ms44 mutation may be grown into male-sterile female inbred plants and pollinated with pollen from a first inbred maize line, where the first inbred maize line is genetically different than the male-fertile inbred maize line, to produce hybrid maize seed segregating 1:1 for the Ms44 gene mutation conferring male-sterility.

In some embodiments, a method of producing hybrid maize seed includes the steps of pollinating a male-sterile female inbred maize line, wherein the male-sterile female inbred maize line is heterozygous for the Ms44 mutation conferring male-sterility to the inbred maize line, with pollen from a male-fertile maize line to produce progeny hybrid maize seed that segregates 1:1 for the Ms44 gene mutation conferring male-sterility, and growing the maize seed into hybrid plants, wherein the hybrid plants that segregate 1:1 male-sterile:male fertile.

Also included is a method of producing grain on hybrid maize plants, the method includes growing hybrid maize plants from the hybrid seed produced by any of the methods described herein and allowing open-pollination of the hybrid maize plants. The grain may be harvested from the hybrid maize plants.

Also provided herein is a breeding pair of maize plants comprising: a first maize plant and a second maize plant, wherein the first maize plant has a dominant male-sterility phenotype conferred by a mutation in a maize Ms44 gene, and wherein the second maize plant comprises a recombinant DNA construct comprising three expression cassettes, wherein the cassettes in operable linkage includes a maize alpha amylase gene cassette, a DsRed2 gene cassette, and a zm-Ms44 artificial microRNA (amiRNA) cassette. In some embodiments, the maize alpha amylase cassette comprises *Zea mays* Pg47 promoter, a polynucleotide sequence encoding *Zea mays* alpha amylase, a *Zea mays* In2-1 terminator; the DsRed2 cassette comprises a Barley Ltp2 promoter, a polynucleotide sequence encoding Discosoma sp. DsRed2, *Solanum tuberosum* pinII terminator; the zm-Ms44 amiRNA cassette comprises a *Zea mays* Ms44 promoter, a polynucleotide sequence for *Zea mays* Ms-44 ami-RNA, and a *Zea mays* Ms44 terminator. In some embodiments, the Ms44 amiRNA comprises a sequence that expresses a transcript forming an amiRNA that targets and silences the maize dominant male sterile zm-Ms44 gene.

In one embodiment, the zm-Ms44 amiRNA from the zm-Ms44 amiRNA cassette suppresses the expression of the dominant male-sterile Ms44 gene, thereby suppressing the dominant male-sterility phenotype conferred by a mutation in this Ms44 gene and restoring male-fertility to the maize plant. See herein, for example, Example 4; Table 1, SEQ ID NO:35.

In an embodiment, the endogenous non-mutated maize Ms44 gene includes a polynucleotide sequence of SEQ ID NO: 35. In an embodiment, a non-mutated maize Ms44 polypeptide includes a polypeptide with an amino acid sequence of SEQ ID NO: 36.

The Ms44 male-sterile female plant, e.g. a male-sterile inbred maize plant, may contain any mutation in the endogenous maize Ms44 gene so long as (1) the mutation confers dominant male-sterility to the maize plant and (2) the male-fertility phenotype may be restored to the plant by the DP-056113-9 maintainer. For example, in an embodiment, a mutation in the endogenous maize Ms44 gene encodes for a polypeptide of SEQ ID NO: 38, where the polypeptide has an amino acid change at amino acid 37, from Alanine to Threonine, as compared to position 37 in the Ms44 polypeptide of SEQ ID NO:36. The amino acid change to Threonine confers a dominant male-sterility phenotype in a maize plant. In an embodiment, the endogenous mutated maize Ms44 gene includes a polynucleotide sequence of SEQ ID NO:37 which has a single nucleotide substitution of guanine for adenine at position 186 as compared to SEQ ID NO:35, resulting in an amino acid change at amino acid 37, from Alanine to Threonine in the polypeptide (SEQ ID NO:38). This nucleotide change also created a BsmF1 restriction site in the mutant allele which is not found in the wildtype, which allows for distinguishing the two alleles by amplification of both Ms44 alleles by PCR and subsequent digestion of the products by BsmF1. In an embodiment, a mutation in the endogenous maize Ms44 gene encodes for a polypeptide of SEQ ID NO: 40, where the polypeptide has an amino acid change at amino acid 37, from Alanine to Valine, as compared to position 37 in the maize Ms44 polypeptide of SEQ ID NO:36. The amino acid change to Valine confers a dominant male-sterility phenotype in a maize plant. In an embodiment, the endogenous mutated maize Ms44 gene includes a polynucleotide sequence of SEQ ID NO:39 and encodes the polypeptide of SEQ ID NO:40. In an embodiment, the endogenous mutated maize Ms44 gene includes a polynucleotide sequence of SEQ ID NO:39 which has a single nucleotide substitution of cytosine for thymine at position 187 compared to SEQ ID NO:35, resulting in an amino acid change at amino acid 37, from Alanine to Valine in the polypeptide (SEQ ID NO:40). This nucleotide change may be detected using any suitable technique known to one skilled in the art, for example, using PCR, markers, and SNPs.

The DP-056113-9 maintainer has a mutation in the endogenous maize Ms44 gene that encodes for the polypeptide of SEQ ID NO: 38, where the polypeptide has an amino acid change at amino acid 37, from Alanine to Threonine, as compared to position 37 in the Ms44 polypeptide of SEQ ID NO:36. The amino acid change to Threonine confers a dominant male-sterility phenotype in a maize plant and the Ms44amiRNA in the recombinant DNA construct is capable of suppressing Ms44 and restoring male fertility to the maintainer plant.

The DP-056113-9 maintainer has an endogenous mutated maize Ms44 gene that has the polynucleotide sequence of SEQ ID NO:37 which has a single nucleotide substitution of guanine for adenine at position 186 as compared to SEQ ID NO:35, resulting in an amino acid change at amino acid 37, from Alanine to Threonine in the polypeptide (SEQ ID NO:38). This nucleotide change also created a BsmF1 restriction site in the mutant allele which is not found in the wildtype, which allows for distinguishing the two alleles by amplification of both Ms44 alleles by PCR and subsequent digestion of the products by BsmF1.

In addition to a Ms44 mutation, the DP-056113-9 maintainer has a recombinant DNA construct comprising three expression cassettes, wherein the cassettes in operable linkage includes a maize alpha amylase gene cassette, a DsRed2 gene cassette, and a zm-Ms44 artificial microRNA (amiRNA) cassette. In some embodiments, the maize alpha amylase cassette comprises *Zea mays* Pg47 promoter, a polynucleotide sequence encoding *Zea mays* alpha amylase, a *Zea mays* In2-1 terminator; the DsRed2 cassette comprises a Barley Ltp2 promoter, a polynucleotide sequence encoding Discosoma sp. DsRed2, *Solanum tuberosum* pinII terminator; the zm-Ms44 amiRNA cassette comprises a *Zea mays* Ms44 promoter, a polynucleotide sequence for *Zea mays* Ms-44 ami-RNA, and a *Zea mays* Ms44 terminator.

In some embodiments, a plant includes the recombinant DNA construct described herein and the plant is a corn plant. In some embodiments, the plant includes the sequence that is at least 95% identical to the polynucleotide sequence set forth in SEQ ID NO: 6.

A method of determining zygosity of DNA of a corn plant comprising corn event DP-056113-9 in a biological sample comprising:
 a) contacting said sample with a first pair of DNA molecules and a second distinct pair of molecules such that: (i) when used in a nucleic acid amplification reaction comprising corn event DP-056113-9 DNA, produces a first amplicon that is diagnostic for corn event DP-056113-9, and (ii) when used in a nucleic acid amplification reaction comprising corn genomic DNA other than DP-056113-9 DNA, produces a second amplicon that is diagnostic for corn genomic DNA other than DP-056113-9 DNA;
 b) performing a nucleic acid amplification reaction; and
 c) detecting the first and second amplicons so produced, wherein detection of the presence of the first and second amplicons indicates that said sample is heterozygous for corn event DP-056113-9 DNA, wherein detection of the first amplicon indicates that said sample is homozygous for corn event DP-056113-9 DNA.

In some embodiments, the first pair of DNA molecules comprise primer pairs that amplify a DNA fragment that comprises a sequence selected from the group consisting of SEQ ID NOS: 7, 8, 9, 10, 11, 12 and reverse complements thereof. In some embodiments, the first and second pair of DNA molecules comprise a detectable label. In some embodiments, the detectable label is a fluorescent label. In some embodiments, the detectable label is covalently associated with one or more of the primer molecules. In some embodiments, the primer pair comprises SEQ ID NOS: 15 and 16.

A method of detecting the presence of a nucleic acid molecule that is unique to or discriminates event DP-056113-9 in a sample, the method includes:
 a) contacting the sample with a pair of primers or a probe that, when used in a nucleic-acid amplification reaction with genomic DNA from event DP-056113-9 produces a nucleic acid molecule that is diagnostic for event DP-056113-9;
 b) performing a nucleic acid amplification reaction, thereby producing the nucleic acid molecule that is diagnostic for event DP-056113-9; and
 c) detecting the nucleic acid molecule that is diagnostic for event DP-056113-9.

In some embodiments, the nucleic acid molecule that is diagnostic for event DP-056113-9 is an amplicon produced by the nucleic acid amplification chain reaction. In some embodiments, the probe comprises a detectable label. In some embodiments, the detectable label is a fluorescent label. In some embodiments, the detectable label is covalently associated with the probe.

A plurality of polynucleotide primers comprising one or more polynucleotides comprising a length of at least 10 contiguous bases which target event DP-056113-9 DNA template in a sample to produce an amplicon diagnostic for event DP-056113-9 as a result of a polymerase chain reaction amplification method. In some embodiments, polynucleotide primers are characterized by:
 a) a first polynucleotide primer comprises at least 10 contiguous nucleotides of a nucleotide sequence selected from the group consisting of nucleotides 1-1440 OF SEQ ID NO: 31, nucleotides 1-1331 OF SEQ ID NO: 32, and the complements thereof; and
 b) a second polynucleotide primer comprises at least 10 contiguous nucleotides from nucleotides of SEQ ID NO: 6, or the complements thereof.

In some embodiments, the polynucleotide primers are characterized by:
 a) the first polynucleotide primer comprises a polynucleotide sequence comprising SEQ ID NO: 15 and the complements thereof; and
 b) the second polynucleotide primer comprises a polynucleotide sequence comprising SEQ ID NO: 16 and the complements thereof.

In some embodiments, said first primer and said second primer are at least 18 nucleotides.

A method of detecting the presence of DNA corresponding to the DP-056113-9 event in a sample, the method includes:
 a) contacting the sample comprising maize DNA with a polynucleotide probe that hybridizes under stringent hybridization conditions with DNA from maize event DP-056113-9 and does not hybridize under said stringent hybridization conditions with a non-DP-056113-9 maize plant DNA;
 b) subjecting the sample and probe to stringent hybridization conditions; and
 c) detecting hybridization of the probe to the DNA; wherein detection of hybridization indicates the presence of the DP-056113-9 event.

A kit for detecting a nucleic acid that is unique to event DP-056113-9 includes at least one nucleic acid molecule of sufficient length of contiguous polynucleotides to function as a primer or probe in a nucleic acid detection method, and which upon amplification of or hybridization to a target nucleic acid sequence in a sample followed by detection of the amplicon or hybridization to the target sequence, are diagnostic for the presence of the nucleic acid sequence unique to event DP-056113-9 in the sample. In some embodiments, the nucleic acid molecule comprises a nucleotide sequence from SEQ ID NO: 7 or 8.

In some embodiments, the nucleic acid molecule is a primer pair comprising a pair of polynucleotide sequences, each comprising at least 10 contiguous bases, wherein the primer pair amplifies a junction sequence of the event DP-056113-9, the junction comprising a polynucleotide sequence selected from the group consisting of SEQ ID NOS: 7, 8, 9, 10, 11, 12, 13, 14, 31, and 32 and complements thereof.

An antibody generated to target a polypeptide produced from the event DP-056113-9. In some embodiments, the antibody is a monoclonal antibody and comprises a detectable label.

According to some embodiments, compositions and methods are provided for identifying a novel corn plant designated DP-056113-9 (ATCC Deposit Number PTA-126589). The methods are based on primers or probes which specifically recognize the 5' and/or 3' flanking sequence of DP-056113-9. DNA molecules are provided that comprise primer sequences that when utilized in a PCR reaction will produce amplicons unique to the transgenic event DP-056113-9. In one embodiment, the corn plant and seed comprising these molecules is contemplated. Further, kits utilizing these primer sequences for the identification of the DP-056113-9 event are provided.

Additional embodiments relate to the specific flanking sequence of DP-056113-9 as described herein, which can be used to develop specific identification methods for DP-056113-9 in biological samples. More particularly, the disclosure relates to the 5' and/or 3' flanking regions of DP-056113-9, which can be used for the development of specific primers and probes. Further embodiments relate to identification methods for the presence of DP-056113-9 in biological samples based on the use of such specific primers or probes.

According to another embodiment, methods of detecting the presence of DNA corresponding to the corn event DP-056113-9 in a sample are provided. Such methods comprise: (a) contacting the sample comprising DNA with a DNA primer set, that when used in a nucleic acid amplification reaction with genomic DNA extracted from corn event DP-056113-9 produces an amplicon that is diagnostic for corn event DP-056113-9, respectively; (b) performing a nucleic acid amplification reaction, thereby producing the amplicon; and (c) detecting the amplicon. In some aspects, the primer set comprises SEQ ID NO: 15 and/or 16, a polynucleotide that detects at least one junction sequence selected from the group consisting of SEQ ID NOS: 7-12 and a combination thereof.

According to another embodiment, methods of detecting the presence of a DNA molecule corresponding to the DP-056113-9 event in a sample, such methods comprising: (a) contacting the sample comprising DNA extracted from a corn plant with a DNA probe molecule that hybridizes under stringent hybridization conditions with DNA extracted from corn event DP-056113-9 and does not hybridize under the stringent hybridization conditions with a control corn plant DNA; (b) subjecting the sample and probe to stringent hybridization conditions; and (c) detecting hybridization of the probe to the DNA. More specifically, a method for detecting the presence of a DNA molecule corresponding to the DP-056113-9 event in a sample, such methods, consisting of (a) contacting the sample comprising DNA extracted from a corn plant with a DNA probe molecule that consists of sequences that are unique to the event, e.g. junction sequences, wherein said DNA probe molecule hybridizes under stringent hybridization conditions with DNA extracted from corn event DP-056113-9 and does not hybridize under the stringent hybridization conditions with a control corn plant DNA; (b) subjecting the sample and probe to stringent hybridization conditions; and (c) detecting hybridization of the probe to the DNA.

In addition, a kit and methods for identifying event DP-056113-9 in a biological sample which detects a DP-056113-9 specific region are provided.

DNA molecules are provided that comprise at least one junction sequence of DP-056113-9; wherein a junction sequence spans the junction between heterologous DNA inserted into the genome and the DNA from the corn cell flanking the insertion site, i.e. flanking DNA, and is diagnostic for the DP-056113-9 event.

Another embodiment further relates to a DNA detection kit for identifying maize event DP-056113-9 in biological samples. The kit includes a first primer or probe which specifically amplifies or detects the 5' or 3' flanking region of DP-056113-9, and a second primer or probe which specifically amplifies or detects a sequence within the insert DNA of DP-056113-9, respectively, or within the flanking DNA, for use in a PCR identification protocol. A further embodiment relates to a kit for identifying event DP-056113-9 in biological samples, which kit comprises a specific probe having a sequence which corresponds or is complementary to, a sequence having between 80% and 100% sequence identity with a specific region of event DP-056113-9. The sequence of the probe corresponds to a specific region comprising part of the 5' or 3' flanking region of event DP-056113-9. In some embodiments, the first or second primer or an appropriate probe comprises SEQ ID NO: 15, 16, 17, 1, 2, or 3, and reverse complements thereof.

The methods and kits encompassed by the embodiments disclosed herein can be used for different purposes such as, but not limited to the following: to identify event DP-056113-9 in plants, plant material or in products such as, but not limited to, food or feed products (fresh or processed) comprising, or derived from plant material; additionally or alternatively, the methods and kits can be used to identify transgenic plant material for purposes of segregation between transgenic and non-transgenic material; additionally or alternatively, the methods and kits can be used to determine the quality of plant material comprising maize event DP-056113-9. The kits may also contain the reagents and materials necessary for the performance of the detection method.

A further embodiment relates to the DP-056113-9 maize plant or its parts, including, but not limited to, pollen, ovules, pericarp, vegetative cells, the nuclei of pollen cells, and the nuclei of egg cells of the corn plant DP-056113-9 and the progeny derived thereof. In another embodiment, specific amplicons produced from the maize plant and seed of DP-056113-9 are included.

The following examples are offered by way of illustration and not by way of limitation. As described herein, Event DP-056113-9 is also referred to as "DP56113-9", "DP-056113", "DP56113", "DP056113" "Event 9", "E9" "event 9" or "Event 13-9" and they all refer to the same maize event DP-056113-9. All publications, patents, patent applications, or other documents cited in this application are incorporated by reference in their entirety.

EXAMPLES

Example 1: Gene Construct Design for Generating Event DP56113

Figure 2:
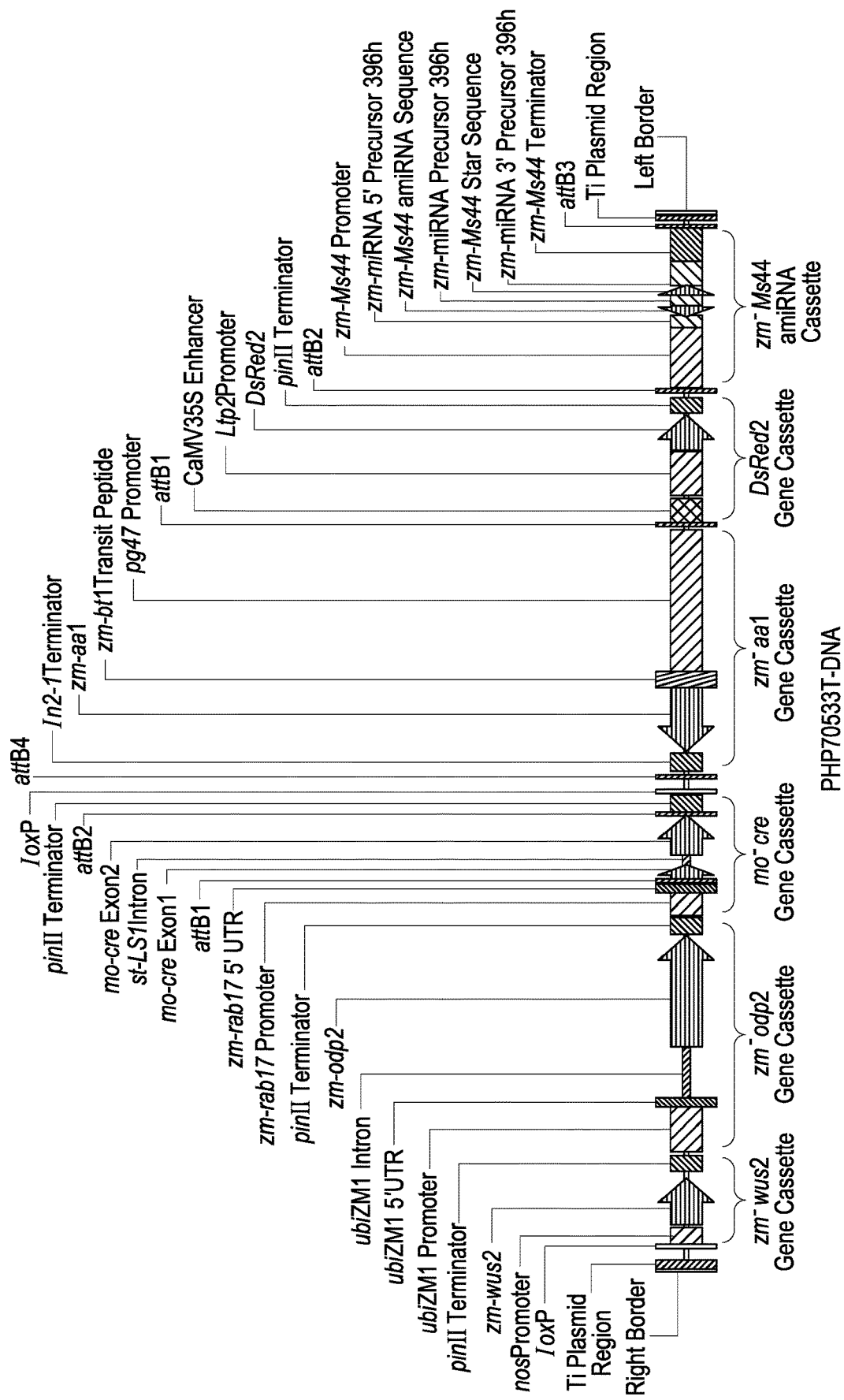
FIG. 2. shows a schematic diagram of the insert T-DNA region of plasmid PHP70533 that is integrated into the genome of the maize plant to generate Event DP-056113-9. The size of the T-DNA is 20,081 bp.

Maize (*Zea mays* L.) was transformed by *Agrobacterium*-mediated transformation with plasmid PHP70533 (FIG. 1). The T-DNA region of this plasmid is represented schematically in FIG. 2. Summaries of the genetic elements and their positions on plasmid PHP70533 and on the T-DNA are provided in Tables 2 and 3, respectively.

The T-DNA of plasmid PHP70533 contains five gene cassettes and an amiRNA cassette. The first cassette (zm-wus2 gene cassette) contains the maize Wuschel2 (wus2) gene (Mayer et al., 1998) encoding the WUS protein. The expressed WUS protein enhances tissue regeneration after transformation (Lowe et al., 2016). The WUS protein is 302 amino acids in length and has a molecular weight of approximately 31 kDa. Expression of the wus2 gene is controlled by the promoter from the *Agrobacterium tumefaciens* Ti plasmid nopaline synthase (nos) gene (Depicker et al., 1982), in conjunction with the terminator region from the potato (*Solanum tuberosum*) proteinase inhibitor II (pinII) gene (An et al., 1989; Keil et al., 1986).

The second cassette (zm-odp2 gene cassette) contains the maize ovule development protein 2 (odp2) gene (GenBank accession XM008676474) encoding the ODP2 protein. The expressed ODP2 protein enhances the regeneration of maize plants from tissue culture after transformation (U.S. Pat. No. 8,420,893B2). The ODP2 protein is 710 amino acids in length and has a molecular weight of approximately 74 kDa. Expression of the odp2 gene is controlled by the promoter region from the maize ubiquitin gene 1 (ubiZM1) including the 5' untranslated region (5' UTR) and intron (Christensen et al., 1992). The terminator for the odp2 gene is a second copy of the pinII terminator.

The third cassette (mo-cre gene cassette) contains maize-optimized (mo) versions of exon 1 and exon 2 of the cre recombinase gene from *Escherichia coli* (Dale and Ow, 1990), separated by an intron region from the potato LS1 (st-LS1) gene (Eckes et al., 1986). The expressed Cre protein facilitates site specific recombination of the loxP sites during transformation and plant regeneration. The Cre protein is 343 amino acids in length and has a molecular weight of approximately 39 kDa. Expression of the mo-cre gene is controlled by the promoter and 5'UTR regions from the maize RAB-17 (zm-rab17) gene (Vilardell et al., 1990), in conjunction with a third copy of the pinII terminator.

The fourth cassette (zm-aa1 gene cassette) contains a truncated version of the maize α-amylase (zm-aa1) gene (Schnable et al., 2009) encoding the ZM-AA1 protein. The zm-aa1 coding region is preceded by the sequence encoding the transit peptide from the maize amyloplast membrane protein Brittle-1 (zm-bt1) gene (Sullivan et al., 1991) that targets the ZM-AA1 protein to the amyloplast. The ZM-AA1 protein contributes to altered starch content (Chao and Scandalios, 1971) and prevents accumulation of starch in the nascent pollen grain, thus preventing the pollen from developing and germinating normally and rendering the pollen infertile. The complete translation product, including transit peptide, is 495 amino acids in length and has a molecular weight of approximately 54 kDa. The processed ZM-AA1 protein, with the transit peptide removed, is 420 amino acids in length and has a molecular weight of approximately 46 kDa. The processed ZM-AA1 protein differs from the native protein in that it lacks the 21 N-terminal amino acid residues found in the native protein, including the initial methionine residue. Expression of the transcript containing the zm-bt1 transit peptide sequence and polynucleotide encoding ZM-AA1 protein is controlled by the pollen-specific promoter from the maize polygalacturonase (Pg47) gene (Allen and Lonsdale, 1993), in conjunction with the terminator region from the maize In2-1 gene (Hershey and Stoner, 1991).

The fifth cassette (DsRed2 gene cassette) contains a modified version of the *Discosoma* sp. (coral anemone) red fluorescent protein (DsRed2) gene (Clontech, 2001), in which an internal BstE II restriction site was removed from the original DsRed2 gene without altering the amino acid sequence of the expressed protein. The tissue-specific expression of the DS-RED2 protein in the aleurone layer of the maize seed produces a red coloration in seeds that contain the DNA insertion, allowing for differentiation during seed sorting. The DSRed2 protein is 225 amino acids in length and has a molecular weight of approximately 26 kDa. Expression of the polynucleotide encoding DsRed2 protein is controlled by the 35S enhancer region from the cauliflower mosaic virus genome (CaMV 35S enhancer; Franck et al., 1980; Kay et al., 1987) and the promoter region from the barley (*Hordeum vulgare*) lipid transfer protein (Ltp2) gene (Kalla et al., 1994), which provide aleurone-specific transcription of the DsRed2 polynucleotide. The terminator for the DsRed2 polynucleotide is a fourth copy of the pinII terminator.

The sixth cassette (zm-Ms44 amiRNA cassette) contains a sequence that expresses a transcript forming an artificial microRNA (amiRNA) precursor comprised of the zm-miRNA 5' precursor 396h, zm-Ms44 amiRNA, zm-miRNA precursor 396h, zm-Ms44 star sequence, and zm-miRNA 3' precursor 396h (U.S. Patent Application Publication No. 20090155909A1). Initial processing of the amiRNA precursor results in the folding of the transcript into a hairpin structure, pairing the zm-Ms44 amiRNA and the zm-Ms44 star sequence, which is complementary except for a single nucleotide mismatch. Further processing releases the zm-Ms44 amiRNA that targets the Ms44 gene for silencing. Expression of this transcript is controlled by the promoter and terminator regions from the maize Ms44 gene (Fox et al., 2017).

The PHP70533 T-DNA contains two loxP (Dale and Ow, 1990) and six attB recombination sites (Cheo et al., 2004; Hartley et al., 2000; Katzen, 2007).

TABLE 2

Description of Genetic Elements in Plasmid PHP70533

| Region | Location on Plasmid (bp to bp) | Genetic Element | Size (bp) | Description |
| --- | --- | --- | --- | --- |
| T-DNA | 1-20,081 | | 20,081 | See Table 3 for information on the elements in this region |
| Plasmid Construct | 20,082-29,511 | Includes Elements Below | 9,430 | DNA from various sources for plasmid construction and plasmid replication |
| | 20,813-22,027 | repA | 1,215 | Replication operon region A from *Agrobacterium rhizogenes* (Nishiguchi et al., 1987) |
| | 22,108-23,046 | repB | 939 | Replication operon region B from *Agrobacterium rhizogenes* (Nishiguchi et al., 1987) |
| | 23,199-24,416 | repC | 1,218 | Replication operon region C from *Agrobacterium rhizogenes* (Nishiguchi et al., 1987) |
| | 25,482-26,492 | spc | 1,011 | Spectinomycin resistance gene from bacteria (Fling et al., 1985) |
| | 26,578-26,947 (complementary) | colE1 ori | 370 | Origin of replication region from *Escherichia coli* (Tomizawa et al., 1977) |

TABLE 2-continued

Description of Genetic Elements in Plasmid PHP70533

| Gene Cassette | Location on T-DNA (bp to bp) | Genetic Element | Size (bp) | Description |
|---|---|---|---|---|
| | 28,041-28,054 | cos | 14 | Cohesive ends from lambda bacteriophage DNA (Komari et al., 1996) |

| Gene Cassette | Location on T-DNA (bp to bp) | Genetic Element | Size (bp) | Description |
|---|---|---|---|---|
| | 1-25 | Right Border (RB) | 25 | T-DNA Right Border from the *Agrobacterium tumefaciens* Ti plasmid (Komari et al., 1996) |
| | 26-177 | Ti Plasmid Region | 152 | Sequence from the *Agrobacterium tumefaciens* Ti plasmid (Komari et al., 1996) |
| | 178-435 | Intervening Sequence | 258 | DNA sequence used for cloning |
| | 436-469 | loxP | 34 | Bacteriophage P1 recombination site recognized by Cre recombinase (Dale and Ow, 1990) |
| | 470-499 | Intervening Sequence | 30 | DNA sequence used for cloning |
| zm-wus2 gene cassette | 500-821 | nos Promoter | 322 | Promoter region from the *Agrobacterium tumefaciens* Ti plasmid nopaline synthase gene (Depicker et al., 1982) |
| | 822-874 | Intervening Sequence | 53 | DNA sequence used for cloning |
| | 875-1,783 | zm-wus2 | 909 | Wuschel2 gene from *Zea mays* (Lowe et al., 2016; Mayer et al., 1998) |
| | 1,784-1,895 | Intervening Sequence | 112 | DNA sequence used for cloning |
| | 1,896-2,206 | pinII Terminator | 311 | Terminator region from the *Solanum tuberosum* (potato) proteinase inhibitor II gene (An et al., 1989; Keil et al., 1986) |
| | 2,207-2,268 | Intervening Sequence | 62 | DNA sequence used for cloning |
| zm-odp2 gene cassette | 2,269-3,168 | ubiZM1 Promoter | 900 | Promoter region from the *Zea mays* ubiquitin gene 1 (Christensen et al., 1992) |
| | 3,169-3,251 | ubiZM1 5' UTR | 83 | 5' untranslated region from the *Zea mays* ubiquitin gene 1 (Christensen et al., 1992) |
| | 3,252-4,264 | ubiZM1 Intron | 1,013 | Intron region from the *Zea mays* ubiquitin gene 1 (Christensen et al., 1992) |
| | 4,265-4,282 | Intervening Sequence | 18 | DNA sequence used for cloning |
| | 4,283-6,415 | zm-odp2 | 2,133 | Ovule development protein 2 gene from *Zea mays* (U.S. Pat. No. 8,420,893 B2; GenBank accession XM008676474) |
| | 6,416-6,483 | Intervening Sequence | 68 | DNA sequence used for cloning |

TABLE 3

Description of Genetic Elements in the T-DNA Region from Plasmid PHP70533

| Gene Cassette | Location on T-DNA (bp to bp) | Genetic Element | Size (bp) | Description |
|---|---|---|---|---|
| | 6,484-6,794 | pinII Terminator | 311 | Terminator region from the *Solanum tuberosum* (potato) proteinase inhibitor II gene (An et al., 1989; Keil et al., 1986) |
| | 6,795-6,832 | Intervening Sequence | 38 | DNA sequence used for cloning |
| mo-cre gene cassette | 6,833-7,340 | zm-rab17 Promoter | 508 | Promoter region from the *Zea mays* RAB-17 gene (Vilardell et al., 1990) |
| | 7,341-7,433 | zm-rab17 5' UTR | 93 | 5' untranslated region from the *Zea mays* RAB-17 gene (Vilardell et al., 1990) |
| | 7,434-7,473 | Intervening Sequence | 40 | DNA sequence used for cloning |
| | 7,474-7,497 | attB1 | 24 | Bacteriophage lambda integrase recombination site from the Invitrogen GATEWAY ® cloning system (Hartley et al., 2000; Katzen, 2007) |
| | 7,498-7,522 | Intervening Sequence | 25 | DNA sequence used for cloning |
| | 7,523-7,766 | mo-cre Exon1 | 244 | Maize-optimized exon 1 of the cre recombinase gene from *Escherichia coli* (Dale and Ow, 1990) |

TABLE 3-continued

Description of Genetic Elements in the T-DNA Region from Plasmid PHP70533

| Gene Cassette | Location on T-DNA (bp to bp) | Genetic Element | Size (bp) | Description |
|---|---|---|---|---|
| | 7,767-7,955 | st-LS1 Intron | 189 | Intron region from the *Solanum tuberosum* (potato) LS1 gene (Eckes et al., 1986) |
| | 7,956-8,743 | mo-cre Exon2 | 788 | Maize-optimized exon 2 of the cre recombinase gene from *Escherichia coli* (Dale and Ow, 1990) |
| | 8,744-8,748 | Intervening Sequence | 5 | DNA sequence used for cloning |
| | 8,749-8,772 | attB2 | 24 | Bacteriophage lambda integrase recombination site from the Invitrogen GATEWAY ® cloning System (Hartley et al., 2000; Katzen, 2007) |
| | 8,773-8,786 | Intervening Sequence | 14 | DNA sequence used for cloning |
| | 8,787-9,094 | pinII Terminator[a] | 308 | Terminator region from the *Solanum tuberosum* (potato) proteinase inhibitor II (An et al., 1989; Keil et al., 1986) |
| | 9,095-9,152 | Intervening Sequence | 58 | DNA sequence used for cloning |
| | 9,153-9,186 | loxP | 34 | Bacteriophage P1 recombination site recognized by Cre recombinase (Dale and Ow, 1990) |
| | 9,187-9,439 | Intervening Sequence | 253 | DNA sequence used for cloning |
| | 9,440-9,460 | attB4 | 21 | Bacteriophage lambda integrase recombination site (Cheo et al., 2004) |
| | 9,461-9,618 | Intervening Sequence | 158 | DNA sequence used for cloning |
| zm-aa1 gene cassette | 9,619-9,961 (complementary) | In2-1 Terminator | 343 | Terminator region from the *Zea mays* In2-1 gene (Hershey and Stoner, 1991) |
| | 9,962-9,968 | Intervening Sequence | 7 | DNA sequence used for cloning |
| | 9,969-11,302 (complementary) | zm-aa1 | 1,334 | Truncated version of the α-amylase gene from *Zea mays* including 3' untranslated region (UTR) (Schnable et al., 2009) as described below: 3' UTR at bp 9,969-10,039 (71 bp long) Coding sequence at bp 10,040-11,302 (1,263 bp long) |
| | 11,303-11,529 (complementary) | zm-bt1 Transit Peptide | 227 | Amyloplast-targeting transit peptide of the Brittle-1 gene from *Zea mays* including 5' untranslated region (UTR) (Sullivan et al., 1991) as described below: Coding sequence at bp 11,303-11,527 (225 bp long) 5' UTR at bp 11,528-11,529 (2 bp long) |
| | 11,530-14,265 (complementary) | Pg47 Promoter | 2,736 | Promoter region from the *Zea mays* pollen-specific polygalacturonase gene (Allen and Lonsdale, 1993) |
| | 14,266-14,332 | Intervening Sequence | 67 | DNA sequence used for cloning |
| | 14,333-14,356 | attB1 | 24 | Bacteriophage lambda integrase recombination site from the Invitrogen GATEWAY ® cloning system (Hartley et al., 2000; Katzen, 2007) |
| | 14,357-14,391 | Intervening Sequence | 35 | DNA sequence used for cloning |
| DsRed2 gene cassette | 14,392-14,866 | CaMV 35S Enhancer | 475 | 35S enhancer region from the cauliflower mosaic virus genome (Franck et al., 1980; Kay et al., 1987) |
| | 14,867-14,899 | Intervening Sequence | 33 | DNA sequence used for cloning |
| | 14,900-15,745 | Ltp2 Promoter | 846 | Promoter region from the *Hordeum vulgare* (barley) aleurone-specific lipid transfer protein gene (Kalla et al., 1994) |
| | 15,746-15,789 | Intervening Sequence | 44 | DNA sequence used for cloning |
| | 15,790-16,467 | DsRed2 | 678 | Modified version of the red fluorescent protein DsRed2 gene from *Discosoma* sp. (coral anemone) (Clontech, 2001) with an internal BstE II restriction site removed |
| | 16,468-16,508 | Intervening Sequence | 41 | DNA sequence used for cloning |
| | 16,509-16,819 | pinII Terminator | 311 | Terminator region from the *Solatium tuberosum* (potato) proteinase inhibitor II gene (An et al., 1989; Keil et al., 1986) |
| | 16,820-16,940 | Intervening Sequence | 121 | DNA sequence used for cloning |
| | 16,941-16,964 | attB2 | 24 | Bacteriophage lambda integrase recombination site from the Invitrogen GATEWAY ® cloning System (Hartley et al., 2000; Katzen, 2007) |
| | 16,965-17,005 | Intervening Sequence | 41 | DNA sequence used for cloning |
| zm-Ms44 amiRNA cassette | 17,006-18,226 | zm-Ms44 Promoter | 1,221 | Promoter region from the *Zea mays* Ms44 gene (Fox et al., 2017) |
| | 18,227-18,229 | Intervening Sequence | 3 | DNA sequence used for cloning |
| | 18,230-18,311 | zm-miRNA 5' Precursor 396h | 82 | 5' precursor sequence of the microRNA backbone 396h from *Zea mays* (U.S. patent application Publication No. US20090155909A1) (McGonigle, 2012) |
| | 18,312-18,332 (complementary) | zm-Ms44 amiRNA Sequence | 21 | Artificial microRNA (amiRNA) sequence complementary to the Ms44 gene from *Zea mays* (Fox et al., 2017) |

TABLE 3-continued

Description of Genetic Elements in the T-DNA Region from Plasmid PHP70533

| Gene Cassette | Location on T-DNA (bp to bp) | Genetic Element | Size (bp) | Description |
|---|---|---|---|---|
| | 18,333-18,400 | zm-miRNA Precursor 396h | 68 | Precursor sequence of the microRNA backbone 396h from *Zea mays* (U.S. patent application Publication No. US20090155909A1) (McGonigle, 2012) |
| | 18,401-18,421 | zm-Ms44 Star Sequence | 21 | Artificial star sequence complementary to the zm-Ms44 amiRNA sequence except for one mismatched nucleotide (Fox et al., 2017) |
| | 18,422-18,862 | zm-miRNA 3' Precursor 396h | 441 | 3' precursor sequence of the microRNA backbone 396h from *Zea mays* (U.S. patent application Publication No. US20090155909A1) (McGonigle, 2012) |
| | 18,863-18,880 | Intervening Sequence | 18 | DNA sequence used for cloning |
| | 18,881-19,655 | zm-Ms44 Terminator | 775 | Terminator region from the *Zea mays* Ms44 gene (Fox et al., 2017) |
| | 19,656-19,753 | Intervening Sequence | 98 | DNA sequence used for cloning |
| | 19,754-19,774 | attB3 | 21 | Bacteriophage lambda integrase recombination site (Cheo et al., 2004) |
| | 19,775-19,999 | Intervening Sequence | 225 | DNA sequence used for cloning |
| | 20,000-20,056 | Ti Plasmid Region | 57 | Sequence from the *Agrobacterium tumefaciens* Ti plasmid (Komari et al., 1996) |
| | 20,057-20,081 | Left Border (LB) | 25 | T-DNA Left Border from the *Agrobacterium tumefaciens* Ti plasmid (Komari et al., 1996) |

<sup>a</sup>This copy of the pinII terminator is 3 bp shorter at the 5' end than the other pinII terminators in this vector.

Example 2: Plant Transformation for Generating Event DP56113

Figure 3:
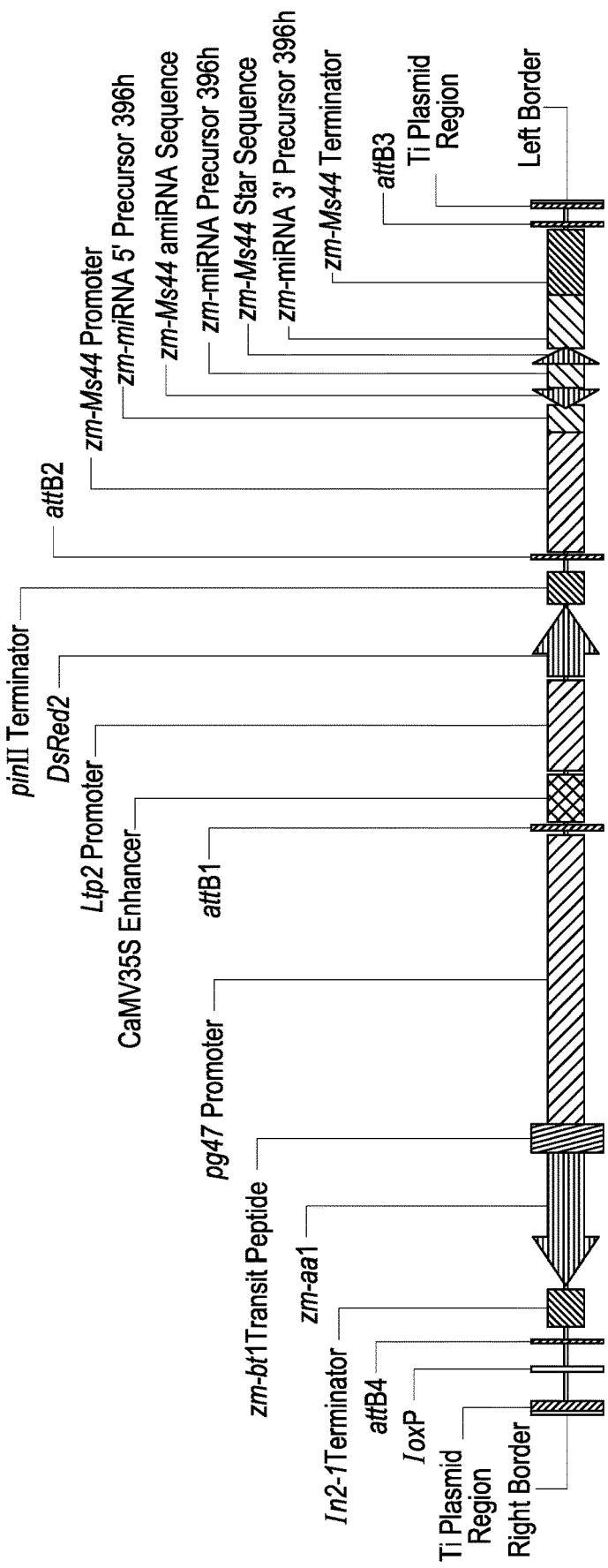
FIG. 3. shows a schematic diagram of the intended insert T-DNA region after CRE excision of plasmid PHP70533.

DP56113 SPTA maintainer was created by *Agrobacterium*-mediated transformation with plasmid PHP70533 (FIG. 1; Table 2). The inserted T-DNA region from plasmid PHP70533 (FIG. 2; Table 3) contains six cassettes. Following T-DNA integration, recombination of loxP sites within the inserted T-DNA removed three cassettes to result in a final insertion containing three cassettes (FIG. 3).

Pioneer proprietary inbred line PHH5G, containing the dominant Ms44 mutation, was transformed with plasmid PHP70533 to produce DP56113 SPTA maintainer. Immature maize embryos were harvested from a surface-sterilized ear of PHH5G maize approximately 8-11 days after pollination and inoculated with *Agrobacterium tumefaciens* strain LBA4404 containing plasmids PHP10523 and PHP70533 (Zhao et al., 2001). *Agrobacterium tumefaciens* strain LBA4404 is a disarmed strain that does not contain tumor-inducing factors; however, with the inclusion of plasmid PHP10523, the strain contains factors (i.e., the vir genes) that enable the transfer of the T-DNA region to the inoculated host plant. After three to six days of embryo and *Agrobacterium* co-cultivation on solid culture medium without selection, the embryos were transferred to a medium with glufosinate herbicide selection and containing the antibiotic carbenicillin to kill residual *Agrobacterium*. Prior to plant regeneration, transformed callus was subjected to a brief desiccation step to activate the zm-rab17 promoter (Vilardell et al., 1990) and express the Cre protein. The Cre protein excised the DNA sequences between the two loxP sites in the PHP70533 T-DNA, comprising the zm-wus2, zm-odp2, and mo-cre gene cassettes, to yield the intended insertion (FIG. 3). Callus was then transferred to germination medium and incubated to initiate shoot and root development. Once shoots and roots were established, healthy plants were selected, and PCR was used to confirm the presence of the PHP70533 T-DNA insert. Plants that were regenerated from transformation and tissue culture (designated TO plants) were selected for further characterization and advancement through the breeding process.

Example 3: Molecular Characterization of Event DP56113

Copy number PCR and next-generation sequencing (NGS) analysis were used to demonstrate that a single insertion has occurred in DP56113 and that the T-DNA is stably transferred across generations and the junction sequences were determined using sequencing analysis. Marker analysis was also performed to ensure that DP56113 also contained the Ms44 dominant male sterile mutation.

SbS analysis utilizes probe-based sequence capture, NGS techniques, and bioinformatics procedures to capture, sequence, and identify inserted DNA within the maize genome. By compiling a large number of unique sequencing reads and mapping them against the transformation plasmid and control maize genome, unique junctions due to inserted DNA are identified in the bioinformatics analysis and used to determine the number of insertions within the plant genome, verify insertion intactness, and confirm the absence of plasmid backbone sequences.

The SbS technique utilizes capture probes homologous to the transformation plasmid to isolate genomic DNA that hybridizes to the probe sequences (Zastrow-Hayes et al., 2015). Captured DNA is then sequenced using a NGS procedure and the results are analyzed using bioinformatics tools. During the analysis, junction reads are identified as those sequence reads where part of the read shows exact homology to the plasmid DNA sequence while the rest of the read does not match the contiguous plasmid. Junctions may occur between inserted DNA and genomic DNA, or between insertions of two plasmid-derived DNA sequences that are not contiguous in the transformation plasmid. Multiple sequence reads are generated for each junction and are compiled into a consensus sequence for the junction. By compiling a large number of unique sequencing reads and comparing them to the transformation plasmid and control maize genome, unique junctions due to inserted DNA are identified. A unique junction is defined as one in which the plasmid-derived sequence and the adjacent sequence are the same across multiple reads, although the overall length of the multiple reads for that junction vary due to the sequencing process. The number of unique junctions is related to the number of plasmid insertions present in the maize genome (for example, a single T-DNA insertion is expected to have two unique junctions). Detection of additional unique junctions beyond the two expected for a single insertion would indicate the presence of rearrangements or additional insertions derived from plasmid DNA. Absence of any junctions indicates there are no detectable insertions within the maize genome.

Figure 4:
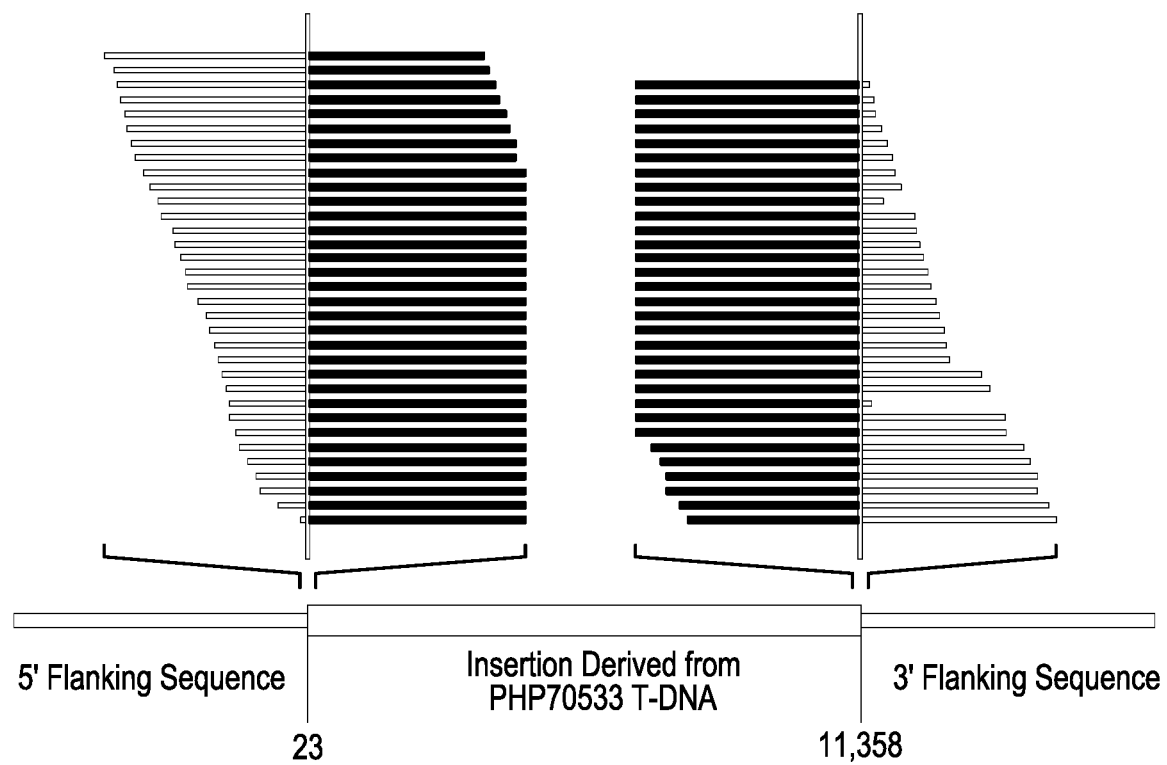
FIG. 4. shows a schematic map of the insertion of DP56113 maize based on the Southern-by-Sequencing ("SbS") analysis described.

The T1 generation of DP56113 SPTA maintainer was analyzed by SbS, using full-coverage probes comprising the entire sequence of the PHP70533 transformation plasmid, to determine the insertion copy number and intactness and to confirm the absence of plasmid backbone sequences. SbS was also performed on control maize, and on a positive control sample to confirm that the assay could reliably detect plasmid fragments spiked into control maize genomic DNA. Based on the results obtained in this study, a schematic diagram of the DP56113 SPTA maintainer insertion was developed and is provided in FIG. 4.

Several genetic elements in the PHP70533 T-DNA are derived from maize and thus the homologous elements in the PHH5G maize genome are be captured by the full-coverage probes used in the SbS analysis. These endogenous elements (ubiZM1 promoter, 5' UTR, and intron, zm-rab17 promoter and 5' UTR, Pg47 and zm-Ms44 promoters, In2-1 and zm-Ms44 terminators, zm-wus2, zm-odp2, zm-bt1 transit peptide, zm-aa1, and the zm-Ms44 amiRNA precursor; have sequencing reads in the SbS results due to the homologous elements in the PHH5G maize genome. However, if no junctions are detected, these sequencing reads only indicate the presence of the endogenous elements in their normal context of the maize genome and are not from inserted DNA.

Sequencing reads were detected in the PHH5G control maize; however, coverage above background level (35×) was obtained only for the genetic elements derived from the maize genome. These sequence reads were due to capture and sequencing of these genetic elements in their normal context within the PHH5G control maize genome. Variation in coverage of the endogenous elements is due to sequence variations between the PHH5G control maize and the maize varieties from which the genetic elements in PHP70533 were derived. No junctions were detected between plasmid sequences and the maize genome, indicating that there are no PHP70533 plasmid DNA insertions in the control maize, and the sequence reads were solely due to the endogenous genetic elements present in the PHH5G control maize genome.

Figure 5A:
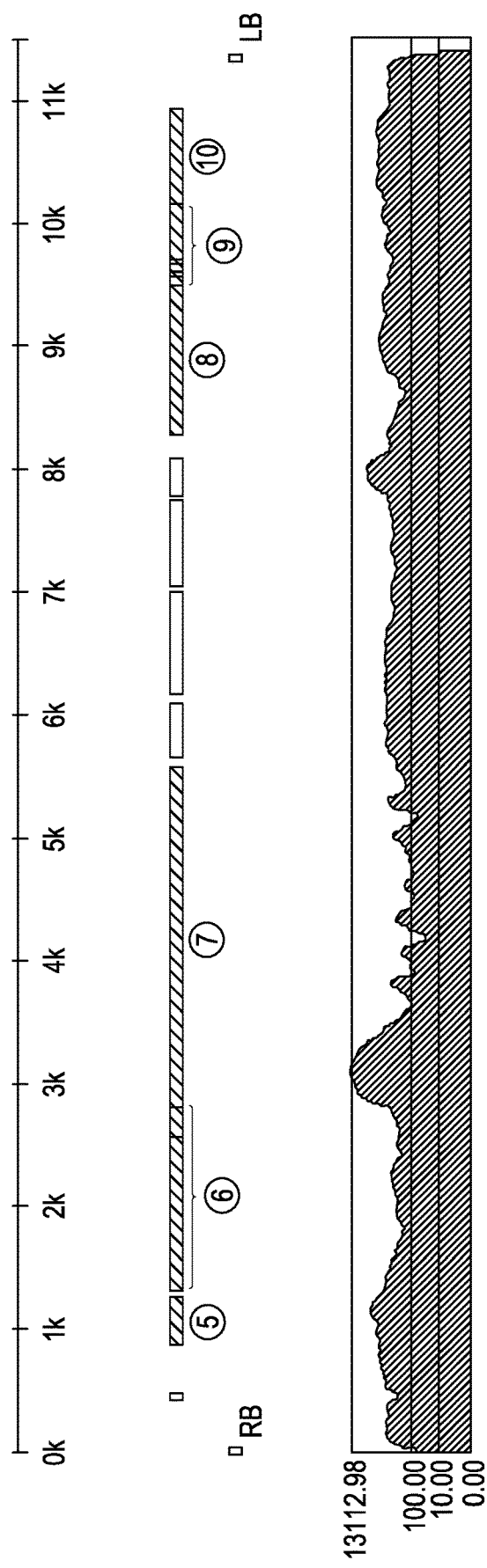
FIG. 5A-FIG. 5C illustrate SbS Results for Positive Control Sample. The positive control sample consisted of control maize DNA spiked with PHP70533 plasmid at a level corresponding to one copy of PHP70533 per copy of the maize genome. The coverage graph (shown with angled lines to the left) shows the number of individual NGS reads aligned at each point on the construct using a logarithmic scale. The bars above the coverage graph (shown with right-angled lines) indicate endogenous genetic elements in plasmid PHP70533 derived from the maize genome (identified by numbers, Table 6), while open bars (no lines) indicate genetic elements derived from other sources.
Figure 5B:
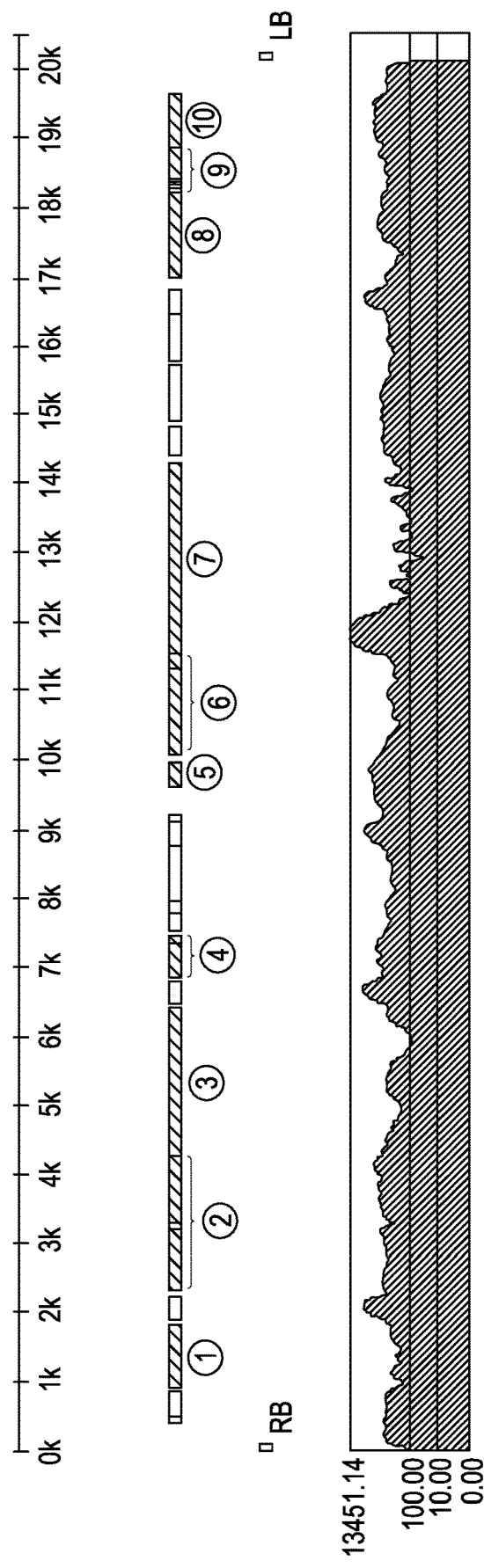
Figure 5C:
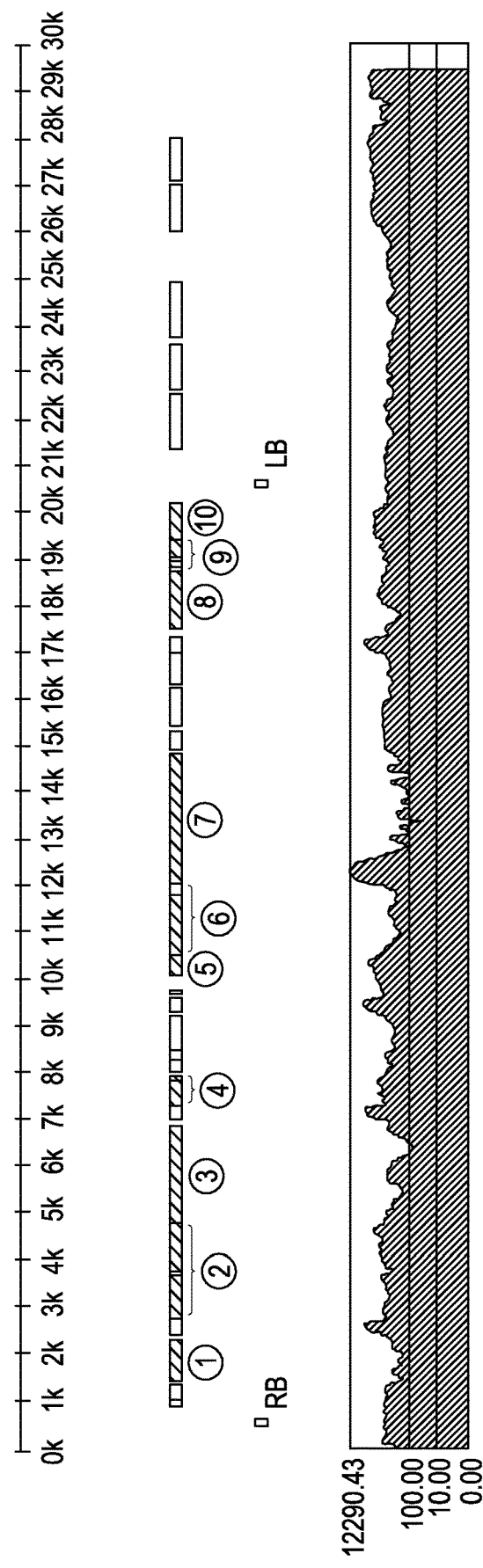

SbS analysis of the positive control sample resulted in sequence coverage across the entire length of the plasmid (FIG. 5), indicating that the SbS assay utilizing the full-coverage probe library is sensitive enough to detect PHP70533 sequences at a concentration equivalent to one copy of PHP70533 per copy of the maize genome. No junctions were detected between plasmid and genomic sequences, indicating that the sequence reads were due to either the spiked-in plasmid or the endogenous maize genetic elements that were detected in the control maize.

SbS analysis of the T1 generation of DP56113 SPTA maintainer resulted in two unique genome-plasmid junctions. The 5' junction started with bp 23 within the Right Border of the intended insertion derived from the PHP70533 T-DNA (FIG. 2), and the insertion ended with the 3' junction at bp 11,358 within the T-DNA Left Border of the intended insertion, indicating minor truncations of the T-DNA borders. Right Border and Left Border termini deletions often occur in *Agrobacterium*-mediated transformation (Kim et al., 2007). The number of sequence reads at the 5' and 3' junctions is provided in Table 4. There were no other junctions between the PHP70533 sequences and the maize genome detected in the T1 plant, indicating that there are no additional plasmid-derived insertions present in DP56113 SPTA maintainer. Alignment of the reads to the PHP70533 T-DNA and plasmid maps shows coverage of the genetic elements found in the intended insertion, along with coverage to the endogenous elements in the T-DNA that were removed by loxP recombination (zm-wus2, zm-odp2, ubiZM1 promoter, 5' UTR, and intron, and zm-rab17 promoter and 5' UTR). Reads also aligned to the pinII terminator elements present on the map in the zm-wus2, zm-odp2, and mo-cre cassettes although these cassettes were removed by recombination. The NGS reads that aligned to these three copies of the pinII terminator are from fragments containing the pinII terminator in the DsRed2 cassette of the intended insertion; however, the reads from this single copy align to all copies of the pinII terminator in the PHP70533 T-DNA and plasmid maps. There were no unexpected junctions between non-contiguous regions of the intended insertion identified, indicating that there are no rearrangements or additional truncations in the inserted DNA, other than the Right Border and Left Border truncations noted above. Furthermore, there were no junctions between maize genome sequences and the backbone sequence of PHP70533, demonstrating that no plasmid backbone sequences were incorporated into DP56113 SPTA maintainer.

SbS analysis of the T1 generation of DP56113 SPTA maintainer demonstrated that there is a single, intact insertion of the intended insertion derived from the PHP70533 T-DNA in DP56113 SPTA maintainer and that no additional insertions or plasmid backbone sequences are present in its genome.

TABLE 4

DP56113 SPTA Maintainer SbS Junction Reads

| Description | Supporting Reads at 5' Junction[1] | Unique Reads at 5' Junction[2] | Supporting Reads at 3' Junction[3] | Unique Reads at 3' Junction[4] |
|---|---|---|---|---|
| DP56113 SPTA Maintainer | 87 | 34 | 82 | 32 |
| Control Maize[5] | 0 | 0 | 0 | 0 |
| Positive Control[5] | 0 | 0 | 0 | 0 |

[1]Total number of sequence reads across the 5' junction of the DP56113 SPTA maintainer insertion.
[2]Unique sequence reads establishing the location of the 5' genomic junction of the DP56113 SPTA maintainer insertion at bp 23 of the intended insertion (FIG. 3). Multiple identical NGS supporting reads are condensed into each unique read.
[3]Total number of sequence reads across the 3' junction of the DP56113 SPTA maintainer insertion.
[4]Unique sequence reads establishing the location of the 3' genomic junction of the DP56113 SPTA maintainer insertion at bp 11,358 of the intended insertion. Multiple identical NGS supporting reads are condensed into each unique read.
[5]No junctions were detected in either the control maize or positive control samples.

Example 4: Phenotypic Characterization of Event DP56113

Since the dominant Ms44 mutant allele is contained in the transformation target, event DP56113 was evaluated for male fertility and found to be completely male fertile.

As an additional check, markers were used to genotype for the Ms44 mutant allele and were found to be positive for Ms44, indicating the MS44 mutation was present and that the Ms44amiRNA is capable of suppressing Ms44 and restoring male fertility to the plant.

The T:0 plant of event DP56113 was used as a male to cross onto a wild-type maize plant. The resultant T:1 seed was evaluated for seed fluorescence an indicator for the presence of the DS-RED gene cassette. No fluorescing seed was found (0%; n=204) in the T:1 seed, indicating that the transgene was not transmitted through pollen.

Event DP56113 T:0 plant was also used as a female and crossed onto with wild-type pollen of the proprietary inbred line, PHH5G. Transgene segregation in the resultant T:1 seed was consistent with a 1:1 segregation pattern (n=236), indicating the transgene transmits normally through female gametes.

Example 5: Segregation of DP56113 Across Multiple Generations

Segregation analysis was conducted for five generations of DP56113 SPTA maintainer (T2, T3, T4, T5, and F1). Genotypic analyses were used to evaluate each individual plant for the presence or absence of event DP56113, the zm-Ms44 amiRNA, and the zm-aa1 and DsRed2 genes by qualitative polymerase chain reaction. Statistical analysis (chi-square test at 0.05 significance level) was conducted to compare the observed segregation ratio to the expected segregation ratio of 1:1 for each generation.

Results from the segregation analysis are provided in Table 5. In every case, a positive plant tested positive for the presence of the DP56113 SPTA maintainer insertion; and the zm-Ms44 amiRNA, and zm-aa1 and DsRed2 genes indicating that the inserted T-DNA and its genetic elements within DP56113 SPTA maintainer segregated together. A chi-square ($\chi^2$) analysis was performed on the data, and no statistically significant differences were found between the observed and expected segregation ratios for each of the T2, T3, T4, T5, and F1 generations of DP56113 SPTA maintainer (Table 5). Results indicated that within these five generations, each of the introduced genes segregated according to Mendelian rules of inheritance for a single genetic locus. These results were consistent with SbS and Southern analysis data indicating the stable integration of the insert at a single site in the genome and stable genetic inheritance of the DNA insertion of DP56113 SPTA maintainer across breeding generations.

TABLE 5

Summary of Genotypic and Phenotypic Results for Segregating Generations of DP56113 SPTA Maintainer

| Generation | Expected Segregation Ratio (Positive: Negative) | Observed Segregation | | | Statistical Analysis | |
|---|---|---|---|---|---|---|
| | | Positive | Negative | Total | Chi-Square[a] | P-Value |
| T2 | 1:1 | 50 | 50 | 100 | 0.00 | 1.0000 |
| T3 | 1:1 | 48 | 52 | 100 | 0.16 | 0.6892 |
| T4 | 1:1 | 48 | 52 | 100 | 0.16 | 0.6892 |
| T5 | 1:1 | 46 | 54 | 100 | 0.64 | 0.4237 |
| F1 | 1:1 | 49 | 51 | 100 | 0.04 | 0.8415 |

[a]Degrees of freedom = 1. A Chi-Square value greater than 3.84 (P-value less than 0.05) would indicate a significant difference.

Leaf tissue samples were collected from five generations of DP56113 SPTA maintainer (T1, T2, T3, T4, and F1) and anon-GE near-isoline maize (referred to as control maize) at various growth stages and made available for use in future analysis.

Planting and Thinning

For the six generations of DP56113 SPTA maintainer (T1, T2, T3, T4, T5, and F1), 120-135 seeds were planted per generation in separate 4-inch pots (one seed per pot, organized in flats containing 15 pots). For the control maize, 10 seeds were planted in a 2-gallon pot. All seeds were grown in a controlled environment under conditions for producing maize plants. Each generation of DP56113 SPTA maintainer maize was then thinned to at least 100 plants for genotypic evaluation by removing any unhealthy plants.

Segregation Analysis

PCR Sample Collection

For five generations of DP56113 SPTA maintainer (T2, T3, T4, T5, and F1), one leaf sample per plant was collected at the V3 growth stage to be used in PCR analysis. Each sample consisted of three leaf punches collected into one bullet tube and placed on dry ice until transferred to a freezer prior to analysis. Individual plants and corresponding leaf samples were uniquely labeled to allow a given sample to be tracked back to the originating plant.

Genotype Analysis

Leaf samples were analyzed using a qualitative PCR assay to confirm the presence or absence of event DP56113, the zm-Ms44 amiRNA, and zm-aa1 and DsRed2 genes.

Leaf Punch Sample Collection

Four leaf punch samples were collected at the V5 growth stages from each plant. The plants were uniquely labeled to allow a given sample to be traced back to the originating plant. Samples were placed in coolers on dry ice immediately after sampling and kept frozen until transferred to a freezer set at $\leq -50°$ C.

Statistical Analysis

A chi-square test was performed at the 0.05 significance level on the segregation results of T2, T3, T4, T5 and F1 generations of DP56113 SPTA maintainer. The chi-square test was performed separately for each generation to compare the observed segregation ratio to the expected segregation ratio of 1:1 for each generation. Statistical analyses were conducted using SAS software, Version 9.4.

Example 6: DP56113 Protein Expression and Concentration Calculations

The field portion of this study was conducted during the 2017 growing season at eight sites in commercial maize-growing regions of the United States (two sites in Iowa and one site each in Illinois, Indiana, Minnesota, Nebraska, Pennsylvania, and Washington). A randomized complete block design with four blocks (each containing DP56113 SPTA maintainer) was utilized at each site.

The following samples were collected: leaf (V9, R1, R4, and R6 growth stages), pollen (R1 growth stage), forage (R4 growth stage), root (V9, R1, R4, and R6 growth stages), whole plant (V9, R1, and R6 growth stages), and seed (R6 growth stage). Growth stage descriptions are provided in Table A. Samples collected from DP56113 SPTA maintainer were analyzed for ZM-AA1 protein concentrations using a quantitative enzyme-linked immunosorbent assay (ELISA) and DsRed2 protein concentrations using a fluorometric assay method.

Bias in this portion of the study was controlled through the use of replicate testing, appropriate assay controls, and pre-determined data acceptability criteria.

TABLE A

Maize Growth Stage Description

| Growth Stage | Description |
|---|---|
| VE | The stage when the plant first emerges from the soil. |
| V1 | The stage when the collar of the first leaf becomes visible. |
| V2 | The stage when the collar of the second leaf becomes visible. |
| V3 | The stage when the collar of the third leaf becomes visible. |
| V4 | The stage when the collar of the fourth leaf becomes visible. |
| V5 | The stage when the collar of the fifth leaf becomes visible. |
| V6 | The stage when the collar of the sixth leaf becomes visible. |
| V7 | The stage when the collar of the seventh leaf becomes visible. |
| V8 | The stage when the collar of the eighth leaf becomes visible. |
| V9 | The stage when the collar of the ninth leaf becomes visible. |
| V10 | The stage when the collar of the tenth leaf becomes visible. |
| VT | The stage when the last branch of tassel is completely visible. |
| R1 | The stage when silks become visible. |
| R2 | The stage when kernels are white on the outside and resemble a blister in shape. |
| R3 | The stage when kernels are yellow on the outside and the inner fluid is milky white. |
| R4 | The stage when the material within the kernel produces a doughy consistency. |
| R5 | The stage when all or nearly all the kernels are dented or denting. |
| R6 | Typical grain harvest would occur. This stage is regarded as physiological maturity. |

Note:
Growth stages (Abendroth et al., 2011).

Sample Collection

Leaf (V9, R1, R4, and R6 growth stages), root (V9, R1, R4, and R6 growth stages), pollen (R1 growth stage), whole plant (V9, R1, and R6 growth stages), forage (R4 growth stage), and seed (R6 growth stage) samples were from all four blocks collected at each site from DP56113 SPTA maintainer for expressed trait protein analysis. One sample per plot was collected from a self-pollinated row for each tissue at the applicable growth stages. All samples from a given growth stage were collected from the same plants. All samples were collected from impartially selected, healthy, representative plants to minimize potential bias. Each sample was uniquely labeled with a sample identification number and barcode for sample tracking, and is traceable by site, entry, block, tissue, and growth stage.

Leaf

Each leaf sample was obtained by pruning the youngest, healthy leaf that was at least 8 in. (20 cm) in length from the plant. The tissue was cut into sections of 1 in. (2.5 cm) or smaller and collected into a pre-labeled vial.

Root

Each root sample was obtained by cutting a circle 10-15 in. (25-38 cm) in diameter around the base of the plant to a depth of 7-9 in. (18-23 cm). The roots were thoroughly cleaned with water and removed from the plant. No above ground brace roots were included in the sample. The root tissue was cut into sections of 1 in. (2.5 cm) or smaller in length and collected to fill no more than 50% of a pre-labeled vial.

Pollen

Each pollen sample was obtained by bagging and shaking a selected tassel to dislodge the pollen. The tassel selected for sampling had one-half to three-quarters of the tassel's main spike shedding pollen. For some plots, may have been pooled from multiple plants within the same plot in order to collect the appropriate amount. The pollen was screened for anthers and foreign material, and then collected to fill approximately 25-50% of the conical area of a pre-labeled vial.

Whole Plant

Each whole plant sample was obtained by cutting the plants approximately 4-6 in. (10-15 cm) above the soil surface line. The plant was chopped into sections of 3 in. (7.6 cm) or less in length and collected into a pre-labeled, plastic-lined, cloth bag. The plants selected for sampling at the R1 growth stage contained tassels and ears that were covered prior to silking (any secondary or tertiary ears with exposed silks were removed and excluded from the sample). The plants selected for sampling at the R6 growth stage contained tassels and self-pollinated ears. Any secondary or tertiary ears with exposed silks were removed from the plants selected for sampling at the R6 growth stage. The R6 whole plant samples included the husk and cob from the sampled plants; however, the seed was removed and used for the respective seed sample.

Forage

Each forage sample was obtained by cutting the aerial portions of the plants approximately 4-6 in. (10-15 cm) above the soil surface line. The plant was chopped into sections of 3 in. (7.6 cm) or less in length and collected into a pre-labeled, plastic-lined, cloth bag. The plants selected for forage sampling contained self-pollinated ears.

Seed

Each seed sample was obtained by husking and shelling the seed from one selected ear. The plants selected for seed sampling contained self-pollinated ears. For each sample, a representative sub-sample of 15 kernels was collected into an individual pre-labeled vial.

Each sample was placed on dry ice within 10 minutes of collection in the field and transferred to frozen storage (<−10° C. freezer unit) until shipment. Expressed trait protein samples were then shipped frozen to Pioneer Hi-Bred International, Inc. for processing and analysis. Upon arrival, samples were stored frozen (<−10° C. freezer unit). Prior to processing, seed samples were color-sorted using methods described in Methods section C. Whole plant and forage samples were coarsely homogenized prior to lyophilization. All samples were lyophilized under vacuum until dry. Following lyophilization, leaf, root, whole plant, forage, and seed samples were finely homogenized and stored frozen until analysis.

Color Sorting of R6 Seed Samples

Frozen kernels from each individual seed R6 sample, from all field sites, were evaluated under a light source of appropriate wave length to confirm fluorescence. All red kernels were collected and retained for tissue processing and analysis.

Protein Concentration Determination

The concentrations of ZM-AA1 protein was determined using a quantitative ELISA that has been internally validated to demonstrate method suitability. The concentration of DsRed2 protein was determined using a quantitative fluorometric assay that has been internally validated to demonstrate method suitability.

ZM-AA1 Protein Extraction

Processed tissue sub-samples were weighed at the following target weights: 5 mg for pollen; 10 mg for leaf; 20 mg for root, and seed; and 30 mg for whole plant and forage. Samples were extracted with 0.60 ml of chilled 08 buffer, which was comprised of 50 mM HEPES, 150 mM sodium chloride, 0.15% polysorbate 20, 0.5 mM calcium chloride, 0.5% polyethylene glycol, and 5 mM sodium metabisulfite. Extracted samples were centrifuged, and then supernatants were removed and prepared for analysis.

DsRed2 Protein Extraction

Processed tissue sub-samples were weighed at the following target weights: 5 mg for pollen; 10 mg for seed and leaf; 15 mg for root; and 20 mg for forage and whole plant. Samples were extracted with 0.80 ml of chilled 25% StabilZyme Select in phosphate-buffered saline containing polysorbate 20 (PBST). Extracted samples were centrifuged, and then supernatants were removed and prepared for analysis.

ZM-AA1 Protein ELISA Methodology

Prior to analysis, samples were diluted as applicable in 08 buffer. Standards (typically analyzed in triplicate wells) and diluted samples (typically analyzed in duplicate wells) were incubated in a plate pre-coated with a ZM-AA1-specific antibody. Following incubation, unbound substances were washed from the plate and the bound ZM-AA1 protein was incubated with a different ZM-AA1-specific antibody conjugated to the enzyme horseradish peroxidase (HRP). Unbound substances were washed from the plate. Detection of the bound ZM-AA1-antibody complex was accomplished by the addition of substrate, which generated a colored product in the presence of HRP. The reaction was stopped with an acid solution and the optical density (OD) of each well was determined using a plate reader.

DsRed2 Protein Fluorometric Assay Method

Prior to analysis, samples were diluted as applicable with 25% StabilZyme Select in PBST. Standards (typically analyzed in triplicate wells) and diluted samples (typically analyzed in duplicate wells) were analyzed on the same test plate. The test plate was placed into a fluorometer where the DsRed2 protein was excited with light and the resulting fluorescence intensity was measured in relative fluorescence units (RFU). Fluorometer wavelength settings were at 563 nm excitation and 600 nm emission with a 590 nm cutoff filter. The intensity of fluorescence was directly related to the amount of DsRed2 protein present in the sample extract.

Calculations for Determining ZM-AA1 Protein Concentrations

SoftMax Pro GxP (Molecular Devices) microplate data software was used to perform the calculations required to convert the OD values obtained for each set of sample wells to a protein concentration value.

A standard curve was included on each ELISA plate. The equation for the standard curve was derived by the software, which used a quadratic fit to relate the OD values obtained for each set of standard wells to the respective standard concentration (ng/ml).

The quadratic regression equation was applied as follows:
$y = Cx^2 + Bx + A$
where x=known standard concentration and y=respective absorbance value (OD)

Interpolation of the sample concentration (ng/ml) was performed by solving for x in the above equation using the values for A, B, and C that were determined for the standard curve.

$$\text{Sample Concentration (ng/ml)} = \frac{-B + \sqrt{B^2 - 4C(A - sampleOD)}}{2C}$$

For example, given curve parameters of A=0.0476, B=0.4556, C=−0.01910, and a sample OD=1.438

Sample Concentration =

$$\frac{-0.4556 + \sqrt{0.4556^2 - 4(-0.01910)(0.0476 - 1.438)}}{2(-0.01910)} = 3.6 \text{ ng/ml}$$

The sample concentration values were adjusted for a dilution factor expressed as 1:N by multiplying the interpolated concentration by N.

Adjusted Concentration=Interpolated Sample Concentration×Dilution Factor

For example, given an interpolated concentration of 3.6 ng/ml and a dilution factor of 1:20

Adjusted Concentration=3.6 ng/ml×20=72 ng/ml

Adjusted sample concentration values obtained from SoftMax Pro GxP software were converted from ng/ml to ng/mg sample weight as follows:

Sample Concentration (ng protein/mg sample weight) =

$$\text{Sample Concentration (ng/ml)} \times \frac{\text{Extraction Buffer Volume (ml)}}{\text{Sample Target Weight (mg)}}$$

For example, sample concentration=72 ng/ml, extraction buffer volume=0.60 ml, and sample target weight=10 mg Sample Concentration (ng protein/mg sample weight) =

$$72 \text{ ng/ml} \times \frac{0.60 \text{ ml}}{10 \text{ mg}} = 4.3 \text{ ng/mg}$$

The reportable assay lower limit of quantification (LLOQ) in ng/ml was calculated as follows:

Reportable Assay LLOQ (ng/ml)=(lowest standard concentration−10%)×minimum dilution For example, lowest standard concentration=0.50 ng/ml and minimum dilution=10

Reportable Assay LLOQ (ng/ml)=(0.50 ng/ml−(0.50×0.10))×10=4.5 ng/ml

The LLOQ, in ng/mg sample weight, was calculated as follows:

$$LLOQ = \text{Reportable Assay } LLOQ \text{ (ng/ml)} \times \frac{\text{Extraction Buffer Volume (ml)}}{\text{Sample Target Weight (mg)}}$$

For example, reportable assay LLOQ=4.5 ng/ml, extraction buffer volume=0.60 ml, and sample target weight=10 mg $$LLOQ = 4.5 \text{ ng/ml} \times \frac{0.60 \text{ ml}}{10 \text{ mg}} = 0.27 \text{ ng/mg sample weight}$$

Calculations for Determining DsRed2 Protein Concentrations

SoftMax Pro GxP (Molecular Devices) microplate data software was used to perform the calculations required to convert the RFU values obtained for each set of sample wells to a protein concentration value.

A standard curve was included on each plate. The equation for the standard curve was derived by the software, which used a quadratic fit to relate the mean RFU values obtained for each set of standard wells to the respective standard concentration (µg/ml).

The quadratic regression equation was applied as follows:
$y = Cx^2 + Bx + A$
where x=known standard concentration and y=RFU value
Interpolation of the sample concentration (µg/ml) was performed by solving for x in the above equation using the values for A, B, and C that were determined for the standard curve.

$$\text{Sample Concentration (µg/ml)} = \frac{-B + \sqrt{B^2 - 4C(A - RFU)}}{2C}$$

For example, given curve parameters of A=6.06, B=162, C=−2.57, and a sample RFU=520

$$\text{Sample Concentration (µg/ml)} = \frac{-162 + \sqrt{162^2 - 4(-2.57)(6.06 - 520)}}{2(-2.57)} = 3.4 \text{ µg/ml}$$

The sample concentration values were adjusted for a dilution factor expressed as 1:N by multiplying the sample concentration by N.

Adjusted Concentration=Sample Concentration×Dilution Factor

For example, given a sample concentration of 3.4 µg/ml and a dilution factor of 1:2

Adjusted Concentration=3.4 µg/ml×2=6.8 µg/ml

Adjusted sample concentration values obtained from SoftMax Pro GxP software were converted from µg/ml to ng/mg sample weight as follows:

$$\text{Sample Concentration (ng protein/mg sample weight)} = \text{Sample Concentration (µg/ml)} \times \frac{\text{Extraction Buffer Volume (ml)}}{\text{Sample Target Weight (mg)}} \times \frac{1000 \text{ ng}}{1 \text{ µg}}$$

For example, sample concentration=6.8 µg/ml, extraction buffer volume=0.80 ml, and sample target weight=10 mg $$\text{Sample Concentration (ng protein/mg sample weight)} =$$

$$6.8 \text{ µg/ml} \times \frac{0.80 \text{ ml}}{10 \text{ mg}} \times \frac{1000 \text{ ng}}{1 \text{ µg}} = 540 \text{ ng/mg}$$

The reportable assay LLOQ in µg/ml was calculated as follows:

Reportable Assay LLOQ (µg/ml)=(lowest standard concentration−10%)×minimum dilution For example, lowest standard concentration=0.25 µg/ml and minimum dilution=2

Reportable Assay LLOQ (µg/ml)=(0.25 µg/ml− (0.25×0.10))×2=0.45 µg/ml

The LLOQ, in ng/mg sample weight, was calculated as follows:

$$LLOQ = \text{Reportable Assay } LLOQ \times \frac{\text{Extraction Buffer Volume (ml)}}{\text{Sample Target Weight (mg)}} \times \frac{1000 \text{ ng}}{1 \text{ µg}}$$

For example, DsRed2 in inbred seed: reportable assay LLOQ=0.45 µg/ml, extraction buffer volume=0.80 ml, and sample target weight=10 mg $$LLOQ = 0.45 \text{ µg/ml} \times \frac{0.80 \text{ ml}}{10 \text{ mg}} \times \frac{1000 \text{ ng}}{1 \text{ µg}} = 36 \text{ ng protein/mg sample weight}$$

Statistical Analysis

Statistical analysis of the protein concentration results consisted of the calculations of means, ranges, and standard deviations. Individual sample results below the LLOQ were assigned a value equal to half of the LLOQ for calculation purposes.

TABLE 6

Across-Site Summary of Expressed Trait ZM-AA1 Protein Concentrations

| Tissue (Growth Stage) | ng ZM-AA1/mg Tissue Dry Weight | | | | Number of Samples < LLOQ/ |
|---|---|---|---|---|---|
| | Mean | Range | Standard Deviation | Sample LLOQ | Number of Samples Reported |
| DP56113 SPTA Maintainer | | | | | |
| Leaf (V9) | 41 | 12-72 | 16 | 0.27 | 0/32 |
| Root (V9) | 5.9 | 0.23-12 | 2.8 | 0.14 | 0/32 |
| Whole Plant (V9) | 27 | 15-40 | 6.7 | 0.090 | 0/32 |

TABLE 6-continued

Across-Site Summary of Expressed Trait ZM-AA1 Protein Concentrations

| Tissue (Growth Stage) | ng ZM-AA1/mg Tissue Dry Weight | | | Sample LLOQ | Number of Samples < LLOQ/ Number of Samples Reported |
|---|---|---|---|---|---|
| | Mean | Range | Standard Deviation | | |
| | DP56113 SPTA Maintainer | | | | |
| Leaf (R1) | 37 | 6.0-66 | 14 | 0.27 | 0/32 |
| Pollen (R1) | 260 | 110-380 | 63 | 0.54 | 0/32 |
| Root (R1) | 3.9 | 0.69-7.5 | 1.6 | 0.14 | 0/32 |
| Whole Plant (R1) | 17 | 10-22 | 2.8 | 0.090 | 0/32 |
| Forage (R4) | 5.4 | 2.6-8.0 | 1.3 | 0.090 | 0/32 |
| Leaf (R4) | 18 | 4.1-28 | 5.3 | 0.27 | 0/32 |
| Root (R4) | 1.7 | 0.14-3.9 | 0.99 | 0.14 | 0/32 |
| Seed (R6) | 1.3 | 0.60-2.5 | 0.45 | 0.14 | 0/32 |
| Leaf (R6) | $0.26^a$ | <0.27-1.7 | $0.40^a$ | 0.27 | 28/32 |
| Root (R6) | $0.11^a$ | <0.14-0.63 | $0.12^a$ | 0.14 | 29/32 |
| Whole Plant (R6) | $0.24^a$ | <0.090-2.0 | $0.53^a$ | 0.090 | 28/32 |

Note:
Growth stages (Abendroth et al., 2011). Lower limit of quantification (LLOQ) in ng/mg tissue dry weight.
$^a$Some, but not all sample results were below the LLOQ. A value equal to half the LLOQ value was assigned to those samples to calculate the mean and standard deviation.

TABLE 7

Across-Site Summary of Expressed Trait DsRed2 Protein Concentrations

| Tissue (Growth Stage) | ng DsRed2/mg Tissue Dry Weight | | | Sample LLOQ | Number of Samples < LLOQ/ Number of Samples Reported |
|---|---|---|---|---|---|
| | Mean | Range | Standard Deviation | | |
| | DP56113 SPTA Maintainer | | | | |
| Leaf (V9) | 130 | 80-190 | 26 | 72 | 0/32 |
| Root (V9) | $40^a$ | <24-58 | $12^a$ | 24 | 3/32 |
| Whole Plant (V9) | 89 | 60-120 | 13 | 36 | 0/32 |
| Leaf (R1) | 190 | 140-300 | 37 | 72 | 0/32 |
| Pollen (R1) | <72 | <72 | ND | 72 | 32/32 |
| Root (R1) | 51 | 31-85 | 13 | 24 | 0/32 |
| Whole Plant (R1) | 98 | 64-160 | 23 | 36 | 0/32 |
| Forage (R4) | 100 | 68-140 | 15 | 36 | 0/32 |
| Leaf (R4) | 190 | 78-320 | 61 | 72 | 0/32 |
| Root (R4) | $50^a$ | <24-69 | $13^a$ | 24 | 1/32 |
| Seed (R6) | 480 | 370-620 | 59 | 36 | 0/32 |
| Leaf (R6) | <72 | <72 | ND | 72 | 32/32 |
| Root (R6) | $21^a$ | <24-52 | $12^a$ | 24 | 19/32 |
| Whole Plant (R6) | $33^a$ | <36-88 | $22^a$ | 36 | 21/32 |

Note:
Growth stages (Abendroth et al., 2011). Lower limit of quantification (LLOQ) in ng/mg tissue dry weight.
Not determined (ND); all samples were below the LLOQ.
$^a$Some but not all sample results were below the LLOQ. A value equal to half the LLOQ value was assigned to those samples to calculate the mean and standard deviation.

Example 7: Event-Specific Detection Methods, Primers and Probes

For detection of the maize alpha amylase gene, dsREd2 gene, and maize Ms44 amiRNA sequence contained within maize event DP56113-9 as well as the genomic junction spanning the DP56113-9 maize insertion site, regions of about 76-bp and 103-bp were amplified using primers and probes specific for each unique sequence. Additionally, a 79-bp region of an endogenous reference gene, High Mobility Group A (hmg-A, GenBank accession number AF171874.1), was used in duplex with each assay for both qualitative and quantitative assessment of each assay and to demonstrate the presence of sufficient quality and quantity of DNA within the PCR reaction. Data from hmg-A was used in calculations regarding scoring. Data were compared to the performance of either the validated positive or copy number calibrator as well as negative genomic controls.

The real-time PCR reaction involves the 5' nuclease activity of the heat activated DNA polymerase. Two primers and one probe annealed to the target DNA with the probe, which contained a 5' fluorescent reporter dye and a 3' quencher dye. With each PCR cycle, the reporter dye is cleaved from the annealed probe by the polymerase, emitting a fluorescent signal that intensified with each subsequent cycle. The cycle at which the emission intensity of the sample amplicon rose above the detection threshold was referred to as the $C_T$ value.

DNA Extraction

Genomic DNA samples, isolated from leaf tissue of plants representing the T2, T3, T4, T5, and F1 generations of DP56113-9 maize were extracted using an alkaline buffer comprised of sodium hydroxide, ethylenediaminetetraacetic acid disodium salt dihydrate ($Na_2$-EDTA) and Tris.

Details on Composition and Preparation of Reaction Mixes

Each assay supporting the DP56113-9 maize insertion site and the maize alpha amylase gene, dsREd2 gene, and maize Ms44 amiRNA sequence contained within event DP56113-9 was multiplexed with the hmg-A endogenous reference assay. The base master mix, Bioline SENSIFAST™ Probe Lo-ROX master mix (commercially available) with 30% Bovine Serum Albumin (BSA) included as an additive was used. Individual concentrations of each primer varied per reaction between 300 nM and 900 nM, dependent on the optimal concentration established during the validation of the analysis. Individual concentrations of each probe per reaction were at 80 nM. Assay controls included no template controls (NTC) which consisted of water or Tris-EDTA (TE) buffer (10 mM Tris pH 8.0, 1 mM EDTA) as well as copy number calibrator and negative controls, all of which were validated for each assay performed. Annealing temperatures and number of cycles used during the PCR analyses are provided in Table 8. The primer and probes used for the PCR analysis are provided in Tables 9 and 10. Master mix formulations for each PCR analysis are provided in Tables 11-14.

PCR Parameters

The PCR parameters used during PCR analysis are listed below:

TABLE 8

Annealing Temperatures and Cycles used During the PCR Reaction

| Step | Description | | Temperature (° C.) | Time (seconds) | Cycles |
| --- | --- | --- | --- | --- | --- |
| 1 | Initial Denaturation | | 95 | 2:00-5:00 | 1 |
| 2a | Amplification | Denaturation | 95 | 0:01-0:03 | 40[a] |
| 2b | | Anneal/Extend | 60 | 0:20-0:30 | |

[a]If thermal cycling was completed using a Roche LIGHTCYCLER ® 480 Instrument, 45 cycles for steps 2a and 2b were performed.

Primers and Probes

The primers and probe used for each assay performed are listed below:

TABLE 9

Primers and Probes for PCR Analysis of alpha amylase, DsREd2, Ms44 amiRNA polynucleotide sequences and the DP56113-9 Maize Insertion Site and the DP56113-9 Maize Insertion Site

| Reagent | Sequence (5' to 3') | Length (bp) |
| --- | --- | --- |
| DP56113-9 forward primer | GAAGGAAACGAGTGAAGCGGT (SEQ ID NO: 15) | 21 |
| DP56113-9 reverse primer | GCGTCAATTTGTTTACACCACAA (SEQ ID NO: 16) | 23 |
| DP56113-9 probe | CAACTTAATAACGATATACACGATAT (SEQ ID NO: 17) | 26 |
| Maize alpha amylase forward primer | CGGACTAATGCTGCTTTGTCAG (SEQ ID NO: 18) | 22 |
| Maize alpha amylase reverse primer | TGTTTGCAATGCAGCACAAG (SEQ ID NO: 19) | 20 |
| Maize alpha amylase probe | GAAAAGACGTTATGCAGTGTCGTGCTGCT (SEQ ID NO: 20) | 25 |
| DsRed2 forward primer | TGCTTCATCTACAAGGTGAAGTTCA (SEQ ID NO: 21) | 25 |
| DsRed2 reverse primer | AAGAAGACCATGGGCTGGG (SEQ ID NO: 22) | 19 |
| DsRed2 probe | CGGCGTGAACTTCCCCTCCGA (SEQ ID NO: 23) | 21 |
| Maize Ms44 amiRNA forward primer | CCCCAGCCCCCACAAG (SEQ ID NO: 1) | 16 |
| Maize Ms44 amiRNA reverse primer | GTTAATATCGTAGACATAATGGCCCTC (SEQ ID NO: 2) | 27 |
| Maize Ms44 amiRNA probe | ACCATGGTCCCCCAGAT (SEQ ID NO: 3) | 17 |

TABLE 9-continued

Primers and Probes for PCR Analysis of alpha amylase, DsREd2, Ms44 amiRNA polynucleotide sequences and the DP56113-9 Maize Insertion Site and the DP56113-9 Maize Insertion Site DP56113-9 assay amplicon sequence (77-bp); primer and probe binding sites are in bold and underlined
GAAGGAAACGAGTGAAGCGGTGTGGGGCAACTTAATAACGATATACACGATATAATTGT
GGTGTAAACAAATTGACGC (SEQ ID NO: 24)

Alpha amylase assay amplicon sequence (80-bp); primer and probe binding sites are in bold and underlined
CGGACTAATGCTGCTTTGTCAGATCTCAAG**GAAAAGACGTTATGCAGTGTCGTGCTGCT
GTGTTTGCAATGCAGCACAAG** (SEQ ID NO: 25)

DsRed2 assay amplicon sequence (82-bp); primer and probe binding sites are in bold and underlined
TGCTTCATCTACAAGGTGAAGTTCATCGGCGTGAACTTCCCCTCCGACGGCCCCGTGAT
GCAGAAGAAGACCATGGGCTGGG (SEQ ID NO: 26)

Maize Ms44 amiRNA assay amplicon sequence (103-bp); primer and probe binding sites are in bold and underlined
CCCCAGCCCCCACAAGACGAGGCAACCATGGTCCCCAGATTTGTCTAGGACACCGCCGT
ACCCACACCCCGGATCAGTTAATATCGTAGACATAATGGCCCTC (SEQ ID NO: 4)

TABLE 10

Primers and Probes for PCR Analysis of the hmg-A Endogenous Reference Gene

| Reagent | Sequence (5' to 3') | Length (base) |
|---|---|---|
| hmg-A forward primer | TTGGACTAGAAATCTCGTGCTGA (SEQ ID NO: 27) | 23 |
| hmg-A reverse primer | GCTACATAGGGAGCCTTGTCCT (SEQ ID NO: 28) | 22 |
| hmg-A probe | VIC-GCGTTTGTGTGGATTG-MGB (SEQ ID NO: 29) | 16 | hmg-A assay amplicon sequence (79-bp; primer and probe binding sites are in bold and underlined)
TTGGACTAGAAATCTCGTGCTGATTAATTGTTTTACGCGT**GCGTTTGTGT
GGATTG**TAGGACAAGGCTCCCTATGTAGC (SEQ ID NO: 30)

Preparation of Master Mix

The components and concentrations supporting each master mix are listed below:

TABLE 11

Master Mix supporting Multiplex Assay: DP56113-9 and hmg-A[a]

| Component | Stock Concentration | Final Concentration | Volume/ reaction (μL) |
|---|---|---|---|
| SensiFast ™ probe Lo-ROX master mix | 2x | 1x | 1.5 |
| DP56113-9 forward primer | 200 μM | 300 nM | 0.005 |
| DP56113-9 reverse primer | 200 μM | 300 nM | 0.005 |
| DP56113-9 probe | 100 μM | 80 nM | 0.002 |
| hmg-A forward primer | 200 μM | 300 nM | 0.009 |
| hmg-A reverse primer | 200 μM | 300 nM | 0.009 |
| hmg-A probe | 100 μM | 80 nM | 0.002 |
| Bovine Serum Albumin | 30% | 0.08%[b] | 0.009 |
| HPLC Molecular Biology Grade Water | N_A[c] | N_A[c] | 0.959 |

[a]The final volume of each reaction was 3 μL comprised of 2.5 μL of Master Mix and 0.5 μL of genomic DNA template.
[b]The concentration of Bovine Serum Albumin solution in the reaction, as a reagent, was 0.3%; the concentration based on the stock was 0.08%.
[c]N_A is equivalent to Not Applicable.

TABLE 12

Master Mix supporting Multiplex Assay: Alpha amylase and hmg-A[a]

| Component | Stock Concentration | Final Concentration | Volume/ reaction (μL) |
|---|---|---|---|
| SensiFast ™ probe Lo-ROX master mix | 2x | 1x | 1.5 |
| Maize alpha amylase forward primer | 200 μM | 300 nM | 0.005 |
| Maize alpha amylase reverse primer | 200 μM | 300 nM | 0.005 |
| Maize alpha amylase probe | 100 μM | 80 nM | 0.002 |
| hmg-A forward primer | 200 μM | 300 nM | 0.005 |
| hmg-A reverse primer | 200 μM | 300 nM | 0.005 |
| hmg-A probe | 100 μM | 80 nM | 0.002 |
| Bovine Serum Albumin | 30% | 0.08%[b] | 0.009 |
| HPLC Molecular Biology Grade Water | N_A | N_A | 0.968 |

[a]The final volume of each reaction was 3 μL comprised of 2.5 μL of Master Mix and 0.5 μL of genomic DNA template.
[b]The concentration of Bovine Serum Albumin solution in the reaction, as a reagent, was 0.3%; the concentration based on the stock was 0.08%.
[c]N_A is equivalent to Not Applicable.

TABLE 13

Master Mix supporting Multiplex Assay: DsRed2 and hmg-A[a]

| Component | Stock Concentration | Final Concentration | Volume/reaction (μL) |
|---|---|---|---|
| SensiFast™ probe Lo-ROX master mix | 2x | 1x | 1.5 |
| DsRed2 forward primer | 200 μM | 300 nM | 0.005 |
| DsRed2 reverse primer | 200 μM | 300 nM | 0.005 |
| Ds Red2 probe | 100 μM | 80 nM | 0.002 |
| hmg-A forward primer | 200 μM | 300 nM | 0.005 |
| hmg-A reverse primer | 200 μM | 300 nM | 0.005 |
| hmg-A probe | 100 μM | 80 nM | 0.002 |
| Bovine Serum Albumin | 30% | 0.08%b | 0.009 |
| HPLC Molecular Biology Grade Water | N_A | N_A | 0.968 |

[a]The final volume of each reaction was 3 μL comprised of 2.5 μL of Master Mix and 0.5 μL of genomic DNA template.
bThe concentration of Bovine Serum Albumin solution in the reaction, as a reagent, was 0.3%; the concentration based on the stock was 0.08%.
[c]N_A is equivalent to Not Applicable

TABLE 14

Master Mix supporting Multiplex Assay: Zm-Ms44-amiRNA and hmg-A[a]

| Component | Stock Concentration | Final Concentration | Volume/reaction (μL) |
|---|---|---|---|
| SENSIFAST™ probe Lo-ROX master mix | 2x | 1x | 1.5 |
| Zm-Ms44-amiRNA forward primer | 200 μM | 900 nM | 0.014 |
| Zm-Ms44-amiRNA reverse primer | 200 μM | 900 nM | 0.014 |
| Zm-Ms44-amiRNA probe | 100 μM | 80 nM | 0.002 |
| hmg-A forward primer | 200 μM | 300 nM | 0.005 |
| hmg-A reverse primer | 200 μM | 300 nM | 0.005 |
| hmg-A probe | 100 μM | 80 nM | 0.002 |
| Bovine Serum Albumin | 30% | 0.08%[b] | 0.009 |
| HPLC Molecular Biology Grade Water | N_A | N_A | 0.950 |

PCR Analysis

Genomic DNA samples isolated from collected leaf samples of DP56113-9 maize plants, along with copy number calibrator, negative and NTC controls, were subjected to qPCR amplification using SensiFast™ probe Lo-ROX master mix (Bioline, London, UK) in the presence of primer pair and probes specific for maize alpha amylase gene, dsREd2 gene, and maize Ms44 amiRNA sequence and the insertion site specific for DP56113-9 maize which allow for the unique identification of the PHP70533 T-DNA insertion in DP56113-9 maize. For assay and DNA quality monitoring, maize hmg-A was included in duplex with each reaction as an endogenous control. Each qPCR reaction was set up in a total volume of 3 μL with 3-ng of the isolated genomic DNA.

Results

The results of the qPCR copy number analyses of multiple generations indicate stable integration and segregation of a single copy of the maize alpha amylase sequence, dsREd2 sequence, and maize Ms44 amiRNA sequence within the T-DNA of plasmid PHP70533, with demonstrated transfer to subsequent generations.

PCR products between 76-bp and 103-bp, representing the insertion site/junction for DP56113-9 maize as well as maize alpha amylase sequence, dsREd2 sequence, and maize Ms44 amiRNA sequence within the T-DNA from plasmid PHP70533, were amplified and observed in leaf samples of DP56113-9 maize as well as copy number calibrator genomic controls, but were absent in each of the negative genomic controls and NTC controls. For each sample and all controls, $C_T$ values, $\Delta C_T$ values and copy numbers were calculated.

The maize endogenous reference gene assay for detection of hmg-A amplified as expected in all the test samples, negative controls and was not detected in the NTC samples.

Analyses using quantitative real-time PCR demonstrated inheritance of event DP-056113-9 and maize alpha amylase sequence, dsREd2 sequence, and maize Ms44 amiRNA sequence in maize in five segregating generations (T2, T3, T4, T5, and F1).

Real-time PCR analyses of event DP56113-9 utilizing event-specific and construct-specific primer/probe sets for event DP56113-9 confirm the stable integration and segregation of a single copy of the T-DNA of plasmid PHP70533 of the event in leaf samples tested from five segregating generations (T2, T3, T4, T5, and F1), as demonstrated by the quantified detection of maize alpha amylase sequence, dsREd2 sequence, and maize Ms44 amiRNA sequence in DP56113-9 maize.

Example 8: Increase of Male-Sterile Inbred Seed Using the DP56113 SPTA Maintainer In this example, the DP56113 SPTA maintainer is used to maintain, propagate, or increase the male sterile plants. The DP56113 SPTA maintainer, Event DP-056113-9, is selfed (cross with itself), producing seed as illustrated in parts A, B, and C, of FIG. 6. Seed homozygous for the Ms44 mutation which confers dominant male-sterility will give rise to a male sterile female inbred seed. Seed that is homozygous for the Ms44 mutation which confers dominant male-sterility and also contains the recombinant DNA construct with the maize alpha amylase gene cassette, the DsRed2 gene cassette, and the zm-Ms44 artificial microRNA (amiRNA) cassette will give rise to the DP56113 SPTA maintainer. The DP56113 SPTA maintainer seeds comprising the recombinant DNA construct can be identified by presence of the dsRed color marker and sorted on that basis.

Figure 6:
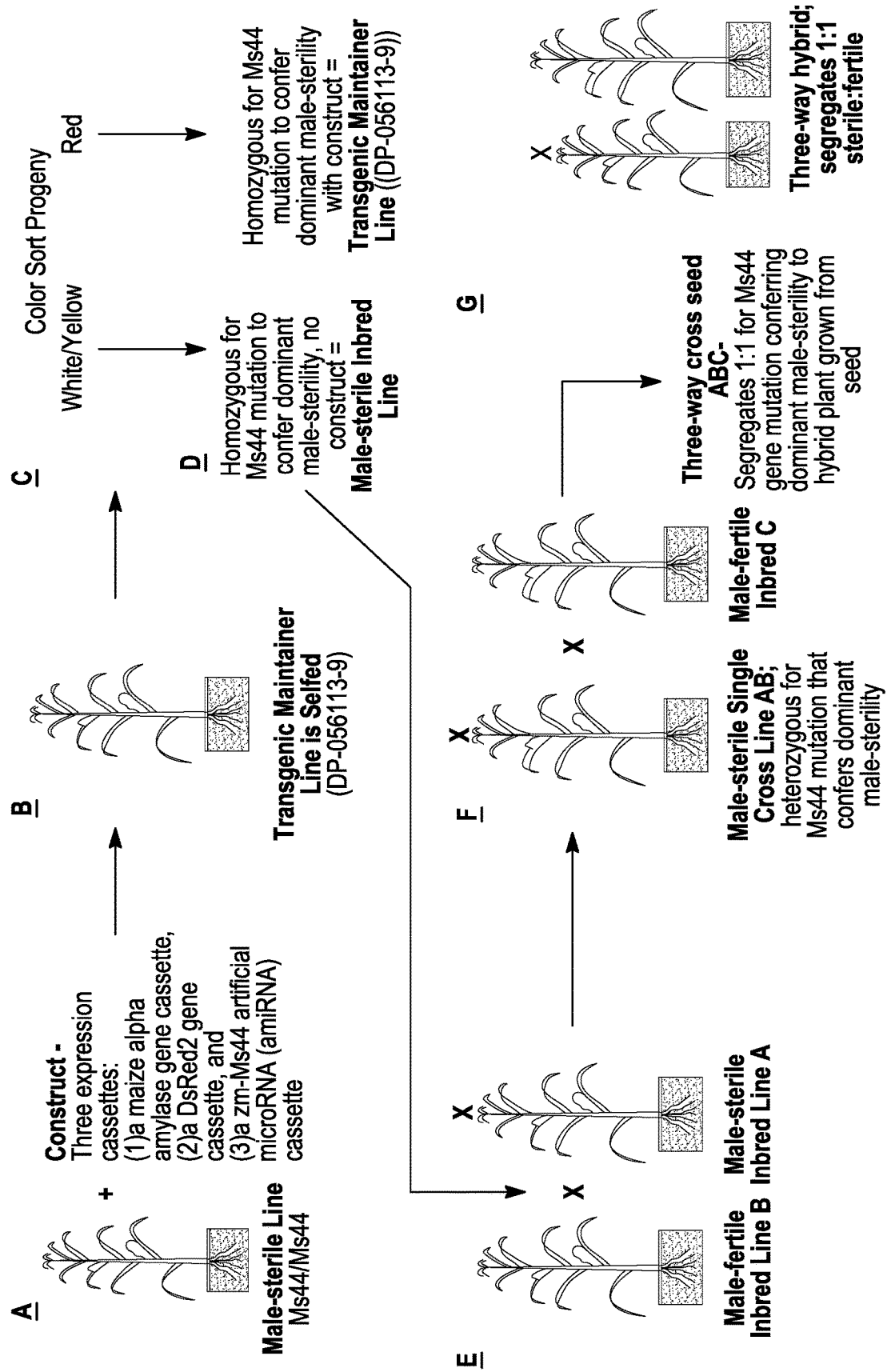
FIG. 6 illustrates one embodiment of a method for producing male-sterile maize hybrid seed/plants using a dominant male-sterility Ms44 gene and the DP56113 SPTA maintainer (event DP56113).

In other embodiments, the Male-sterile inbred seed can be increased by crossing the DP56113 SPTA maintainer onto the same male-sterile inbred line also homozygous for the Ms44 gene mutation (FIG. 6, part D). The resulting progeny are male-sterile homozygous Ms44 female inbreds, because the recombinant DNA construct is not passed through the maintainer's pollen to progeny due to the expression of alpha amylase in its pollen.

Example 9: Creation of Hybrid Progeny Using a Threeway Hybrid Cross

In a three-way hybrid production cross, FIG. 6, for example, the Male-fertile Inbred Line B crosses onto Male-sterile Inbred Line A, which is homozygous for the Ms44 mutation which confers dominant male-sterility to Male-sterile Inbred Line A, and no detasseling is required (part E of FIG. 6). This cross results in Male-sterile Single Cross Line AB. This line is heterozygous in its Ms44 allele for the Ms44 mutation that confers dominant male-sterility, and plants produced from those seed will be male-sterile. Male inbred C crosses onto the Male-sterile Single Cross AB, to produce a three-way hybrid seed as shown in part F of FIG. 6. The three-way cross hybrid seed, seed ABC, from this plant will segregate 1:1 male-sterile and male-fertile, that is 1:1 for the Ms44 gene mutation conferring dominant male-sterility.

Example 10: Creation of Hybrid Progeny Using a Single Cross

Figure 7:
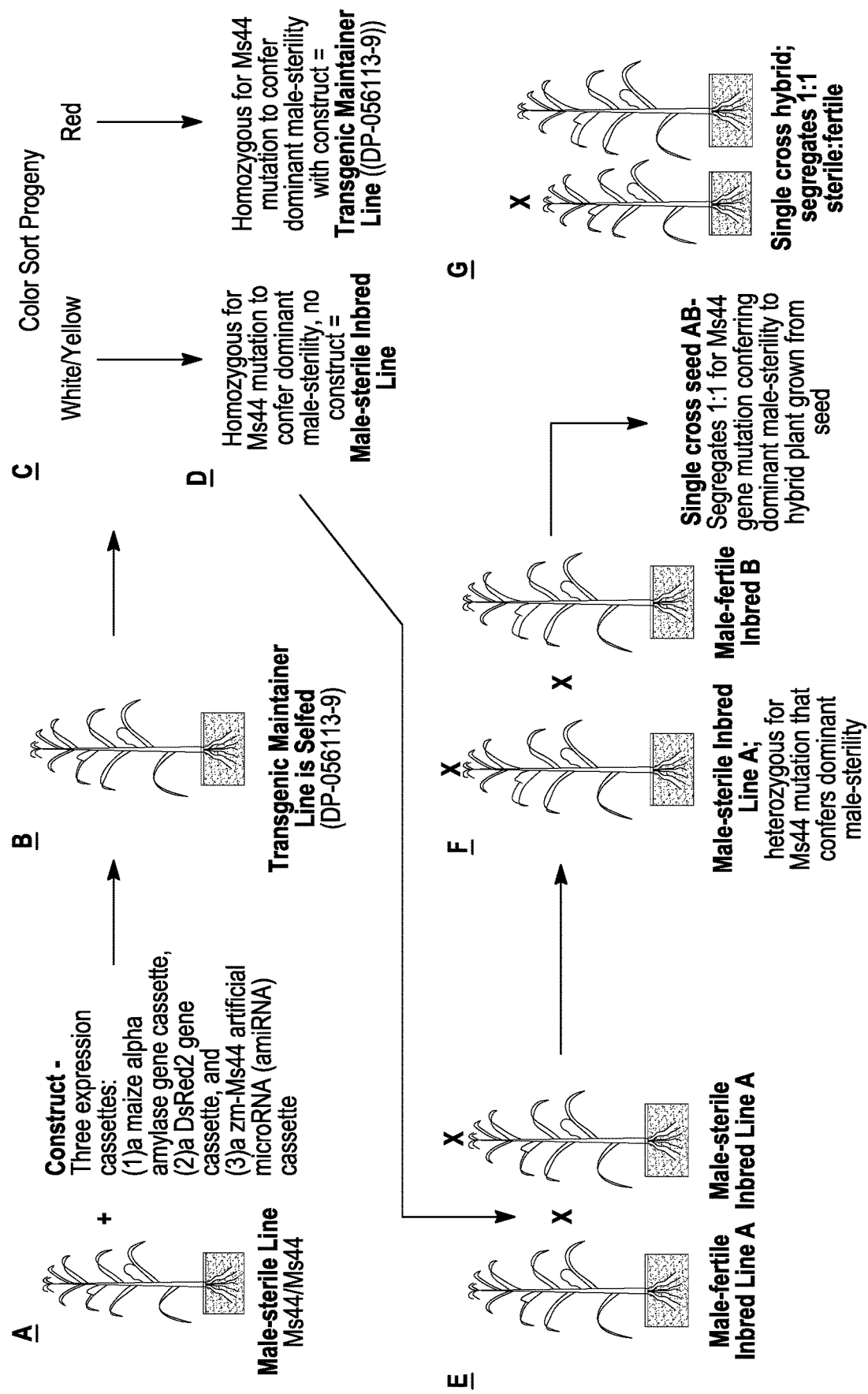
FIG. 7 illustrates one embodiment of a method for producing male-sterile maize hybrid seed/plants using a dominant male-sterility Ms44 gene and the DP56113 SPTA maintainer (event DP56113).

In single cross hybrid production, FIG. 7, for example, the Male-fertile Inbred Line A crosses normally onto the Male-sterile Inbred Line A, which is homozygous for the Ms44 mutation which confers dominant male-sterility to Male-sterile Inbred Line A, and no detasseling is required (part E of FIG. 7). This cross results in Male-sterile Inbred Line A. This line is heterozygous in its Ms44 allele for the Ms44 mutation that confers dominant male-sterility, and plants produced from those seed will be male-sterile. Male-fertile Inbred B crosses onto the Male-Sterile Inbred Line A, to produce a single cross hybrid seed. Hybrid seed, seed AB, from this plant will segregate 1:1 male-sterile and male-fertile, that is 1:1 for the Ms44 gene mutation conferring dominant male-sterility.

REFERENCES

Abendroth L J, Elmore R W, Boyer M J, Marlay S K (2011) Corn Growth and Development. Iowa State University Extension, PMR 1009

Allen R L, Lonsdale D M (1993) Molecular characterization of one of the maize polygalacturonase gene family members which are expressed during late pollen development. The Plant Journal 3: 261-271

An G, Mitra A, Choi H K, Costa M A, An K, Thornburg R W, Ryan C A (1989) Functional Analysis of the 3' Control Region of the Potato Wound-Inducible Proteinase Inhibitor II Gene. The Plant Cell 1: 115-122

Chao S E, Scandalios J G (1971) Alpha-Amylase of Maize: Differential Allelic Expression at the AMY-1 Gene Locus, and Some Physicochemical Properties of the Isozymes. Genetics 69: 47-61

Cheo D L, Titus S A, Byrd D R N, Hartley J L, Temple G F, Brasch M A (2004) Concerted Assembly and Cloning of Multiple DNA Segments Using In Vitro Site-Specific Recombination: Functional Analysis of Multi-Segment Expression Clones. Genome Research 14: 2111-2120

Christensen A H, Sharrock R A, Quail P H (1992) Maize polyubiquitin genes: structure, thermal perturbation of expression and transcript splicing, and promoter activity following transfer to protoplasts by electroporation. Plant Molecular Biology 18: 675-689

Dale E C, Ow D W (1990) Intra- and intramolecular site-specific recombination in plant cells mediated by bacteriophage P1 recombinase. Gene 91: 79-85

Depicker A, Stachel S, Dhaese P, Zambryski P, Goodman H M (1982) Nopaline Synthase: Transcript Mapping and DNA Sequence. Journal of Molecular and Applied Genetics 1: 561-573

Eckes P, Rosahl S, Schell J, Willmitzer L (1986) Isolation and characterization of a light-inducible, organ-specific gene from potato and analysis of its expression after tagging and transfer into tobacco and potato shoots. Molecular and General Genetics 205: 14-22

Fox T, DeBruin J, Haug Collet K, Trimnell M, Clapp J, Leonard A, Li B, Scolaro E, Collinson S, Glassman K, Miller M, Schussler J, Dolan D, Liu L, Gho C, Albertsen M, Loussaert D, Shen B (2017) A single point mutation in Ms44 results in dominant male sterility and improves nitrogen use efficiency in maize. Plant Biotechnology Journal 15: 942-952

Franck A, Guilley H, Jonard G, Richards K, Hirth L (1980) Nucleotide sequence of cauliflower mosaic virus DNA. Cell 21: 285-294

Hartley J L, Temple G F, Brasch M A (2000) DNA Cloning Using In Vitro Site-Specific Recombination. Genome Research 10: 1788-1795

Hershey H P, Stoner T D (1991) Isolation and characterization of cDNA clones for RNA species induced by substituted benzenesulfonamides in corn. Plant Molecular Biology 17: 679-690

Katzen F (2007) Gateway® recombinational cloning: a biological operating system. Expert Opinion on Drug Discovery 2: 571-589

Kay R, Chan A, Daly M, McPherson J (1987) Duplication of CaMV 35S Promoter Sequences Creates a Strong Enhancer for Plant Genes. Science 236: 1299-1302

Keil M, Sanchez-Serrano J, Schell J, Willmitzer L (1986) Primary structure of a proteinase inhibitor II gene from potato (*Solanum tuberosum*). Nucleic Acids Research 14: 5641-5650

Komari T, Hiei Y, Saito Y, Murai N, Kumashiro T (1996) Vectors carrying two separate T-DNAs for co-transformation of higher plants mediated by *Agrobacterium tumefaciens* and segregation of transformants free from selection markers. The Plant Journal 10: 165-17

Lowe K, Wu E, Wang N, Hoerster G, Hastings C, Cho M-J, Scelonge C, Lenderts B, Chamberlin M, Cushatt J, Wang L, Ryan L, Khan T, Chow-Yiu J, Hua W, Yu M, Banh J, Bao Z, Brink K, Igo E, Rudrappa B, Shamseer P, Bruce W, Newman L, Shen B, Zheng P, Bidney D, Falco C, Register J, Zhao Z-Y, Xu D, Jones T, Gordan-Kamm W (2016) Morphogenic Regulators Baby boom and Wuschel Improve Monocot Transformation. The Plant Cell 28: 1998-2015

Mayer K F X, Schoof H, Haecker A, Lenhard M, Jürgens G, Laux T (1998) Role of WUSCHEL in Regulating Stem Cell Fate in the *Arabidopsis* Shoot Meristem. Cell 95: 805-815

McGonigle B, inventor, Down-regulation of gene expression using artificial microRNAs. U.S. patent application Ser. No. 12/335,704

Nishiguchi R, Takanami M, Oka A (1987) Characterization and sequence determination of the replicator region in the hairy-root-inducing plasmid pRiA 4b. Molecular and General Genetics 206: 1-8

Schnable P S, Ware D, Fulton R S, Stein J C, Wei F, Pasternak S, Liang C, Zhang J, Fulton L, Graves T A, Minx P, Reily A D, Courtney L, Kruchowski S S, Tomlinson C, Strong C, Delehaunty K, Fronick C, Courtney B, Rock S M, Belter E, Du F, Kim K, Abbott R M, Cotton M, Levy A, Marchetto P, Ochoa K, Jackson S M, Gillam B, Chen W, Yan L, Higginbotham J, Cardenas M, Waligorski J, Applebaum E, Phelps L, Falcone J, Kanchi K, Thane T, Scimone A, Thane N, Henke J, Wang T, Ruppert J, Shah N, Rotter K, Hodges J, Ingenthron E, Cordes M, Kohlberg S, Sgro J, Delgado B, Mead K, Chinwalla A, Leonard S, Crouse K, Collura K, Kudrna D, Currie J, He R, Angelova A, Rajasekar S, Mueller T, Lomeli R, Scara G, Ko A, Delaney K, Wissotski M, Lopez G, Campos D, Braidotti M, Ashley E, Golser W, Kim H, Lee S, Lin J, Dujmic Z, Kim W, Talag J, Zuccolo A, Fan C, Sebastian A, Kramer M, Spiegel L, Nascimento L, Zutavern T, Miller B, Ambroise C, Muller S, Spooner W, Narechania A, Ren L, Wei S, Kumari S, Faga B, Levy M J, McMahan L, Van Buren P, Vaughn M W, Ying K, Yeh C-T, Emrich S J, Jia Y, Kalyanaraman A, Hsia A-P, Barbazuk W B, Baucom R S, Brutnell T P, Carpita N C, Chaparro C, Chia J-M, Deragon J-M, Estill J C, Fu Y, Jeddeloh J A, Han Y, Lee H, Li P, Lisch D R, Liu S, Liu Z, Nagel D H, McCann M C, SanMiguel P, Myers A M, Nettleton D, Nguyen J, Penning B W, Ponnala L, Schneider K L, Schwartz D C, Sharma A, Soderlund C, Springer N M, Sun Q, Wang H, Waterman M, Westerman R, Wolfgruber T K, Yang L, Yu Y, Zhang L, Zhou S, Zhu Q, Bennetzen J L, Dawe R K, Jiang J, Jiang N, Presting G G, Wessler S R, Aluru S, Martienssen R A, Clifton S W, McCombie W R, Wing R A, Wilson R K (2009) The B73 Maize Genome: Complexity, Diversity, and Dynamics. Science 326: 1112-1115

Sullivan T D, Strelow L I, Illingworth C A, Phillips R L, Nelson Jr O E (1991) Analysis of Maize Brittle-1 Alleles and a Defective Suppressor-Mutator-Induced Mutable Allele. The Plant Cell 3: 1337-1348

Tomizawa J-I, Ohmori H, Bird R E (1977) Origin of replication of colicin E1 plasmid DNA. Proceedings of the National Academy of Sciences 74: 1865-1869

Vilardell J, Goday A, Freire M A, Torrent M, Martinez M C, Torne J M, Pages M (1990) Gene sequence, developmental expression, and protein phosphorylation of RAB-17 in maize. Plant Molecular Biology 14: 423-432

Zastrow-Hayes G M, Lin H, Sigmund A L, Hoffman J L, Alarcon C M, Hayes K R, Richmond T A, Jeddeloh J A, May G D, Beatty M K (2015) Southern-by-Sequencing: A Robust Screening Approach for Molecular Characterization of Genetically Modified Crops. The Plant Genome 8: 1-15

Zhao Z-y, Gu W, Cai T, Tagliani L, Hondred D, Bond D, Schroeder S, Rudert M, Pierce D (2001) High throughput genetic transformation mediated by *Agrobacterium tumefaciens* in maize. Molecular Breeding 8: 323-333

What is claimed is:

1. A corn plant, seed, cell or part thereof comprising event DP-056113-9, wherein a representative sample of seed of said corn event has been deposited with American Type Culture Collection (ATCC) with Accession No. PTA-126589, wherein the event comprises the nucleotide sequence set forth in SEQ ID NO: 7 and SEQ ID NO: 8.

2. The corn plant, seed, cell or part thereof of claim 1, wherein the event comprises the nucleotide sequence set forth in SEQ ID NO: 9 and SEQ ID NO: 10.

3. The corn plant, seed, cell or part thereof of claim 1, wherein the event comprises the nucleotide sequence set forth in SEQ ID NO: 11 and SEQ ID NO: 12.

4. The corn plant, seed, cell or part thereof of claim 1, wherein the event comprises the nucleotide sequence set forth in SEQ ID NO: 13 or SEQ ID NO: 14.

5. The corn plant, seed, cell, or plant part of claim 1, wherein the plant part is selected from the group consisting of pericarp, pollen, ovule, flower, grain, shoot, root, stalk, silk, tassel, ear, and leaf tissue.

6. A corn plant, seed, cell or part thereof comprising event DP-056113-9, wherein a representative sample of seed of said corn event has been deposited with American Type Culture Collection (ATCC) with Accession No. PTA-126589.

7. The corn plant, seed, cell, or plant part of claim 6, wherein the plant part is selected from the group consisting of pericarp, pollen, ovule, flower, grain, shoot, root, stalk, silk, tassel, ear, and leaf tissue.

8. A corn seed comprising event DP-056113-9, wherein said seed comprises a nucleotide sequence selected from the group consisting of SEQ ID NOS: 7, 8, 9, 10, 11, 12, 13, 14 and a combination thereof, wherein a representative sample of corn event DP-056113-9 seed of has been deposited with American Type Culture Collection (ATCC) with Accession No. PTA-126589.

* * * * *

SEQUENCE LISTING

```
<160> NUMBER OF SEQ ID NOS: 40

<210> SEQ ID NO 1
<211> LENGTH: 16
<212> TYPE: DNA
<213> ORGANISM: Artificial Sequence
<220> FEATURE:
<223> OTHER INFORMATION: primer

<400> SEQUENCE: 1
ccccagcccc cacaag                                                      16

<210> SEQ ID NO 2
<211> LENGTH: 27
<212> TYPE: DNA
<213> ORGANISM: Artificial Sequence
<220> FEATURE:
<223> OTHER INFORMATION: primer

<400> SEQUENCE: 2
gttaatatcg tagacataat ggccctc                                          27

<210> SEQ ID NO 3
<211> LENGTH: 17
<212> TYPE: DNA
<213> ORGANISM: Artificial Sequence
<220> FEATURE:
<223> OTHER INFORMATION: probe

<400> SEQUENCE: 3
accatggtcc cccagat                                                     17

<210> SEQ ID NO 4
<211> LENGTH: 103
<212> TYPE: DNA
<213> ORGANISM: Artificial Sequence
<220> FEATURE:
<223> OTHER INFORMATION: amplicon

<400> SEQUENCE: 4
ccccagcccc cacaagacga ggcaaccatg gtccccccaga tttgctagga caccgccgta    60
cccacacccc ggatcagtta atatcgtaga cataatggcc ctc                      103

<210> SEQ ID NO 5
<211> LENGTH: 20081
```

```
<212> TYPE: DNA
<213> ORGANISM: Artificial Sequence
<220> FEATURE:
<223> OTHER INFORMATION: T-DNA

<400> SEQUENCE: 5
gtttacccgc caatatatcc tgtcaaacac tgatagttta aactgaaggc gggaaacgac      60
aatctgatca tgagcggaga attaagggag tcacgttatg accccgccg atgacgcggg     120 acaagccgtt ttacgtttgg aactgacaga accgcaacgt tgaaggagcc actcagcaag    180
ctggtacgat tgtaatacga ctcactatag ggcgaattga gcgctgttta aacgctcttc    240
aactggaaga gcggttacta ccggctggat ggcggggcct tgatcgtgca ccgccggcgt    300
ccggactaac taactagtcg agctagttac cctatgaggt gacatgaagc gctcacggtt    360
actatgacgg ttagcttcac gactgttggt ggcagtagcg tacgacttag ctatagttcc    420
ggacttaccc ttaagataac ttcgtatagc atacattata cgaagttatg ggcccaccgg    480
ttacgtaacg cgttccggaa cactgatagt ttaaactgaa ggcgggaaac gacaatctga    540
tcatgagcgg agaattaagg gagtcacgtt atgacccccg ccgatgacgc gggacaagcc    600
gttttacgtt tggaactgac agaaccgcaa cgattgaagg agccactcag ccgcgggttt    660
ctggagttta atgagctaag cacatacgtc agaaaccatt attgcgcgtt caaaagtcgc    720
ctaaggtcac tatcagctag caaatatttc ttgtcaaaaa tgctccactg acgttccata    780
aattcccctc ggtatccaat tagagtctca tattcactct cccggcggat ctcgactcta    840
gaggatcgct caggaaggcc gctgagatag agccatggcg ccaatgcgg gcggcggtgg    900 agcgggagga ggcagcggca gcggcagcgt ggctgcgccg gcggtgtgcc gccccagcgg    960
ctcgcggtgg acgccgacgc cggagcagat caggatgctg aaggagctct actacgctg   1020 cggcatccgg tcgcccagct cggagcagat ccagcgcatc accgccatgc tgcggcagca   1080
cggcaagatc gagggcaaga acgtcttcta ctggttccag aaccacaagg cccgcgagcg   1140
ccagaagcgc cgcctcacca gcctcgacgt caacgtgccc gccgccggcg cggccgacgc   1200
caccaccagc caactcggcg tcctctcgct gtcgtcgccg ccgccttcag gcgcggcgcc   1260
tccctcgccc accctcggct tctacgccgc cggcaatggc ggcggatcgg ctgtgctgct   1320
ggacacgagt tccgactggg gcagcagcgg cgctgctatg ccaccgaga catgcttcct   1380 gcaggactac atgggcgtga cggacacggg cagctcgtcg cagtggccac gcttctcgtc   1440
gtcggacacg ataatggcgg cggccgcggc gcgggcggcg acgacgcggg cgcccgagac   1500
gctccctctc ttcccgacct gcggcgacga cggcggcagc ggtagcagca gctacttgcc   1560
gttctggggt gccgcgtcca caactgccgg cgccacttct tccgttgcga tccaacagca   1620
acaccagctg caggagcagt acagctttta cagcaacagc aacagcaccc agctggccgg   1680
caccggcaac caagacgtat cggcaacagc agcagcagcc gccgccctgg agctgagcct   1740
cagctcatgt tgctcccctt accctgctgc agggagtatg tgagcaac gcgagctgcc    1800 actgctcttc actgatgtct ctggaatgga aggaggagga agtgagcata gcgttggtgc   1860
gttgctgtca agggcgaatt gtaccacatg gttaacctag acttgtccat cttctggatt   1920
ggccaactta attaatgtat gaaataaaag gatgcacaca tagtgacatg ctaatcacta   1980
taatgtgggc atcaaagttg tgtgttatgt gtaattacta gttatctgaa taaaagagaa   2040
agagatcatc catatttctt atcctaaatg aatgtcacgt gtctttataa ttctttgatg   2100
aaccagatgc atttcattaa ccaaatccat atacatataa atattaatca tatataatta   2160
```

-continued

```
atatcaattg ggttagcaaa acaaatctag tctaggtgtg ttttgcgggt accatttaaa    2220
ttgcgcccgc cacggccgtg gaggtcgtat tccggtcagc ttgcatccct gcagtgcagc    2280
gtgacccggt cgtgcccctc tctagagata atgagcattg catgtctaag ttataaaaaa    2340
ttaccacata ttttttttgt cacacttgtt tgaagtgcag tttatctatc tttatacata    2400
tatttaaact ttactctacg aataatataa tctatagtac tacaataata tcagtgtttt    2460
agagaatcat ataaatgaac agttagacat ggtctaaagg acaattgagt attttgacaa    2520
caggactcta cagttttatc ttttttagtgt gcatgtgttc tccttttttt ttgcaaatag    2580
cttcacctat ataatacttc atccatttta ttagtacatc catttagggt ttagggttaa    2640
tggtttttat agactaattt ttttagtaca tctatttat tctatttag cctctaaatt      2700 aagaaaacta aaactctatt ttagtttttt tatttaataa tttagatata aaatagaata    2760
aaataaagtg actaaaaatt aaacaaatac cctttaagaa attaaaaaaa ctaaggaaac    2820 attttttcttg tttcgagtag ataatgccaa cctgttaaac gccgtcgacg agtctaacgg   2880
acaccaacca gcgaaccagc agcgtcgcgt cgggccaagc gaagcagacg gcacggcatc    2940
tctgtcgctg cctctggacc cctctcgaga gttccgctcc accgttggac ttgctccgct    3000
gtcggcatcc agaaattgcg tggcggagcg gcagacgtga gccggcacgg caggcggcct    3060
cctcctcctc tcacggcacc ggcagctacg ggggattcct ttcccaccgc tccttcgctt    3120
tcccttcctc gcccgccgta ataaatagac ccccctcca caccctcttt ccccaacctc     3180
gtgttgttcg gagcgcacac acacacaacc agatctcccc caaatccacc cgtcggcacc    3240
tccgcttcaa ggtacgccgc tcgtcctccc ccccccccct ctctaccttc tctagatcgg    3300
cgttccggtc catgcatggt tagggcccgg tagttctact tctgttcatg tttgtgttag    3360
atccgtgttt gtgttagatc cgtgctgcta gcgttcgtac acggatgcga cctgtacgtc    3420
agacacgttc tgattgctaa cttgccagtg tttctctttg gggaatcctg ggatggctct    3480
agccgttccg cagacgggat cgatttcatg atttttttg tttcgttgca tagggtttgg     3540
tttgcccttt tccttatttt caatatatgc cgtgcacttg tttgtcgggt catcttttca    3600 tgctttttt tgtcttggtt gtgatgatgt ggtctggttg ggcggtcgtt ctagatcgga     3660
gtagaattct gtttcaaact acctggtgga tttattaatt ttggatctgt atgtgtgtgc    3720
catacatatt catagttacg aattgaagat gatggatgga aatatcgatc taggataggt    3780
atacatgttg atgcgggttt tactgatgca tatacagaga tgcttttgt tcgcttggtt     3840 gtgatgatgt ggtgtggttg ggcggtcgtt cattcgttct agatcggagt agaatactgt    3900
ttcaaactac ctggtgtatt tattaatttt ggaactgtat gtgtgtgtca tacatcttca    3960
tagttacgag tttaagatgg atggaaatat cgatctagga taggtataca tgttgatgtg    4020
ggttttactg atgcatatac atgatggcat atgcagcatc tattcatatg ctctaacctt    4080
gagtacctat ctattataat aaacaagtat gttttataat tattttgatc ttgatatact    4140
tggatgatgg catatgcagc agctatatgt ggattttttt agccctgcct tcatacgcta    4200
tttatttgct tggtactgtt tcttttgtcg atgctcaccc tgttgtttgg tgttacttct    4260
gcaggtcgac tctagaggat ccatggccac tgtgaacaac tggctcgctt tctccctctc    4320
cccgcaggag ctgccgccct cccagacgac ggactccaca ctcatctcgg ccgccaccgc    4380
cgaccatgtc tccggcgatg tctgcttcaa catcccccaa gattggagca tgagggatc     4440 agagctttcg gcgctcgtcg cggagccgaa gctggaggac ttcctcggcg gcatctcctt    4500
ctccgagcag catcacaagg ccaactgcaa catgataccc agcactagca gcacagtttg    4560
```

```
ctacgcgagc tcaggtgcta gcaccggcta ccatcaccag ctgtaccacc agcccaccag    4620
ctcagcgctc cacttcgcgg actccgtaat ggtggcttcc tcggccggtg tccacgacgg    4680
cggtgccatg ctcagcgcgg ccgccgctaa cggtgtcgct ggcgctgcca gtgccaacgg    4740
cggcggcatc gggctgtcca tgattaagaa ctggctgcgg agccaaccgg cgcccatgca    4800
gccgagggtg gcggcggctg agggcgcgca ggggctctct ttgtccatga acatggcggg    4860
gacgacccaa ggcgctgctg gcatgccact tctcgctgga gagcgcgcac gggcgcccga    4920
gagtgtatcg acgtcagcac agggtggagc cgtcgtcgtc acggcgccga aggaggatag    4980
cggtggcagc ggtgttgccg gcgctctagt agccgtgagc acggacacgg gtggcagcgg    5040
cggcgcgtcg gctgacaaca cggcaaggaa gacggtggac acgttcgggc agcgcacgtc    5100
gatttaccgt ggcgtgacaa ggcatagatg gactgggaga tatgaggcac atctttggga    5160
taacagttgc agaagggaag ggcaaactcg taagggtcgt caagtctatt taggtggcta    5220
tgataaagag gagaaagctg ctagggctta tgatcttgct gctctgaagt actggggtgc    5280
cacaacaaca acaaattttc cagtgagtaa ctacgaaaag gagctcgagg acatgaagca    5340
catgacaagg caggagtttg tagcgtctct gagaaggaag agcagtggtt tctccagagg    5400
tgcatccatt tacaggggag tgactaggca tcaccaacat ggaagatggc aagcacggat    5460
tggacgagtt gcagggaaca aggatcttta cttgggcacc ttcagcaccc aggaggaggc    5520
agcggaggcg tacgacatcg cggcgatcaa gttccgcggc ctcaacgccg tcaccaactt    5580
cgacatgagc cgctacgacg tgaagagcat cctggacagc agcgccctcc ccatcggcag    5640
cgccgccaag cgcctcaagg aggccgaggc cgcagcgtcc gcgcagcacc accacgccgg    5700
cgtggtgagc tacgacgtcg gccgcatcgc ctcgcagctc ggcgacgcg gagccctggc    5760 ggcggcgtac ggcgcgcact accacggcgc cgcctggccg accatcgcgt tccagccggg    5820
cgccgccagc acaggcctgt accacccgta cgcgcagcag ccaatgcgcg gcggcgggtg    5880
gtgcaagcag gagcaggacc acgcggtgat cgcggccgcg cacagcctgc aggacctcca    5940
ccacctgaac ctgggcgcgg ccggcgcgca cgacttttc tcggcagggc agcaggccgc    6000
cgccgctgcg atgcacggcc tgggtagcat cgacagtgcg tcgctcgagc acagcaccgg    6060
ctccaactcc gtcgtctaca acggcgggt cggcgacagc aacggcgcca gcgccgtcgg    6120
cggcagtggc ggtggctaca tgatgccgat gagcgctgcc ggagcaacca ctacatcggc    6180
aatggtgagc cacgagcagg tgcatgcacg ggcctacgac gaagccaagc aggctgctca    6240
gatggggtac gagagctacc tggtgaacgc ggagaacaat ggtggcggaa ggatgtctgc    6300
atgggggact gtcgtgtctg cagccgcggc ggcagcagca agcagcaacg acaacatggc    6360
cgccgacgtc gggcatggcg gcgcgcagct cttcagtgtc tggaacgaca cttaagcgta    6420
cgtgccggcc tggctctccg aaagggcgta ttccagcaca ctggcggccg ttactagacc    6480
caacctagac ttgtccatct tctgattggg ccaacttaat taatgtatga aataaaagga    6540
tgcacacata gtgacatgct aatcactata atgtgggcat caaagttgtg tgttatgtgt    6600
aattactagt tatctgaata aaagagaaag agatcatcca tatttcttat cctaaatgaa    6660
tgtcacgtgt ctttataatt ctttgatgaa ccagatgcat tcattaacc aaatccatat    6720 acatataaat attaatcata tataattaat atcaattggg ttagcaaaac aaatctagtc    6780
taggtgtgtt ttgcgaatgc ggcctccggg ggctgcagga attcgatcgc gtctatagta    6840
ttttaaaatt gcattaacaa acatgtccta attggtactc ctgagatact ataccctcct    6900
```

-continued

```
gttttaaaat agttggcatt atcgaattat cattttactt tttaatgttt tctcttcttt    6960
taatatattt tatgaatttt aatgtatttt aaaatgttat gcagttcgct ctggactttt    7020
ctgctgcgcc tacacttggg tgtactgggc ctaaattcag cctgaccgac cgcctgcatt    7080
gaataatgga tgagcaccgg taaaatccgc gtacccaact ttcgagaaga accgagacgt    7140
ggcgggccgg gccaccgacg cacggcacca gcgactgcac acgtcccgcc ggcgtacgtg    7200
tacgtgctgt tccctcactg gccgcccaat ccactcatgc atgcccacgt acacccctgc    7260
cgtggcgcgc ccagatccta atcctttcgc cgttctgcac ttctgctgcc tataaatggc    7320
ggcatcgacc gtcacctgct tcaccaccgg cgagccacat cgagaacacg atcgagcaca    7380
caagcacgaa gactcgttta ggagaaacca caaaccacca agccgtgcaa gcaccaggct    7440
tgggcacccg ctccgggctt agaaggccag cttcaagttt gtacaaaaaa gcaggcttcg    7500
aaggagatag aaccgatcca ccatgtccaa cctgctcacg gttcaccaga accttccggc    7560
tcttccagtg gacgcgacgt ccgatgaagt caggaagaac ctcatggaca tgttccgcga    7620
caggcaagcg ttcagcgagc acacctggaa gatgctgctc tccgtctgcc gctcctgggc    7680
tgcatggtgc aagctgaaca acaggaagtg gttccccgct gagcccgagg acgtgaggga    7740
ttaccttctg tacctgcaag cgcgaggttt gtttctgctt ctacctttga tatatatata    7800
ataattatca ttaattagta gtaatataat atttcaaata ttttttttcaa aataaaagaa    7860 tgtagtatat agcaattgct tttctgtagt ttataagtgt gtatatttta atttataact    7920
tttctaatat atgaccaaaa catggtgatg cctaggtctg gcagtgaaga ccatccagca    7980
acaccttgga caactgaaca tgcttcacag gcgctccggc ctcccgcgcc ccagcgactc    8040
gaacgccgtg agcctcgtca tgcgccgcat caggaaggaa aacgtcgatg ccggcgaaag    8100
ggcaaagcag gccctcgcgt tcgagaggac cgatttcgac caggtccgca gcctgatgga    8160
gaacagcgac aggtgccagg acattaggaa cctggcgttc ctcggaattg catcaacac    8220 gctcctcagg atcgcggaaa ttgcccgcat tcgcgtgaag gacattagcc gcaccgacgg    8280
cggcaggatg cttatccaca ttggcaggac caagacgctc gtttccaccg caggcgtcga    8340
aaaggccctc agcctcggag tgaccaagct cgtcgaacgc tggatctccg tgtccggcgt    8400
cgcggacgac ccaaacaact acctcttctg ccgcgtccgc aagaacgggg tggctgcccc    8460
tagcgccacc agccaactca gcacgagggc cttggaaggt atttttcgagg ccacccaccg    8520 cctgatctac ggcgcgaagg atgacagcgg tcaacgctac ctcgcatggt ccgggcactc    8580
cgcccgcgtt ggagctgcta gggacatggc ccgcgccggt gtttccatcc ccgaaatcat    8640
gcaggcgggt ggatggacga acgtgaacat tgtcatgaac tacattcgca accttgacag    8700
cgagacgggc gcaatggttc gcctcctgga agatggtgac tgagctagac ccagcttttct    8760 tgtacaaagt ggccgttaac ggatgcagac ttgtccatct tctggattgg ccaacttaat    8820
taatgtatga aataaaagga tgcacacata gtgacatgct aatcactata atgtgggcat    8880
caaagttgtg tgttatgtgt aattactagt tatctgaata aaagagaaag agatcatcca    8940
tatttcttat cctaaatgaa tgtcacgtgt ctttataatt ctttgatgaa ccagatgcat    9000
ttcattaacc aaatccatat acatataaat attaatcata tataattaat atcaattggg    9060
ttagcaaaac aaatctagtc taggtgtgtt ttgcgaatgc ggccacgcgt tcgcgaggcc    9120
ggccggtacc gtcatttacc tccggatacg taataacttc gtatagcata cattatacga    9180
agttatacct ggagctcgtt taaacgctct tcaactggaa gagcggttac cagagctggt    9240
cacctttgtc caccaagatg gaactggcgc gcctcattaa ttaagtcagc ggccgctcta    9300
```

```
gttgaagaca cgttcatgtc ttcatcgtaa gaagacactc agtagtcttc ggccagaatg    9360
gccatctgga ttcagcaggc ctagaaggcc atttaaatcc tgaggatctg gtcttcctaa    9420
ggacccggga tatcgctatc aactttgtat agaaagttg ggccgaattc gagctcggta     9480
cggccagaat ggcccggacc gggttaccga attcgagctc ggtaccggcg cgccgcggcc    9540
gctctagaac tagtggatcc cccgtccgat atcccgggtc cttaggaaga ccagatcctc    9600
aggatttggc cgcgtcgacg tggagatata ggggaaagag aacgctgatg tgacaagtga    9660
gtgagatata gggggagaaa tttaggggga acgccgaaca cagtctaaag tagcttggga    9720
cccaaagcac tctgttcggg ggttttttt tttgtctttc aacttttgc tgtaatgtta      9780 ttcaaaataa gaaagcact tggcatggct aagaaataga gttcaacaac tgaacagtac    9840
agtgtattat caatggcata aaaacaacc cttacagcat tgccgtattt tattgatcaa     9900
acattcaact caacactgac gagtggtctt ccaccgatca acggactaat gctgctttgt    9960
cagatctcaa ggaaaagacg ttatgcagtg tcgtgctgct gtgtttgcaa tgcagcacaa   10020
gactgagcaa tctgagctgc tagaggtggc gccccgccgg gacgcggagg ctcgctttct   10080
cccagacgca gtagtccttg ccgtgcgccg ccgggtggaa atccgacggg accacgctgc   10140
tcacgccgta ccttgtcccg atcttcacca tgaccttctc gtcgacgacg ccacgtacg    10200 cgtccgcgtc cgccacgagg atcgcagct tgctcccggc gcggatgccg ttccgcgccc    10260
tgatggcaga cagcgtggat atctcctgct tcaggttcca gtcgaacatg tggtcgtaga   10320
aaatgcaggg gactcctgga tgggtgagga tgtaggcgta gccctgcatg accttgtcgg   10380
atgggaacgg ccagagcttc tgcgtcgacc cggtgtcatg gttgtcgacg aaggtgacgg   10440
ccttctcggg cgcccacccg atcaggccgg ccgcgttgcc ggagctgtcg cgcagccgcc   10500
acagctcccc ctgcacgccc gcctgcagca ggcccttggt ggggaagtcg aacgccatgg   10560
cgggcccgcc gacggccgc gtccagtcca gcagctcctg ccggcactgg tcctggttgg    10620
gcgccggctt gccgtccccg ctgtagctca gcagttcca tatctccgcg acgacgaagc    10680
tcggcggccc cgtgctctcc acgtacattc tggcgacggc cggcgagtag cccttggcga   10740
agtcgaggcg ccagccgtcg aaccccacgg cgtcggacct gagccagttg agccaggcgg   10800
agagctcccg ctgcacgcgc gggttgaggt ggtcgatgtc gggcgccgcc gcgaacccct   10860
cgcccgtgtc gcggtgcccc gtcccgtccg agtactgcgt gtcgtcgctg cagatcatcc   10920
cggggcccca gtccaggcgg tcgtcgggag tcccgccctc gaagatgcag tacacgccgc   10980
gcgcgtcctt cttttccgcg caccggtggt tgatgacgat gtccgccacg cactgcacgc   11040
ccctgccgtg gaacgccgct atcagggact tgagctccgc cgccgtgccg tacttggacg   11100
cgtccaggtc gtataggcgg cctggcatgt agccttgtgg cgagacggag tgcgagggtg   11160
gaggcagcca gacgtgcgtg acgccggcct tggcgatgtc gtcgacctgg gccttgagcc   11220
tgttgtacca gcctccctgc tgcttgcacg actcccagtt aaaccctgg aagaggactt    11280 gtgcctggac caggccgcag gccgcccgga cgaccttggg atcgggctcc cgcgggtcgc    11340
gccccgccgg gacgcccggg cacacgttga ggccgacgct ggcgaacatc gcccggcgag   11400
ggaactcgag gccgccggtc ttgccacctc gtggcttcca agggaatgcc accgccggga    11460
cctgcaatga cgaccagctc tccttgctcc tcgtcaccat cgtcgtcact gccattgtcg   11520
ccgccatggt gtcgtgatcg atgctttatt cgtgtctctt gttgcctggg cactaggacc   11580
tataaatacc attgttctgc tgataaaatt agtgcgctat atgtatggct tggacaccat   11640
```

```
gcctttgcat cgctattttt agggcagact tcttgtcctc aaactcttca tgcattattt    11700
ggacccttca gaagtaacca ctaaccaccg tggaaagcat aaattaaata acaaaagaaa    11760
gaatgaacaa tgccaacatt taaactatac tctactatct tatatatatc ttggtattac    11820
taattgaagg ttctaataga gcctctggat taattttcac tctattatta attcaggacc    11880
caattgagcc tttatgttaa ttctcatcag acatgataaa aaattaaaaa atatcataaa    11940
ttcttagatt aattagaaat atctggccat taaacaagag actctaaatt atacataact    12000
attagatcct gaaggaccaa aaaagtgatc aaatggggtg aataggtcta tgttgagcaa    12060
cctctcggct ttgaagatag tgagtaccct aaccatgttt ataaactctc aaaggcgctt    12120
tatgggctca agcaagcccc aacagcatgg tatgaatgcc taagagattt tcttatcact    12180
aatggcttca gagtcagtaa agccgatcct actctctttta ctaaaaccat ttcaaaagtt    12240
ttgtttgtat gccaaatttta tgttgatgat attatatttg ggtctactaa caaatctact    12300
tgtgaagagt ttagtaggat catgattccg aaattcgaga tgtctatgat ggggaagttg    12360
aaatattttc taggatttca agtcaagcaa ctccaagatg gcaccttcat cagccaaaca    12420
aagtacattc aagacatact caacaagttt ggaatgaagg atgccaagcc catcaggaca    12480
cccatgggaa ctaatgggca tctcgacctc gacacgggag gtaaatccgt agaccaaaag    12540
gtataccggt cgatgatagg atctttactc tatttatgtg catctcgacc agatagtatg    12600 cttttctatat gcatgtgtgc aagattccaa gccgatccta aggaagttca ccttagggcc    12660
gtgaaaagaa tcatgagata tttagtttac actcctaaat ttggtctttg gtaccccaag    12720
ggatccacct ttgatttaat aggatattca gatgccgatt gggcagggtg taaaattgat    12780
aggaagagca catcagggac ttgtcagttt ctagggagat ccctggtgtc ttggacttca    12840
aagaaacaaa actcaatagc tctttctacc gccgaagcca agtatattgc cgcaggacat    12900
tgttgtgtgc aattactttg gatgaggcaa aaccttaggg actatggcta caaattgagc    12960
aaagtccctc tcctatgtga caatgagagt gctatctgca tggcggataa tcccgttgaa    13020
cacagccgca ctaagcacat agacattcgg tatcactttt tgagggatca ccaacaaagg    13080
ggtgatatcg agattgctta tgttagcacc aaagaacaat tagtcgatat ctttaccaaa    13140
ccattagatg ataaaaacctt tagcaaactt aggaatgagc taaatattct tgattctcga    13200
aactttgatt gaaacattac acacatagct catttgtata cctttgatca tatctctttc    13260
gtggctacga ctaatgtgtt ttcaagtgta tttctatgct aagtcgtaga ttgaaaggga    13320
aatggagtct tcggcgaaga caaggcttcc actccactct aacggtatcg tttatccttc    13380
gccgtcactc cgcatcactg tccaaatttg gtataatctt tcactcatat ttcatttacc    13440
aatggggaga agtataaaat ggctcacaaa gtctccgttt ttggcgatta atgccaaagg    13500
gggagaaata ttaagcccaa agcaaaagga ccgcaccacc acttttttgaa attttttaaa    13560 ttggtatgtt taatttcaaa ttggtatgtt gattttcaat tggtatattt tcaaaattag    13620
catctaaata tatttccaat tgatatctat ttaaaaccct cttgaaagct aagaggagaa    13680
ttttattcag ggggagtttt gtttagtcaa aggaaaagca tttgaaacag ggggagaaat    13740
ttcaaatctt gaaaatgctt cttacaatct tattcatata cctttgacta tttgcaaaag    13800
actttgaaaa agaatttcca aaaagatttg caaaaaacaa aacaagtggt gcaaatgtgg    13860
tccaaaatgt taaaataaaa gaaagcaacc atgcatatca agtaaaagta taaattgatt    13920
taattctaag taacctatgc acttaccttta tgcaaactag ttcaattctg cacttatata    13980
ttttctttgg tttgtgttgg catcaatcac caaaaagggg gagattgaaa gggaaataag    14040
```

```
gtttaacctt ttcctataaa taattttggt ggttgaatgc ccaacacaaa tgattggact   14100
aactagtttg ttctagatta tatattccac aggtgcataa aggttcaaca caaaccaata   14160
aacgatcaaa gttagggttc aaaagcaaag gagcaaagga accgaagggt gccctgatct   14220
ggcacaccgg actgtctggt atgccaccag acagtgtccg gtgcagatcc tctagagtcg   14280
acctgcaggc atgcaagctt ggtcacccgg tccgggccta aaggccagc ttcaagtttg    14340 tacaaaaaag caggctccgg ccagaatggc ccggaccggg ttaccgaatt cccatggagt   14400
caaagattca aatagaggac ctaacagaac tcgccgtaaa gactggcgaa cagttcatac   14460
agagtctctt acgactcaat gacaagaaga aaatcttcgt caacatggtg gagcacgaca   14520
cgcttgtcta ctccaaaaat atcaaagata cagtctcaga agaccaaagg gcaattgaga   14580
cttttcaaca aagggtaata tccggaaacc tcctcggatt ccattgccca gctatctgtc   14640
actttattgt gaagatagtg gaaaggaag gtggctccta caaatgccat cattgcgata    14700
aaggaaaggc catcgttgaa gatgcctctg ccgacagtgg tcccaaagat ggaccccac    14760 ccacgaggag catcgtggaa aaagaagacg ttccaaccac gtcttcaaag caagtggatt   14820
gatgtgatat ctccactgac gtaagggatg acgcacaatc ccactaagct gaccgaagct   14880
ggccgctcta gaactagtgg atctcgatgt gtagtctacg agaagggtta accgtctctt   14940
cgtgagaata accgtggcct aaaaataagc cgatgaggat aaataaaatg tggtggtaca   15000
gtacttcaag aggtttactc atcaagagga tgcttttccg atgagctcta gtagtacatc   15060
ggacctcaca tacctccatt gtggtgaaat attttgtgct catttagtga tgggtaaatt   15120
ttgtttatgt cactctaggt tttgacattt cagttttgcc actcttaggt tttgacaaat   15180
aatttccatt ccgcggcaaa agcaaaacaa ttttatttta cttttaccac tcttagcttt   15240
cacaatgtat cacaaatgcc actctagaaa ttctgtttat gccacagaat gtgaaaaaaa   15300
acactcactt atttgaagcc aaggtgttca tggcatggaa atgtgacata aagtaacgtt   15360
cgtgtataag aaaaaattgt actcctcgta acaagagacg gaaacatcat gagacaatcg   15420
cgtttggaag gctttgcatc acctttggat gatgcgcatg aatggagtcg tctgcttgct   15480
agccttcgcc taccgcccac tgagtccggg cggcaactac catcggcgaa cgacccagct   15540
gacctctacc gaccggactt gaatgcgcta ccttcgtcag cgacgatggc gcgtacgct    15600 ggcgacgtgc ccccgcatgc atggcggcac atggcgagct cagaccgtgc gtggctggct   15660
acaaatacgt accccgtgag tgccctagct agaaacttac acctgcaact gcgagagcga   15720
gcgtgtgagt gtagccgagt agatccccg ggctgcaggt cgactctaga ggatccaccg    15780
gtcgccacca tggcctcctc cgagaacgtc atcaccgagt tcatgcgctt caaggtgcgc   15840
atggagggca ccgtgaacgg ccacgagttc gagatcgagg gcgagggcga gggccgcccc   15900
tacgagggcc acaacaccgt gaagctgaag gtgacgaagg gcggcccct gcccttcgcc    15960 tgggacatcc tgtcccccca gttccagtac ggctccaagg tgtacgtgaa gcaccccgcc   16020
gacatccccg actacaagaa gctgtccttc cccgagggct tcaagtggga gcgcgtgatg   16080
aacttcgagg acggcggcgt ggcgaccgtg acccaggact cctccctgca ggacggctgc   16140
ttcatctaca aggtgaagtt catcggcgtg aacttcccct ccgacggccc cgtgatgcag   16200
aagaagacca tgggctggga ggcctccacc gagcgcctgt accccgcga cggcgtgctg     16260 aagggcgaga cccacaaggc cctgaagctg aaggacggcg ccactacct ggtggagttc    16320 aagtccatct acatggccaa gaagcccgtg cagctgcccg gctactacta cgtggacgcc   16380
```

```
aagctggaca tcacctccca caacgaggac tacaccatcg tggagcagta cgagcgcacc   16440
gagggccgcc accacctgtt cctgtagcgg cccatggata ttcgaacgcg taggtaccac   16500
atggttaacc tagacttgtc catcttctgg attggccaac ttaattaatg tatgaaataa   16560
aaggatgcac acatagtgac atgctaatca ctataatgtg ggcatcaaag ttgtgtgtta   16620
tgtgtaatta ctagttatct gaataaaaga gaaagagatc atccatattt cttatcctaa   16680
atgaatgtca cgtgtcttta taattctttg atgaaccaga tgcatttcat taaccaaatc   16740
catatacata taaatattaa tcatatataa ttaatatcaa ttgggttagc aaaacaaatc   16800
tagtctaggt gtgttttgcg aatgcggccg ccaccgcggt ggagctcgaa ttcgagctcg   16860
gtaccctggg atccgatatc gatgggccct ggccgaagct tggtcacccg gtccgggcct   16920
agaaggccga tctcccgggc acccagcttt cttgtacaaa gtggccgtta acggatcggc   16980
cagaatggcc cggaccgggt taccgaattc gccctttgtt gttgctcatc ggtcgtcgga   17040
ctcttaatag ccggctttag gatattgtcc ggggagatat cggtgtgatc tttagaaccg   17100
gccatttgat ggcctgagtt ctagtagatc tagacacatt tccccaacgg agtcgccaaa   17160
aagtgtgttg gcgccgatcc aggcgcgaaa cactggagat ggaccgtttg gcggtgttct   17220
ctgcggaggt gaggacggtc cgcgacctgg cgcagcagcg actctcctct acgtgtgtcc   17280
ggacggtccg cgtctgggggc tcggacggtc cgcgatggcg cagagggtct tcttcttcgc   17340
agccgaccta gatctcgcct cccgggaggg accccgtcgg ggaggagaga ttgtagggtg   17400
tgtcttggcg tcgacaggcc acacaatacg cctctagtcg acgtagagcc gaagagaggt   17460
gaaggattga ggtagaagga ggctaaaactt gggctaaact agaactactg ctaatgcata   17520
aggtaaaaac gagaagtgga cttcatttga tcgattgtgg aaggtttaat cgactgtagc   17580
cctttatcta tataagggg aggtatggac ccgttacaag ctgtttccg agctaatctc   17640 acggttttag ttaataaatc ctgcgagaaa ctcggaactc taactgattc tactcatgcg   17700
cgaaccattc gtgccgccac cgctgcccgt ccggctacgc tcagttaacc ctgtgttgtg   17760
cgctgtgatt tggtggcata taaaaccaca tttgcaataa aaatttgtag ggatttaaca   17820
taccaagtgc tgcggaaagg aatcgttttc ggaggaccca aaattaaaga ggcagatgct   17880
agagctcgtc cagctcagcg ctgagcacct gtgttgtctt cctcgtccac gccggcggag   17940
atgaacggca acaaaggcgg aaaggccgag acgctgagct caaggacgtg acaccgcgcg   18000
tacctcgcgt tcagttggct cacacaacag cagctcgctc gccccaagct cccgcgtcct   18060
gatccgtagg tgagccatgc aaaggtcgcc gcgcgcccctg atccattgca cccttcaaag   18120
ctcgaaccta caaatagcgt gcaccaggca tcctggccac acccacacag caagccagca   18180
gagcagaaag cagccgcagc cccagccccc acaagacgag gcaaccatgg tcccccagat   18240
ttgctaggac accgccgtac ccacacccccg gatcagttaa tatcgtagac ataatggccc   18300
tccctgccat ctcttattcc tctcccctcc tgcatcatgc atgcagcagg ctgtgctgtg   18360
gacctgatcg agtttcaatt gatccaagca agcaagaggg caggagggca gaggaataag   18420
aaattgcaga gagagaccag tcgttgatcg gtcggagatc tccccgaatc gatctcgatc   18480
ggccggaatt ttgggggccg gccgggaggt ggatgatggg gggtgattac catctaggcg   18540
gcgccgtgtt ggatgatgta ccaacatatc actataggct actttgggaa cctcagatcc   18600
ccttcgggat tggaggaaat tgagatggaa atgaactaat ttcttctcta accccccttca  18660 atcacgaagg ggattcgagt ttccaaacta gccctatata tatcagagct agggagggat   18720
attgctgcaa catgcatcac gaggtacaga tatataatta gggttctgct gcaatgttttt  18780
```

| | | | | |
|---|---|---|---|---|
| gactatagat | cgttagtgat | ctgctgtaat | taataataat | ggtgatctcg aagcaattct | 18840 |
| aaacatcata | gtagcaggcc | caggtacctt | cgaagttaac | gcttattaat cttatgtttt | 18900 |
| cctgcggttc | gtgttcacca | tgcagccgct | tgaagcaggg | acctggcacg cgtgctgcaa | 18960 |
| tggatggcag | gaggggagag | gaataagaag | tgtttccatt | tcacagtgag agcagtcgag | 19020 |
| ctccaacgtt | gtcgtcgtcg | tcgtcttctt | cttttgatat | tcagactctg tcttgcggtc | 19080 |
| tatatcatca | gcataataat | aataaaataa | gtaaaaccaa | accatgcatg accatgctat | 19140 |
| acatgttgcg | agttccagcg | agacggttaa | ctataatgac | tgcaacaaag gattctgttc | 19200 |
| gttttgacac | gtgatcacgt | aagaataccg | ctcaggagac | caaacgggat ggtctaaacc | 19260 |
| actatctcca | aagtaaacca | tactcaagtc | ttaaaaccgc | aagagctaca gttgttctga | 19320 |
| aatctgaatg | tagaactgcc | catctgcaca | gtcagatcga | aacacctccg tttcagagca | 19380 |
| cagaagatgg | cgacgggatc | tctagagatc | agtaatcatt | caaccgctgc agtattttca | 19440 |
| tgaacacacg | ccaggcacga | tctaaatgac | cgattttata | agtgcatata ctactcgacc | 19500 |
| ataactccag | aaccttgtac | tctacgcaga | cggttttttct | aggaacagag cttcctgctt | 19560 |
| gctagtgaga | ccgagatcgc | tcagtgacat | ctggctctcc | aattcagtga aggcacgcct | 19620 |
| gggataagac | ctcgcctgtc | caaagaaaaa | gggcgaattc | gagctcggta ccctgggatc | 19680 |
| cgatatcgat | gggccctggc | cgaagcttgg | tcaccggtc | cgggcctaga aggccagctt | 19740 |
| cggccgcccc | gggcaacttt | attatacaaa | gttgatagat | atctggtcta actaactagt | 19800 |
| cctaaggacc | cggcggaccg | attaaactga | ttcggtccga | agcttaagcc atggcccggg | 19860 |
| aatcttagcg | gccgcctgca | gagttaacgg | cgcgccgact | agctagctaa ggtaccgagc | 19920 |
| tcgaattcat | tccgattaat | cgtggcctct | tgctcttcag | gatgaagagc tatgtttaaa | 19980 |
| cgtgcaagcg | ctactagaca | attcagtaca | ttaaaaacgt | ccgcaatgtg ttattaagtt | 20040 |
| gtctaagcgt | caatttgttt | acaccacaat | atatcctgcc | a | 20081 |

<210> SEQ ID NO 6
<211> LENGTH: 11336
<212> TYPE: DNA
<213> ORGANISM: Artificial Sequence
<220> FEATURE:
<223> OTHER INFORMATION: Insert DNA

<400> SEQUENCE: 6

| | | | | |
|---|---|---|---|---|
| tcaaacactg | atagtttaaa | ctgaaggcgg | gaaacgacaa | tctgatcatg agcggagaat | 60 |
| taagggagtc | acgttatgac | ccccgccgat | gacgcgggac | aagccgtttt acgtttggaa | 120 |
| ctgacagaac | cgcaacgttg | aaggagccac | tcagcaagct | ggtacgattg taatacgact | 180 |
| cactataggg | cgaattgagc | gctgtttaaa | cgctcttcaa | ctggaagagc ggttactacc | 240 |
| ggctggatgg | cggggccttg | atcgtgcacc | gccggcgtcc | ggactaacta actagtcgag | 300 |
| ctagttaccc | tatgaggtga | catgaagcgc | tcacggttac | tatgacggtt agcttcacga | 360 |
| ctgttggtgg | cagtagcgta | cgacttagct | atagttccgg | acttacccttt aagataactt | 420 |
| cgtatagcat | acattatacg | aagttatacc | tggagctcgt | ttaaacgctc ttcaactgga | 480 |
| agagcggtta | ccagagctgg | tcacctttgt | ccaccaagat | ggaactggcg cgcctcatta | 540 |
| attaagtcag | cggccgctct | agttgaagac | acgttcatgt | cttcatcgta agaagacact | 600 |
| cagtagtctt | cggccagaat | ggccatctgg | attcagcagg | cctagaaggc catttaaatc | 660 |
| ctgaggatct | ggtcttccta | aggacccggg | atatcgctat | caactttgta tagaaaagtt | 720 |

```
gggccgaatt cgagctcggt acggccagaa tggcccggac cgggttaccg aattcgagct    780
cggtaccggc gcgccgcggc cgctctagaa ctagtggatc ccccgtccga tatcccgggt    840
ccttaggaag accagatcct caggatttgg ccgcgtcgac gtggagatat aggggaaaga    900
gaacgctgat gtgacaagtg agtgagatat aggggagaa atttagggg aacgccgaac    960
acagtctaaa gtagcttggg acccaaagca ctctgttcgg gggtttttt ttttgtcttt   1020
caacttttg ctgtaatgtt attcaaaata agaaaagcac ttggcatggc taagaaatag   1080
agttcaacaa ctgaacagta cagtgtatta tcaatggcat aaaaaacaac ccttacagca   1140
ttgccgtatt ttattgatca acattcaac tcaacactga cgagtggtct tccaccgatc   1200
aacggactaa tgctgctttg tcagatctca aggaaaagac gttatgcagt gtcgtgctgc   1260
tgtgtttgca atgcagcaca agactgagca atctgagctg ctagaggtgg cgccccgccg   1320
ggacgcggag gctcgctttc tcccagacgc agtagtcctt gccgtgcgcc gccgggtgga   1380
aatccgacgg gaccacgctg ctcacgccgt accttgtccc gatcttcacc atgaccttct   1440
cgtcgacgac ggccacgtac gcgtccgcgt ccgccacgag gatccgcagc ttgctcccgg   1500
cgcggatgcc gttccgcgcc ctgatggcag acagcgtgga tatctcctgc ttcaggttcc   1560
agtcgaacat gtggtcgtag aaaatgcagg ggactcctgg atgggtgagg atgtaggcgt   1620
agccctgcat gaccttgtcg gatgggaacg ccagagctt ctgcgtcgac ccggtgtcat   1680
ggttgtcgac gaaggtgacg gccttctcgg gcgcccaccc gatcaggccg gccgcgttgc   1740
cggagctgtc gcgcagccgc cacagctccc cctgcacgcc cgcctgcagc aggcccttgg   1800
tggggaagtc gaacgccatg gcgggcccgc cgacggcccg cgtccagtcc agcagctcct   1860
gccggcactg gtcctggttg ggcgccggct tgccgtcccc gctgtagctc agcgagttcc   1920
atatctccgc gacgacgaag ctcggcgcc ccgtgctctc cacgtacatt ctggcgacgg   1980
ccggcgagta gcccttggcg aagtcgaggc gccagccgtc gaaccccacg gcgtcggacc   2040
tgagccagtt gagccaggcg gagagctccc gctgcacgcg cggggtgagg tggtcgatgt   2100
cgggcgccgc cgcgaacccc tcgcccgtgt cgcggtgccc cgtcccgtcc gagtactgcg   2160
tgtcgtcgct gcagatcatc ccggggcccc agtccaggcg gtcgtcggga gtcccgccct   2220
cgaagatgca gtacacgccg cgcgcgtcct tcttttccgc gcaccggtgg ttgatgacga   2280
tgtccgccac gcactgcacg cccctgccgt ggaacgccgc tatcagggac ttgagctccg   2340
ccgccgtgcc gtacttggac gcgtccaggt cgtataggcg gcctggcatg tagccttgtg   2400
gcgagacgga gtgcgagggt ggaggcagcc agacgtgcgt gacgccggcc ttggcgatgt   2460
cgtcgacctg ggccttgagc ctgttgtacc agcctccctg ctgcttgcac gactcccagt   2520
taaacccctg gaagaggact tgtgcctgga ccaggccgca ggccgcccgg acgaccttgg   2580
gatcgggctc ccgcgggtcg cgccccgccg ggacgcccgg gcacacgttg aggccgacgc   2640
tggcgaacat cgcccggcga gggaactcga ggccgccggt cttgccacct cgtggcttcc   2700
aagggaatgc caccgccggg acctgcaatg acgaccagct ctccttgctc ctcgtcacca   2760
tcgtcgtcac tgccattgtc gccgccatgg tgtcgtgatc gatgctttat tcgtgtctct   2820
tgttgcctgg gcactaggac ctataaatac cattgttctg ctgataaaat tagtgcgcta   2880
tatgtatggc ttggacacca tgcctttgca tcgctatttt tagggcagac ttcttgtcct   2940
caaactcttc atgcattatt tggacccttc agaagtaacc actaaccacc gtggaaagca   3000
taaattaaat aacaaagaa agaatgaaca atgccaacat ttaaactata ctctactatc   3060
ttatatatat cttggtatta ctaattgaag gttctaatag agcctctgga ttaattttca   3120
```

```
ctctattatt aattcaggac ccaattgagc ctttatgtta attctcatca gacatgataa      3180
aaaattaaaa aatatcataa attcttagat taattagaaa tatctggcca ttaaacaaga      3240
gactctaaat tatacataac tattagatcc tgaaggacca aaaaagtgat caaatggggt      3300
gaataggtct atgttgagca acctctcggc tttgaagata gtgagtaccc taaccatgtt      3360
tataaactct caaaggcgct ttatgggctc aagcaagccc caacagcatg gtatgaatgc      3420
ctaagagatt ttcttatcac taatggcttc agagtcagta aagccgatcc tactctcttt      3480
actaaaacca tttcaaaagt tttgtttgta tgccaaattt atgttgatga tattatattt      3540
gggtctacta caaatctac ttgtgaagag tttagtagga tcatgattcc gaaattcgag      3600
atgtctatga tggggaagtt gaaatatttt ctaggatttc aagtcaagca actccaagat      3660
ggcaccttca tcagccaaac aaagtacatt caagacatac tcaacaagtt tggaatgaag      3720
gatgccaagc ccatcaggac acccatggga actaatgggc atctcgacct cgacacggga      3780
ggtaaatccg tagaccaaaa ggtataccgg tcgatgatag gatctttact ctatttatgt      3840
gcatctcgac cagatagtat gctttctata tgcatgtgtg caagattcca agccgatcct      3900
aaggaagttc accttagggc cgtgaaaaga atcatgagat atttagttta cactcctaaa      3960
tttggtcttt ggtaccccaa gggatccacc tttgatttaa taggatattc agatgccgat      4020
tgggcagggt gtaaaattga taggaagagc acatcaggga cttgtcagtt tctaggagaa      4080
tccctggtgt cttggacttc aaagaaacaa aactcaatag ctctttctac cgccgaagcc      4140
aagtatattg ccgcaggaca ttgttgtgtg caattacttt ggatgaggca aaaccttagg      4200
gactatggct acaaattgag caaagtccct ctcctatgtg acaatgagag tgctatctgc      4260
atggcggata tcccgttga acacagccgc actaagcaca tagacattcg gtatcacttt      4320
ttgagggatc accaacaaag gggtgatatc gagattgctt atgttagcac caaagaacaa      4380
ttagtcgata tctttaccaa accattagat gataaaacct ttagcaaact taggaatgag      4440
ctaaatattc ttgattctcg aaactttgat tgaaacatta cacacatagc tcatttgtat      4500
acctttgatc atatctcttt cgtggctacg actaatgtgt tttcaagtgt atttctatgc      4560
taagtcgtag attgaaaggg aaatggagtc ttcggcgaag acaaggcttc cactccactc      4620
taacggtatc gtttatcctt cgccgtcact ccgcatcact gtccaaattt ggtataatct      4680
ttcactcata tttcatttac caatggggag aaagtataaa tggctcacaa agtctccgtt      4740
tttggcgatt aatgccaaag ggggagaaat attaagccca agcaaaagg accgcaccac      4800 cacttttga aatttttaa attggtatgt ttaatttcaa attggtatgt tgattttcaa      4860
ttggtatatt ttcaaaatta gcatctaaat atatttccaa ttgatatcta tttaaaaccc      4920
tcttgaaagc taagaggaga attttattca gggggagttt tgtttagtca aaggaaaagc      4980
atttgaaaca gggggagaaa tttcaaatct tgaaaatgct tcttacaatc ttattcatat      5040
acctttgact atttgcaaaa gactttgaaa aagaatttcc aaaagatttt gcaaaaaaca      5100
aaacaagtgg tgcaaatgtg gtccaaaatg ttaaaataaa agaaagcaac catgcatatc      5160
aagtaaaagt ataaattgat ttaattctaa gtaacctatg cacttacctt atgcaaacta      5220
gttcaattct gcacttatat attttctttg gtttgtgttg gcatcaatca ccaaaaaggg      5280
ggagattgaa agggaaataa ggtttaacct tttcctataa ataattttgg tggttgaatg      5340
cccaacacaa atgattggac taactagttt gttctagatt atatattcca caggtgcata      5400
aaggttcaac acaaaccaat aaacgatcaa agttagggtt caaaagcaaa ggagcaaagg      5460
```

```
aaccgaaggg tgccctgatc tggcacaccg gactgtctgg tatgccacca gacagtgtcc    5520
ggtgcagatc ctctagagtc gacctgcagg catgcaagct tggtcacccg gtccgggcct    5580
agaaggccag cttcaagttt gtacaaaaaa gcaggctccg gccagaatgg cccggaccgg    5640
gttaccgaat tccatggag tcaaagattc aaatagagga cctaacgaaa ctcgccgtaa    5700
agactggcga acagttcata cagagtctct tacgactcaa tgacaagaag aaaatcttcg    5760
tcaacatggt ggagcacgac acgcttgtct actccaaaaa tatcaaagat acagtctcag    5820
aagaccaaag ggcaattgag acttttcaac aaagggtaat atccggaaac ctcctcggat    5880
tccattgccc agctatctgt cactttattg tgaagatagt ggaaaaggaa ggtggctcct    5940
acaaatgcca tcattgcgat aaaggaaagg ccatcgttga agatgcctct gccgacagtg    6000
gtcccaaaga tggaccccca cccacgagga gcatcgtgga aaagaagac gttccaacca    6060
cgtcttcaaa gcaagtggat tgatgtgata tctccactga cgtaagggat gacgcacaat    6120
cccactaagc tgaccgaagc tggccgctct agaactagtg gatctcgatg tgtagtctac    6180
gagaagggtt aaccgtctct tcgtgagaat aaccgtggcc taaaaataag ccgatgagga    6240
taaataaaat gtggtggtac agtacttcaa gaggtttact catcaagagg atgcttttcc    6300
gatgagctct agtagtacat cggacctcac atacctccat tgtggtgaaa tatttttgtgc    6360
tcatttagtg atgggtaaat tttgtttatg tcactctagg ttttgacatt tcagttttgc    6420
cactcttagg ttttgacaaa taatttccat tccgcggcaa aagcaaaaca atttttattt    6480
acttttacca ctcttagctt tcacaatgta tcacaaatgc cactctagaa attctgttta    6540
tgccacagaa tgtgaaaaaa aacactcact tatttgaagc caaggtgttc atggcatgga    6600
aatgtgacat aaagtaacgt tcgtgtataa gaaaaaattg tactcctcgt aacaagagac    6660
ggaaacatca tgagacaatc gcgttttgaa ggctttgcat caccttttgga tgatgcgcat    6720
gaatggagtc gtctgcttgc tagccttcgc ctaccgccca ctgagtccgg gcggcaacta    6780
ccatcggcga acgacccagc tgacctctac cgaccggact tgaatgcgct accttcgtca    6840
gcgacgatgg ccgcgtacgc tggcgacgtg cccccgcatg catggcggca catggcgagc    6900
tcagaccgtg cgtggctggc tacaaatacg taccccgtga gtgccctagc tagaaactta    6960
cacctgcaac tgcgagagcg agcgtgtgag tgtagccgag tagatccccc gggctgcagg    7020
tcgactctag aggatccacc ggtcgccacc atggcctcct ccgagaacgt catcaccgag    7080
ttcatgcgct tcaaggtgcg catggagggc accgtgaacg gccacgagtt cgagatcgag    7140
ggcgagggcg agggccgccc ctacgagggc cacaacaccg tgaagctgaa ggtgacgaag    7200
ggcggccccc tgcccttcgc ctgggacatc ctgtcccccc agttccagta cggctccaag    7260
gtgtacgtga agcaccccgc cgacatcccc gactacaaga agctgtcctt ccccgagggc    7320
ttcaagtggg agcgcgtgat gaacttcgag gacggcggcg tggcgaccgt gacccaggac    7380
tcctcctgc aggacggctg cttcatctac aaggtgaagt tcatcggcgt gaacttcccc    7440
tccgacggcc ccgtgatgca gaagaagacc atgggctggg aggcctccac cgagcgcctg    7500
tacccccgcg acggcgtgct gaagggcgag acccacaagg ccctgaagct gaaggacggc    7560
ggccactacc tggtggagtt caagtccatc tacatggcca gaagcccgt gcagctgccc    7620
ggctactact acgtggacgc caagctggac atcacctccc acaacgagga ctacaccatc    7680
gtggagcagt acgagcgcac cgagggccgc caccacctgt tcctgtagcg gcccatggat    7740
attcgaacgc gtaggtacca catggttaac ctagacttgt ccatcttctg gattggccaa    7800
cttaattaat gtatgaaata aaaggatgca cacatagtga catgctaatc actataatgt    7860
```

```
gggcatcaaa gttgtgtgtt atgtgtaatt actagttatc tgaataaaag agaaagagat    7920
catccatatt tcttatccta aatgaatgtc acgtgtcttt ataattcttt gatgaaccag    7980
atgcatttca ttaaccaaat ccatatacat ataaatatta atcatatata attaatatca    8040
attgggttag caaaacaaat ctagtctagg tgtgttttgc gaatgcggcc gccaccgcgg    8100
tggagctcga attcgagctc ggtaccctgg gatccgatat cgatgggccc tggccgaagc    8160
ttggtcaccc ggtccgggcc tagaaggccg atctcccggg cacccagctt tcttgtacaa    8220
agtggccgtt aacggatcgg ccagaatggc ccggaccggg ttaccgaatt cgcccttgt    8280 tgttgctcat cggtcgtcgg actcttaata gccggcttta ggatattgtc cggggagata    8340
tcggtgtgat ctttagaacc ggccatttga tggcctgagt tctagtagat ctagacacat    8400
ttccccaacg gagtcgccaa aaagtgtgtt ggcgccgatc caggcgcgaa acactggaga    8460
tggaccgttt ggcggtgttc tctgcggagg tgaggacggt ccgcgacctg cgcagcagc    8520 gactctcctc tacgtgtgtc cggacggtcc gcgtctgggg ctcggacggt ccgcgatggc    8580
gcagagggtc ttcttcttcg cagccgacct agatctcgcc tcccgggagg accccgtcg    8640 gggaggagag attgtagggt gtgtcttggc gtcgacaggc cacacaatac gcctctagtc    8700
gacgtagagc cgaagagagg tgaaggattg aggtagaagg aggctaaact tgggctaaac    8760
tagaactact gctaatgcat aaggtaaaaa cgagaagtgg acttcatttg atcgattgtg    8820
gaaggtttaa tcgactgtag ccctttatct atataaaggg gaggtatgga cccgttacaa    8880
gctgtttccc gagctaatct cacggttta gttaataaat cctgcgagaa actcggaact    8940
ctaactgatt ctactcatgc gcgaaccatt cgtgccgcca ccgctgcccg tccggctacg    9000
ctcagttaac cctgtgttgt gcgctgtgat ttggtggcat ataaaaccac atttgcaata    9060
aaaatttgta gggatttaac ataccaagtg ctgcggaaag gaatcgtttt cggaggaccc    9120
aaaattaaag aggcagatgc tagagctcgt ccagctcagc gctgagcacc tgtgttgtct    9180
tcctcgtcca cgccggcgga gatgaacggc aacaaaggcg gaaaggccga gacgctgagc    9240
tcaaggacgt gacaccgcgc gtacctcgcg ttcagttggc tcacacaaca gcagctcgct    9300
cgccccaagc tcccgcgtcc tgatccgtag gtgagccatg caaaggtcgc cgcgcgccct    9360
gatccattgc acccttcaaa gctcgaacct acaaatagcg tgcaccaggc atcctggcca    9420
cacccacaca gcaagccagc agagcagaaa gcagccgcag cccagccc cacaagacga    9480 ggcaaccatg gtcccccaga tttgctagga caccgccgta cccacacccc ggatcagtta    9540
atatcgtaga cataatggcc ctccctgcca tctcttattc ctctcccctc ctgcatcatg    9600
catgcagcag gctgtgctgt ggacctgatc gagtttcaat tgatccaagc aagcaagagg    9660
gcaggagggc agaggaataa gaaattgcag agagagacca gtcgttgatc ggtcggagat    9720
ctccccgaat cgatctcgat cggccggaat tttgggggcc ggccgggagg tggatgatgg    9780
ggggtgatta ccatctaggc ggcgccgtgt tggatgatgt accaacatat cactataggc    9840
tactttggga acctcagatc cccttcggga ttggaggaaa ttgagatgga aatgaactaa    9900
tttcttctct aaccccttc aatcacgaag gggattcgag tttccaaact agccctatat    9960
atatcagagc tagggaggga tattgctgca acatgcatca cgaggtacag atatataatt   10020
agggttctgc tgcaatgttt tgactataga tcgttagtga tctgctgtaa ttaataataa   10080
tggtgatctc gaagcaattc taaacatcat agtagcaggc ccaggtacct tcgaagttaa   10140
cgcttattaa tcttatgttt tcctgcggtt cgtgttcacc atgcagccgc ttgaagcagg   10200
```

-continued

```
gacctggcac gcgtgctgca atggatggca ggaggggaga ggaataagaa gtgtttccat   10260
ttcacagtga gagcagtcga gctccaacgt tgtcgtcgtc gtcgtcttct tcttttgata   10320
ttcagactct gtcttgcggt ctatatcatc agcataataa taataaaata agtaaaacca   10380
aaccatgcat gaccatgcta tacatgttgc gagttccagc gagacggtta actataatga   10440
ctgcaacaaa ggattctgtt cgttttgaca cgtgatcacg taagaatacc gctcaggaga   10500
ccaacacgga tggtctaaac cactatctcc aaagtaaacc atactcaagt cttaaaaccg   10560
caagagctac agttgttctg aaatctgaat gtagaactgc ccatctgcac agtcagatcg   10620
aaacacctcc gtttcagagc acagaagatg gcgacgggat ctctagagat cagtaatcat   10680
tcaaccgctg cagtattttc atgaacacac gccaggcacg atctaaatga ccgattttat   10740
aagtgcatat actactcgac cataactcca gaaccttgta ctctacgcag acggtttttc   10800
taggaacaga gcttcctgct tgctagtgag accgagatcg ctcagtgaca tctggctctc   10860
caattcagtg aaggcacgcc tgggataaga cctcgcctgt ccaaagaaaa agggcgaatt   10920
cgagctcggt accctgggat ccgatatcga tgggccctgg ccgaagcttg gtcacccggt   10980
ccgggcctag aaggccagct tcggccgccc cgggcaactt tattatacaa agttgataga   11040
tatctggtct aactaactag tcctaaggac ccggcggacc gattaaactg attcggtccg   11100
aagcttaagc catggcccgg gaatcttagc ggccgcctgc agagttaacg gcgcgccgac   11160
tagctagcta aggtaccgag ctcgaattca ttccgattaa tcgtggcctc ttgctcttca   11220
ggatgaagag ctatgtttaa acgtgcaagc gctactagac aattcagtac attaaaaacg   11280
tccgcaatgt gttattaagt tgtctaagcg tcaatttgtt tacaccacaa tatatc        11336
```

<210> SEQ ID NO 7
<211> LENGTH: 20
<212> TYPE: DNA
<213> ORGANISM: Artificial Sequence
<220> FEATURE:
<223> OTHER INFORMATION: junction sequence

<400> SEQUENCE: 7 agccggggc tcaaacactg                                                   20

<210> SEQ ID NO 8
<211> LENGTH: 10
<212> TYPE: DNA
<213> ORGANISM: Artificial Sequence
<220> FEATURE:
<223> OTHER INFORMATION: junction sequence

<400> SEQUENCE: 8
atatcgtgta                                                             10

<210> SEQ ID NO 9
<211> LENGTH: 20
<212> TYPE: DNA
<213> ORGANISM: Artificial Sequence
<220> FEATURE:
<223> OTHER INFORMATION: junction sequence

<400> SEQUENCE: 9 agccggggc tcaaacactg                                                   20

<210> SEQ ID NO 10
<211> LENGTH: 30
<212> TYPE: DNA
<213> ORGANISM: Artificial Sequence

```
<220> FEATURE:
<223> OTHER INFORMATION: junction sequence

<400> SEQUENCE: 10
acaccacaat atatcgtgta tatcgttatt                                    30

<210> SEQ ID NO 11
<211> LENGTH: 30
<212> TYPE: DNA
<213> ORGANISM: Artificial Sequence
<220> FEATURE:
<223> OTHER INFORMATION: junction sequence

<400> SEQUENCE: 11
agccgagccg ggggctcaaa cactgatagt                                    30

<210> SEQ ID NO 12
<211> LENGTH: 30
<212> TYPE: DNA
<213> ORGANISM: Artificial Sequence
<220> FEATURE:
<223> OTHER INFORMATION: junction sequence

<400> SEQUENCE: 12
acaccacaat atatcgtgta tatcgttatt                                    30

<210> SEQ ID NO 13
<211> LENGTH: 11355
<212> TYPE: DNA
<213> ORGANISM: Artificial Sequence
<220> FEATURE:
<223> OTHER INFORMATION: junction sequence

<400> SEQUENCE: 13 agccggggc  tcaaacactg  atagtttaaa  ctgaaggcgg  gaaacgacaa  tctgatcatg    60
agcggagaat taagggagtc acgttatgac ccccgccgat gacgcgggac aagccgtttt   120
acgtttggaa ctgacagaac cgcaacgttg aaggagccac tcagcaagct ggtacgattg   180
taatacgact cactataggg cgaattgagc gctgtttaaa cgctcttcaa ctggaagagc   240
ggttactacc ggctggatgg cggggccttg atcgtgcacc gccggcgtcc ggactaacta   300
actagtcgag ctagttaccc tatgaggtga catgaagcgc tcacggttac tatgacggtt   360
agcttcacga ctgttggtgg cagtagcgta cgacttagct atagttccgg acttacccctt  420 aagataactt cgtatagcat acattatacg aagttatacc tggagctcgt ttaaacgctc   480
ttcaactgga agagcggtta ccagagctgg tcacctttgt ccaccaagat ggaactggcg   540
cgcctcatta attaagtcag cggccgctct agttgaagac acgttcatgt cttcatcgta   600
agaagacact cagtagtctt cggccagaat ggccatctgg attcagcagg cctagaaggc   660
catttaaatc ctgaggatct ggtcttccta aggacccggg atatcgctat caactttgta   720
tagaaaagtt gggccgaatt cgagctcggt acggccagaa tggcccggac cgggttaccg   780
aattcgagct cggtaccggc gcgccgcggc cgctctagaa ctagtggatc ccccgtccga   840
tatcccgggt ccttaggaag accagatcct caggatttgg ccgcgtcgac gtggagatat   900 agggaaaga  gaacgctgat  gtgacaagtg  agtgagatat  aggggagaa   atttaggggg   960 aacgccgaac acagtctaaa gtagcttggg acccaaagca ctctgttcgg gggtttttt   1020 ttttgtcttt caacttttg ctgtaatgtt attcaaaata agaaaagcac ttggcatggc   1080
taagaaatag agttcaacaa ctgaacagta cagtgtatta tcaatggcat aaaaaacaac  1140
```

-continued

```
ccttacagca ttgccgtatt ttattgatca aacattcaac tcaacactga cgagtggtct   1200
tccaccgatc aacggactaa tgctgctttg tcagatctca aggaaaagac gttatgcagt   1260
gtcgtgctgc tgtgtttgca atgcagcaca agactgagca atctgagctg ctagaggtgg   1320
cgccccgccg ggacgcggag gctcgctttc tcccagacgc agtagtcctt gccgtgcgcc   1380
gccgggtgga aatccgacgg gaccacgctg ctcacgccgt accttgtccc gatcttcacc   1440
atgaccttct cgtcgacgac ggccacgtac gcgtccgcgt ccgccacgag gatccgcagc   1500
ttgctcccgg cgcggatgcc gttccgcgcc ctgatggcag acagcgtgga tatctcctgc   1560
ttcaggttcc agtcgaacat gtggtcgtag aaaatgcagg ggactcctgg atgggtgagg   1620
atgtaggcgt agccctgcat gaccttgtcg gatgggaacg gccagagctt ctgcgtcgac   1680
ccggtgtcat ggttgtcgac gaaggtgacg gccttctcgg gcgccaccc gatcaggccg   1740 gccgcgttgc cggagctgtc gcgcagccgc cacagctccc cctgcacgcc cgcctgcagc   1800
aggcccttgg tggggaagtc gaacgccatg gcgggcccgc cgacggcccg cgtccagtcc   1860
agcagctcct gccggcactg gtcctggttg ggcgccggct tgccgtcccc gctgtagctc   1920
agcgagttcc atatctccgc gacgacgaag ctcggcggcc ccgtgctctc cacgtacatt   1980
ctggcgacgg ccgcgagta gcccttggcg aagtcgaggc gccagccgtc gaaccccacg   2040
gcgtcggacc tgagccagtt gagccaggcg gagagctccc gctgcacgcg cgggttgagg   2100
tggtcgatgt cgggcgccgc cgcgaacccc tcgcccgtgt cgcggtgccc cgtcccgtcc   2160
gagtactgcg tgtcgtcgct gcagatcatc ccggggcccc agtccaggcg gtcgtcggga   2220
gtcccgccct cgaagatgca gtacacgccg cgcgcgtcct tcttttccgc gcaccggtgg   2280
ttgatgacga tgtccgccac gcactgcacg cccctgccgt ggaacgccgc tatcagggac   2340
ttgagctccg ccgccgtgcc gtacttggac gcgtccaggt cgtataggcg gcctggcatg   2400
tagccttgtg gcgagacgga gtgcgagggt ggaggcagcc agacgtgcgt gacgccggcc   2460
ttggcgatgt cgtcgacctg ggccttgagc ctgttgtacc agcctccctg ctgcttgcac   2520
gactcccagt taaacccctg gaagaggact tgtgcctgga ccaggccgca ggccgcccgg   2580
acgaccttgg gatcgggctc ccgcgggtcg cgccccgccg ggacgccgg gcacacgttg   2640 aggccgacgc tggcgaacat cgcccggcga gggaactcga ggccgccggt cttgccacct   2700
cgtggcttcc aagggaatgc caccgccggg acctgcaatg acgaccagct ctccttgctc   2760
ctcgtcacca tcgtcgtcac tgccattgtc gccgccatgg tgtcgtgatc gatgctttat   2820
tcgtgtctct tgttgcctgg gcactaggac ctataaatac cattgttctg ctgataaaat   2880
tagtgcgcta tatgtatggc ttggacacca tgcctttgca tcgctatttt tagggcagac   2940
ttcttgtcct caaactcttc atgcattatt tggacccttc agaagtaacc actaaccacc   3000
gtggaaagca taaattaaat aacaaaagaa agaatgaaca atgccaacat ttaaactata   3060
ctctactatc ttatatatat cttggtatta ctaattgaag gttctaatag agcctctgga   3120
ttaattttca ctctattatt aattcaggac ccaattgagc ctttatgtta attctcatca   3180
gacatgataa aaaattaaaa aatatcataa attcttagat taattagaaa tatctggcca   3240
ttaaacaaga gactctaaat tatacataac tattagatcc tgaaggacca aaaaagtgat   3300
caaatggggt gaataggtct atgttgagca acctctcggc tttgaagata gtgagtaccc   3360
taaccatgtt tataaactct caaaggcgct ttatgggctc aagcaagccc caacagcatg   3420
gtatgaatgc ctaagagatt ttcttatcac taatggcttc agagtcagta aagccgatcc   3480
tactctcttt actaaaacca tttcaaaagt tttgtttgta tgccaaattt atgttgatga   3540
```

```
tattatattt gggtctacta acaaatctac ttgtgaagag tttagtagga tcatgattcc   3600
gaaattcgag atgtctatga tggggaagtt gaaatatttt ctaggatttc aagtcaagca   3660
actccaagat ggcaccttca tcagccaaac aaagtacatt caagacatac tcaacaagtt   3720
tggaatgaag gatgccaagc ccatcaggac acccatggga actaatgggc atctcgacct   3780
cgacacggga ggtaaatccg tagaccaaaa ggtataccgg tcgatgatag gatctttact   3840
ctatttatgt gcatctcgac cagatagtat gctttctata tgcatgtgtg caagattcca   3900
agccgatcct aaggaagttc accttagggc cgtgaaaaga atcatgagat atttagttta   3960
cactcctaaa tttggtcttt ggtacccaa gggatccacc tttgatttaa taggatattc    4020
agatgccgat tgggcagggt gtaaaattga taggaagagc atcagggac cttgtcagtt    4080 tctagggaga tccctggtgt cttggacttc aaagaaacaa aactcaatag ctcttctac    4140 cgccgaagcc aagtatattg ccgcaggaca ttgttgtgtg caattacttt ggatgaggca   4200
aaaccttagg gactatggct acaaattgag caaagtccct ctcctatgtg acaatgagag   4260
tgctatctgc atggcggata atcccgttga acacagccgc actaagcaca tagacattcg   4320
gtatcacttt ttgagggatc accaacaaag gggtgatatc gagattgctt atgttagcac   4380
caaagaacaa ttagtcgata tctttaccaa accattagat gataaaacct ttagcaaact   4440
taggaatgag ctaaatattc ttgattctcg aaactttgat tgaaacatta cacacatagc   4500
tcatttgtat acctttgatc atatctcttt cgtggctacg actaatgtgt tttcaagtgt   4560
atttctatgc taagtcgtag attgaaaggg aaatggagtc ttcggcgaag acaaggcttc   4620
cactccactc taacggtatc gtttatcctt cgccgtcact ccgcatcact gtccaaattt   4680
ggtataatct ttcactcata tttcatttac caatggggag aaagtataaa tggctcacaa   4740
agtctccgtt tttggcgatt aatgccaaag ggggagaaat attaagccca agcaaaagg    4800 accgcaccac cacttttga aatttttaa attggtatgt ttaatttcaa attggtatgt    4860
tgattttcaa ttggtatatt ttcaaaatta gcatctaaat atatttccaa ttgatatcta   4920 tttaaaccc tcttgaaagc taagaggaga attttattca gggggagttt tgtttagtca    4980
aaggaaaagc atttgaaaca ggggagaaa tttcaaatct tgaaaatgct tcttacaatc    5040
ttattcatat accttttgact atttttgcaaaa gactttgaaa aagaatttcc aaaaagattt   5100
gcaaaaaaca aaacaagtgg tgcaaatgtg gtccaaaatg ttaaaataaa agaaagcaac    5160
catgcatatc aagtaaaagt ataaaattgat ttaattctaa gtaacctatg cacttacctt    5220
atgcaaacta gttcaattct gcacttatat attttctttg gttgtgttg gcatcaatca    5280 ccaaaaggg ggagattgaa agggaaataa ggtttaacct tttcctataa ataattttgg     5340
tggttgaatg cccaacacaa atgattggac taactagttt gttctagatt atatattcca   5400
caggtgcata aaggttcaac acaaaccaat aaacgatcaa agttagggtt caaaagcaaa   5460
ggagcaaagg aaccgaaggg tgccctgatc tggcacaccg gactgtctgg tatgccacca   5520
gacagtgtcc ggtgcagatc ctctagagtc gacctgcagg catgcaagct tggtcacccg   5580
gtccgggcct agaaggccag cttcaagttt gtacaaaaaa gcaggctccg gccagaatgg   5640
cccggaccgg gttaccgaat tcccatggag tcaaagattc aaatagagga cctaacagaa   5700
ctcgccgtaa agactggcga acagttcata cagagtctct tacgactcaa tgacaagaag   5760
aaaatcttcg tcaacatggt ggagcacgac acgcttgtct actccaaaaa tatcaaagat   5820
acagtctcag aagaccaaag ggcaattgag acttttcaac aaagggtaat atccggaaac   5880
```

-continued

```
ctcctcggat tccattgccc agctatctgt cactttattg tgaagatagt ggaaaaggaa    5940
ggtggctcct acaaatgcca tcattgcgat aaaggaaagg ccatcgttga agatgcctct    6000
gccgacagtg gtcccaaaga tggacccccca cccacgagga gcatcgtgga aaaagaagac    6060
gttccaacca cgtcttcaaa gcaagtggat tgatgtgata tctccactga cgtaagggat    6120
gacgcacaat cccactaagc tgaccgaagc tggccgctct agaactagtg gatctcgatg    6180
tgtagtctac gagaagggtt aaccgtctct tcgtgagaat aaccgtggcc taaaataag     6240
ccgatgagga taaataaaat gtggtggtac agtacttcaa gaggtttact catcaagagg    6300
atgcttttcc gatgagctct agtagtacat cggacctcac atacctccat tgtggtgaaa    6360
tattttgtgc tcatttagtg atgggtaaat tttgtttatg tcactctagg ttttgacatt    6420
tcagttttgc cactcttagg ttttgacaaa taatttccat tccgcggcaa agcaaaaca     6480
attttatttt acttttacca ctcttagctt tcacaatgta tcacaatgc cactctagaa     6540
attctgttta tgccacagaa tgtgaaaaaa acactcact tatttgaagc caaggtgttc     6600
atggcatgga aatgtgacat aaagtaacgt tcgtgtataa gaaaaaattg tactcctcgt    6660
aacaagagac ggaaacatca tgagacaatc gcgtttggaa ggctttgcat cacctttgga    6720
tgatgcgcat gaatggagtc gtctgcttgc tagccttcgc ctaccgccca ctgagtccgg    6780
gcggcaacta ccatcggcga acgacccagc tgacctctac cgaccggact gaatgcgct     6840
accttcgtca gcgacgatgg ccgcgtacgt ggcgacgtg ccccgcatg catggcggca     6900
catggcgagc tcagaccgtg cgtggctggc tacaaatacg taccccgtga gtgccctagc    6960
tagaaactta cacctgcaac tgcgagagcg agcgtgtgag tgtagccgag tagatccccc    7020
gggctgcagg tcgactctag aggatccacc ggtcgccacc atggcctcct ccgagaacgt    7080
catcaccgag ttcatgcgct tcaaggtgcg catggagggc accgtgaacg ccacgagtt     7140
cgagatcgag ggcgagggcg agggccgccc ctacgagggc cacaacaccg tgaagctgaa    7200
ggtgacgaag ggcggccccc tgcccttcgc ctgggacatc ctgtcccccc agttccagta    7260
cggctccaag gtgtacgtga agcaccccgc cgacatcccc gactacaaga agctgtcctt    7320
ccccgagggc ttcaagtggg agcgcgtgat gaacttcgag gacggcggcg tggcgaccgt    7380
gacccaggac tcctccctgc aggacggctg cttcatctac aaggtgaagt tcatcggcgt    7440
gaacttcccc tccgacggcc ccgtgatgca gaagaagacc atgggctggg aggcctccac    7500
cgagcgcctg taccccgcg acggcgtgct gaagggcgag acccacaagg ccctgaagct    7560
gaaggacggc ggccactacc tggtggagtt caagtccatc tacatggcca agaagcccgt    7620
gcagctgccc ggctactact acgtggacgc caagctggac atcacctccc acaacgagga    7680
ctacaccatc gtggagcagt acgagcgcac cgagggccgc caccacctgt tcctgtagcg    7740
gcccatggat attcgaacgc gtaggtacca catggttaac ctagacttgt ccatcttctg    7800
gattggccaa cttaattaat gtatgaaata aaaggatgca cacatagtga catgctaatc    7860
actataatgt gggcatcaaa gttgtgtgtt atgtgtaatt actagttatc tgaataaaag    7920
agaaagagat catccatatt tcttatccta aatgaatgtc acgtgtcttt ataattcttt    7980
gatgaaccag atgcatttca ttaaccaaat ccatatacat ataaatatta atcatatata    8040
attaatatca attgggttag caaaacaaat ctagtctagg tgtgttttgc gaatgcggcc    8100
gccaccgcgg tggagctcga attcgagctc ggtaccctgg gatccgatat cgatgggccc    8160
tggccgaagc ttggtcaccc ggtccgggcc tagaaggccg atctcccggg cacccagctt    8220
tcttgtacaa agtggccgtt aacggatcgg ccagaatggc ccggaccggg ttaccgaatt    8280
```

```
cgcccttgt tgttgctcat cggtcgtcgg actcttaata gccggcttta ggatattgtc    8340
cggggagata tcggtgtgat ctttagaacc ggccatttga tggcctgagt tctagtagat    8400
ctagacacat ttccccaacg gagtcgccaa aaagtgtgtt ggcgccgatc caggcgcgaa    8460
acactggaga tggaccgttt ggcggtgttc tctgcggagg tgaggacggt ccgcgacctg    8520
gcgcagcagc gactctcctc tacgtgtgtc cggacggtcc gcgtctgggg ctcggacggt    8580
ccgcgatggc gcagagggtc ttcttcttcg cagccgacct agatctcgcc tcccgggagg    8640
gaccccgtcg gggaggagag attgtagggt gtgtcttggc gtcgacaggc cacacaatac    8700
gcctctagtc gacgtagagc cgaagagagg tgaaggattg aggtagaagg aggctaaact    8760
tgggctaaac tagaactact gctaatgcat aaggtaaaaa cgagaagtgg acttcatttg    8820
atcgattgtg aaggtttaa tcgactgtag ccctttatct atataaaggg gaggtatgga    8880
cccgttacaa gctgtttccc gagctaatct cacggtttta gttaataaat cctgcgagaa    8940
actcggaact ctaactgatt ctactcatgc gcgaaccatt cgtgccgcca ccgctgcccg    9000
tccggctacg ctcagttaac cctgtgttgt gcgctgtgat ttggtggcat ataaaccac    9060
atttgcaata aaaatttgta gggatttaac ataccaagtg ctgcggaaag gaatcgtttt    9120
cggaggaccc aaaattaaag aggcagatgc tagagctcgt ccagctcagc gctgagcacc    9180
tgtgttgtct cctcgtcca cgccggcgga gatgaacggc aacaaaggcg aaaggccga     9240
gacgctgagc tcaaggacgt gacaccgcgc gtacctcgcg ttcagttggc tcacacaaca    9300
gcagctcgct cgcccaagc tcccgcgtcc tgatccgtag gtgagccatg caaaggtcgc    9360
cgcgcgccct gatccattgc acccttcaaa gctcgaacct acaaatagcg tgcaccaggc    9420
atcctggcca cacccacaca gcaagccagc agagcagaaa gcagccgcag ccccagcccc    9480
cacaagacga ggcaaccatg gtcccccaga tttgctagga caccgccgta cccacacccc    9540
ggatcagtta atatcgtaga cataatggcc ctccctgcca tctcttattc ctctcccctc    9600
ctgcatcatg catgcagcag gctgtgctgt ggacctgatc gagtttcaat tgatccaagc    9660
aagcaagagg gcaggagggc agaggaataa gaaattgcag agagagacca gtcgttgatc    9720
ggtcggagat ctccccgaat cgatctcgat cggccggaat tttgggggcc ggccgggagg    9780
tgatgatgg ggggtgatta ccatctaggc ggcgccgtgt tggatgatgt accaacatat    9840
cactataggc tactttggga acctcagatc cccttcggga ttggaggaaa ttgagatgga    9900
aatgaactaa tttcttctct aacccccttc aatcacgaag gggattcgag tttccaaact    9960
agccctatat atatcagagc tagggaggga tattgctgca acatgcatca cgaggtacag   10020
atatataatt agggttctgc tgcaatgttt tgactataga tcgttagtga tctgctgtaa   10080
ttaataataa tggtgatctc gaagcaattc taaacatcat agtagcaggc ccaggtacct   10140
tcgaagttaa cgcttattaa tcttatgttt tcctgcggtt cgtgttcacc atgcagccgc   10200
ttgaagcagg gacctggcac gcgtgctgca atggatggca ggaggggaga ggaataagaa   10260
gtgtttccat ttcacagtga gagcagtcga gctccaacgt tgtcgtcgtc gtcgtcttct   10320
tcttttgata ttcagactct gtcttgcggt ctatatcatc agcataataa taataaaata   10380
agtaaaacca aaccatgcat gaccatgcta tacatgttgc gagttccagc gagacggtta   10440
actataatga ctgcaacaaa ggattctgtt cgttttgaca cgtgatcacg taagaatacc   10500
gctcaggaga ccaacacgga tggtctaaac cactatctcc aaagtaaacc atactcaagt   10560
cttaaaaccg caagagctac agttgttctg aaatctgaat gtagaactgc ccatctgcac   10620
```

-continued

| | |
|---|---:|
| agtcagatcg aaacacctcc gtttcagagc acagaagatg gcgacgggat ctctagagat | 10680 |
| cagtaatcat tcaaccgctg cagtatttc atgaacacac gccaggcacg atctaaatga | 10740 |
| ccgattttat aagtgcatat actactcgac cataactcca gaaccttgta ctctacgcag | 10800 |
| acggtttttc taggaacaga gcttcctgct tgctagtgag accgagatcg ctcagtgaca | 10860 |
| tctggctctc caattcagtg aaggcacgcc tgggataaga cctcgcctgt ccaaagaaaa | 10920 |
| agggcgaatt cgagctcggt accctgggat ccgatatcga tgggccctgg ccgaagcttg | 10980 |
| gtcacccggt ccgggcctag aaggccagct tcggccgccc cggcaacttt attatacaa | 11040 |
| agttgataga tatctggtct aactaactag tcctaaggac ccggcggacc gattaaactg | 11100 |
| attcggtccg aagcttaagc catggcccgg gaatcttagc ggccgcctgc agagttaacg | 11160 |
| gcgcgccgac tagctagcta aggtaccgag ctcgaattca ttccgattaa tcgtggcctc | 11220 |
| ttgctcttca ggatgaagag ctatgtttaa acgtgcaagc gctactagac aattcagtac | 11280 |
| attaaaaacg tccgcaatgt gttattaagt tgtctaagcg tcaatttgtt tacaccacaa | 11340 |
| tatatcgtgt atatc | 11355 |

<210> SEQ ID NO 14
<211> LENGTH: 11375
<212> TYPE: DNA
<213> ORGANISM: Artificial Sequence
<220> FEATURE:
<223> OTHER INFORMATION: junction sequence

<400> SEQUENCE: 14

| | |
|---|---:|
| ttaaaagccg agccgggggc tcaaacactg atagtttaaa ctgaaggcgg gaaacgacaa | 60 |
| tctgatcatg agcggagaat taagggagtc acgttatgac ccccgccgat gacgcgggac | 120 |
| aagccgtttt acgtttggaa ctgacagaac cgcaacgttg aaggagccac tcagcaagct | 180 |
| ggtacgattg taatacgact cactataggg cgaattgagc gctgtttaaa cgctcttcaa | 240 |
| ctggaagagc ggttactacc ggctggatgg cggggccttg atcgtgcacc gccggcgtcc | 300 |
| ggactaacta actagtcgag ctagttaccc tatgaggtga catgaagcgc tcacggttac | 360 |
| tatgacggtt agcttcacga ctgttggtgg cagtagcgta cgacttagct atagttccgg | 420 |
| acttaccctt aagataactt cgtatagcat acattatacg aagttatacc tggagctcgt | 480 |
| ttaaacgctc ttcaactgga agagcggtta ccagagctgg tcacctttgt ccaccaagat | 540 |
| ggaactggcg cgcctcatta ttaagtcag cggccgctct agttgaagac acgttcatgt | 600 |
| cttcatcgta agaagacact cagtagtctt cggccagaat ggccatctgg attcagcagg | 660 |
| cctagaaggc catttaaatc ctgaggatct ggtcttccta aggacccggg atatcgctat | 720 |
| caactttgta tagaaaagtt gggccgaatt cgagctcggt acggcagaa tggcccggac | 780 |
| cgggttaccg aattcgagct cggtaccggc gcgccgcggc cgctctagaa ctagtggatc | 840 |
| ccccgtccga tatcccgggt ccttaggaag accagatcct caggatttgg ccgcgtcgac | 900 |
| gtggagatat aggggaaaga gaacgctgat gtgacaagtg agtgagatat aggggagaa | 960 |
| atttagggg aacgccgaac acagtctaaa gtagcttggg acccaaagca ctctgttcgg | 1020 |
| gggttttttt ttttgtcttt caactttttg ctgtaatgtt attcaaaata agaaaagcac | 1080 |
| ttggcatggc taagaaatag agttcaacaa ctgaacagta cagtgtatta tcaatggcat | 1140 |
| aaaaaacaac ccttacagca ttgccgtatt ttattgatca acattcaac tcaacactga | 1200 |
| cgagtggtct tccaccgatc aacggactaa tgctgctttg tcagatctca aggaaaagac | 1260 |
| gttatgcagt gtcgtgctgc tgtgtttgca atgcagcaca agactgagca atctgagctg | 1320 |

```
ctagaggtgg cgccccgccg ggacgcggag gctcgctttc tcccagacgc agtagtcctt   1380
gccgtgcgcc gccgggtgga atccgacggg accacgctg  ctcacgccgt accttgtccc   1440
gatcttcacc atgaccttct cgtcgacgac ggccacgtac gcgtccgcgt ccgccacgag   1500
gatccgcagc ttgctcccgg cgcggatgcc gttccgcgcc ctgatggcag acagcgtgga   1560
tatctcctgc ttcaggttcc agtcgaacat gtggtcgtag aaaatgcagg ggactcctgg   1620
atgggtgagg atgtaggcgt agccctgcat gaccttgtcg gatgggaacg gccagagctt   1680
ctgcgtcgac ccggtgtcat ggttgtcgac gaaggtgacg gccttctcgg gcgcccaccc   1740
gatcaggccg gccgcgttgc cggagctgtc gcgcagccgc cacagctccc cctgcacgcc   1800
cgcctgcagc aggcccttgg tggggaagtc gaacgccatg gcgggcccgc cgacggcccg   1860
cgtccagtcc agcagctcct gccggcactg gtcctggttg ggcgccggct tgccgtcccc   1920
gctgtagctc agcgagttcc atatctccgc gacgacgaag ctcggcggcc ccgtgctctc   1980
cacgtacatt ctggcgacgg ccggcgagta gcccttggcg aagtcgaggc gccagccgtc   2040
gaaccccacg gcgtcggacc tgagccagtt gagccaggcg gagagctccc gctgcacgcg   2100
cgggttgagg tggtcgatgt cgggcgccgc gcgaacccc  tcgcccgtgt cgcggtgccc   2160
cgtcccgtcc gagtactgcg tgtcgtcgct gcagatcatc ccggggcccc agtccaggcg   2220
gtcgtcggga gtcccgccct cgaagatgca gtacacgccg cgcgcgtcct tcttttccgc   2280
gcaccggtgg ttgatgacga tgtccgccac gcactgcacg cccctgccgt ggaacgccgc   2340
tatcagggac ttgagctccg ccgccgtgcc gtacttggac gcgtccaggt cgtataggcg   2400
gcctggcatg tagccttgtg gcgagacgga gtgcgagggt ggaggcagcc agacgtgcgt   2460
gacgccggcc ttggcgatgt cgtcgacctg ggccttgagc ctgttgtacc agcctccctg   2520
ctgcttgcac gactcccagt taaaccctg  gaagaggact tgtgcctgga ccaggccgca   2580
ggccgcccgg acgaccttgg gatcgggctc ccgcgggtcg cgcccgccg  ggacgccgg   2640
gcacacgttg aggccgacgc tggcgaacat cgcccggcga gggaactcga ggccgccggt   2700
cttgccacct cgtggcttcc aagggaatgc caccgccggg acctgcaatg acgaccagct   2760
ctccttgctc ctcgtcacca tcgtcgtcac tgccattgtc gccgccatgg tgtcgtgatc   2820
gatgctttat tcgtgtctct tgttgcctgg gcactaggac ctataaatac cattgttctg   2880
ctgataaaat tagtgcgcta tatgtatggc ttggacacca tgcctttgca tcgctatttt   2940
tagggcagac ttcttgtcct caaactcttc atgcattatt tggacccttc agaagtaacc   3000
actaaccacc gtgaaagca  taaattaaat aacaaagaa  agaatgaaca atgccaacat   3060
ttaaactata ctctactatc ttatatatat cttggtatta ctaattgaag gttctaatag   3120
agcctctgga ttaattttca ctctattatt aattcaggac ccaattgagc ctttatgtta   3180
attctcatca gacatgataa aaaattaaaa aatatcataa attcttagat taattagaaa   3240
tatctggcca ttaaacaaga gactctaaat tatacataac tattagatcc tgaaggacca   3300
aaaaagtgat caaatggggt gaataggtct atgttgagca acctctcggc tttgaagata   3360
gtgagtaccc taaccatgtt tataaactct caaaggcgct ttatgggctc aagcaagccc   3420
caacagcatg gtatgaatgc ctaagagatt ttcttatcac taatggcttc agagtcagta   3480
aagccgatcc tactctcttt actaaaacca tttcaaaagt tttgtttgta tgccaaattt   3540
atgttgatga tattatattt gggtctacta acaaatctac ttgtgaagag tttagtagga   3600
tcatgattcc gaaattcgag atgtctatga tggggaagtt gaaatatttt ctaggatttc   3660
```

```
aagtcaagca actccaagat ggcaccttca tcagccaaac aaagtacatt caagacatac    3720
tcaacaagtt tggaatgaag gatgccaagc ccatcaggac acccatggga actaatgggc    3780
atctcgacct cgacacggga ggtaaatccg tagaccaaaa ggtataccgg tcgatgatag    3840
gatctttact ctatttatgt gcatctcgac cagatagtat gctttctata tgcatgtgtg    3900
caagattcca agccgatcct aaggaagttc accttagggc cgtgaaaaga atcatgagat    3960
atttagttta cactcctaaa tttggtcttt ggtacccaa gggatccacc tttgatttaa     4020
taggatattc agatgccgat tgggcagggt gtaaaattga taggaagagc acatcaggga   4080
cttgtcagtt tctagggaga tccctggtgt cttggacttc aaagaaacaa aactcaatag   4140
ctctttctac cgccgaagcc aagtatattg ccgcaggaca ttgttgtgtg caattacttt   4200
ggatgaggca aaaccttagg gactatggct acaaattgag caaagtccct ctcctatgtg   4260
acaatgagag tgctatctgc atggcggata atcccgttga acacagccgc actaagcaca   4320
tagacattcg gtatcacttt ttgagggatc ccaacaaag gggtgatatc gagattgctt    4380
atgttagcac caagaacaa ttagtcgata tctttaccaa accattagat gataaaacct    4440
ttagcaaact taggaatgag ctaaatattc ttgattctcg aaactttgat tgaaacatta   4500
cacacatagc tcatttgtat acctttgatc atatctcttt cgtggctacg actaatgtgt   4560
tttcaagtgt atttctatgc taagtcgtag attgaaaggg aaatggagtc ttcggcgaag   4620
acaaggcttc cactccactc taacggtatc gtttatcctt cgccgtcact ccgcatcact   4680
gtccaaattt ggtataatct ttcactcata tttcatttac caatggggag aaagtataaa   4740
tggctcacaa agtctccgtt tttggcgatt aatgccaaag gggagaaat attaagccca    4800
aagcaaaagg accgcaccac cactttttga aattttttaa attggtatgt ttaatttcaa   4860
attggtatgt tgattttcaa ttggtatatt ttcaaaatta gcatctaaat atatttccaa   4920
ttgatatcta tttaaaaccc tcttgaaagc taagaggaga attttattca gggggagttt   4980
tgtttagtca aaggaaaagc atttgaaaca ggggagaaa tttcaaatct tgaaaatgct    5040
tcttacaatc ttattcatat acctttgact atttgcaaaa gactttgaaa agaatttcc    5100
aaaaagatt gcaaaaaca aaacaagtgg tgcaaatgtg gtccaaatg ttaaaataaa       5160
agaaagcaac catgcatatc aagtaaagt ataaattgat ttaattctaa gtaacctatg    5220
cacttacctt atgcaaacta gttcaattct gcacttatat atttctttg gtttgtgttg    5280
gcatcaatca ccaaaaggg ggagattgaa agggaaataa ggtttaacct tttcctataa    5340
ataattttgg tggttgaatg cccaacacaa atgattggac taactagttt gttctagatt   5400
atatattcca caggtgcata aaggttcaac acaaaccaat aaacgatcaa agttagggtt   5460
caaaagcaaa ggagcaaagg aaccgaaggg tgccctgatc tggcacaccg gactgtctgg   5520
tatgccacca gacagtgtcc ggtgcagatc ctctagagtc gacctgcagg catgcaagct   5580
tggtcacccg gtccgggcct agaaggccag cttcaagttt gtacaaaaaa gcaggctccg   5640
gccagaatgg cccggaccgg gttaccgaat tcccatggag tcaaagattc aaatagagga   5700
cctaacagaa ctcgccgtaa agactggcga acagttcata cagagtctct tacgactcaa   5760
tgacaagaag aaaatcttcg tcaacatggt ggagcacgac acgcttgtct actccaaaaa   5820
tatcaaagat acagtctcag aagaccaaag ggcaattgag acttttcaac aaagggtaat   5880
atccggaaac ctcctcggat tccattgccc agctatctgt cactttattg tgaagatagt   5940
ggaaaaggaa ggtggctcct acaaatgcca tcattgcgat aaaggaaagg ccatcgttga   6000
agatgcctct gccgacagtg gtcccaaaga tggacccca cccacgagga gcatcgtgga   6060
```

-continued

```
aaaagaagac gttccaacca cgtcttcaaa gcaagtggat tgatgtgata tctccactga    6120
cgtaagggat gacgcacaat cccactaagc tgaccgaagc tggccgctct agaactagtg    6180
gatctcgatg tgtagtctac gagaagggtt aaccgtctct tcgtgagaat aaccgtggcc    6240
taaaaataag ccgatgagga taaataaaat gtggtggtac agtacttcaa gaggtttact    6300
catcaagagg atgcttttcc gatgagctct agtagtacat cggacctcac atacctccat    6360
tgtggtgaaa tattttgtgc tcatttagtg atgggtaaat tttgtttatg tcactctagg    6420
ttttgacatt tcagttttgc cactcttagg ttttgacaaa taatttccat tccgcggcaa    6480
aagcaaaaca atttattttt acttttacca ctcttagctt tcacaatgta tcacaaatgc    6540
cactctagaa attctgttta tgccacagaa tgtgaaaaaa acactcact tatttgaagc     6600
caaggtgttc atggcatgga aatgtgacat aaagtaacgt tcgtgtataa gaaaaaattg    6660
tactcctcgt aacaagagac ggaaacatca tgagacaatc gcgtttggaa ggctttgcat    6720
caccttgga tgatgcgcat gaatggagtc gtctgcttgc tagccttcgc ctaccgccca    6780
ctgagtccgg gcggcaacta ccatcggcga acgacccagc tgacctctac cgaccggact    6840
tgaatgcgct accttcgtca gcgacgatgg ccgcgtacgc tggcgacgtg ccccgcatg    6900
catggcggca catggcgagc tcagaccgtg cgtggctggc tacaaatacg taccccgtga    6960
gtgccctagc tagaaactta cacctgcaac tgcgagagcg agcgtgtgag tgtagccgag    7020
tagatccccc gggctgcagg tcgactctag aggatccacc ggtcgccacc atggcctcct    7080
ccgagaacgt catcaccgag ttcatgcgct tcaaggtgcg catggagggc accgtgaacg    7140
gccacgagtt cgagatcgag ggcgagggcg agggccgccc ctacgagggc cacaacaccg    7200
tgaagctgaa ggtgacgaag gcggccccc tgcccttcgc ctgggacatc ctgtcccccc     7260
agttccagta cggctccaag gtgtacgtga agcaccccgc cgacatcccc gactacaaga    7320
agctgtcctt ccccgagggc ttcaagtggg agcgcgtgat gaacttcgag gacggcggcg    7380
tggcgaccgt gacccaggac tcctccctgc aggacggctg cttcatctac aaggtgaagt    7440
tcatcggcgt gaacttcccc tccgacggcc ccgtgatgca gaagaagacc atgggctggg    7500
aggcctccac cgagcgcctg taccccccgcg acggcgtgct gaagggcgag acccacaagg    7560
ccctgaagct gaaggacggc ggccactacc tggtggagtt caagtccatc tacatggcca    7620
agaagcccgt gcagctgccc ggctactact acgtggacgc caagctggac atcacctccc    7680
acaacgagga ctacaccatc gtggagcagt acgagcgcac cgagggccgc caccacctgt    7740
tcctgtagcg gccatggat attcgaacgc gtaggtacca catggttaac ctagacttgt     7800
ccatcttctg gattggccaa cttaattaat gtatgaaata aaaggatgca cacatagtga    7860
catgctaatc actataatgt gggcatcaaa gttgtgtgtt atgtgtaatt actagttatc    7920
tgaataaaag agaagagat catccatatt tcttatccta aatgaatgtc acgtgtcttt     7980
ataattcttt gatgaaccag atgcatttca ttaaccaaat ccatatacat ataaatatta    8040
atcatatata attaatatca attgggttag caaaacaaat ctagtctagg tgtgttttgc    8100
gaatgcggcc gccaccgcgg tggagctcga attcgagctc ggtacccggg gatccgatat    8160
cgatgggccc tggccgaagc ttggtcaccc ggtccgggcc tagaaggccg atctcccggg    8220
cacccagctt tcttgtacaa agtggccgtt aacggatcgg ccagaatggc ccggaccggg    8280
ttaccgaatt cgcccttttgt tgttgctcat cggtcgtcgg actcttaata gccggcttta    8340
ggatattgtc cggggagata tcggtgtgat ctttagaacc ggccatttga tggcctgagt    8400
```

```
tctagtagat ctagacacat ttccccaacg gagtcgccaa aaagtgtgtt ggcgccgatc   8460
caggcgcgaa acactggaga tggaccgttt ggcggtgttc tctgcggagg tgaggacggt   8520
ccgcgacctg gcgcagcagc gactctcctc tacgtgtgtc cggacggtcc gcgtctgggg   8580 ctcgacggt ccgcgatggc gcagagggtc ttcttcttcg cagccgacct agatctcgcc    8640
tcccgggagg gaccccgtcg gggaggagag attgtagggt gtgtcttggc gtcgacaggc   8700
cacacaatac gcctctagtc gacgtagagc cgaagagagg tgaaggattg aggtagaagg   8760
aggctaaact tgggctaaac tagaactact gctaatgcat aaggtaaaaa cgagaagtgg   8820
acttcatttg atcgattgtg gaaggtttaa tcgactgtag ccctttatct atataaaggg   8880
gaggtatgga cccgttacaa gctgtttccc gagctaatct cacggtttta gttaataaat   8940
cctgcgagaa actcggaact ctaactgatt ctactcatgc gcgaaccatt cgtgccgcca   9000
ccgctgcccg tccggctacg ctcagttaac cctgtgttgt gcgctgtgat ttggtggcat   9060 ataaaccac atttgcaata aaatttgta gggatttaac ataccaagtg ctgcggaaag     9120
gaatcgtttt cggaggaccc aaaattaaag aggcagatgc tagagctcgt ccagctcagc   9180
gctgagcacc tgtgttgtct tcctcgtcca cgccggcgga gatgaacggc aacaaaggcg   9240
gaaaggccga gacgctgagc tcaaggacgt gacaccgcgc gtacctcgcg ttcagttggc   9300
tcacacaaca gcagctcgct cgccccaagc tcccgcgtcc tgatccgtag gtgagccatg   9360
caaaggtcgc cgcgcgccct gatccattgc acccttcaaa gctcgaacct acaaatagcg   9420
tgcaccaggc atcctggcca cacccacaca gcaagccagc agagcagaaa gcagccgcag   9480
ccccagcccc cacaagacga ggcaaccatg gtcccccaga tttgctagga caccgccgta   9540
cccacacccc ggatcagtta atatcgtaga cataatggcc ctccctgcca tctcttattc   9600
ctctcccctc ctgcatcatg catgcagcag gctgtgctgt ggacctgatc gagtttcaat   9660
tgatccaagc aagcaagagg gcaggagggc agaggaataa gaaattgcag agagagacca   9720
gtcgttgatc ggtcggagat ctccccgaat cgatctcgat cggccggaat tttgggggcc   9780
ggccgggagg tggatgatgg ggggtgatta ccatctaggc ggcgccgtgt tggatgatgt   9840
accaacatat cactataggc tactttggga acctcagatc cccttcggga ttggaggaaa   9900
ttgagatgga aatgaactaa tttcttctct aaccccttc aatcacgaag gggattcgag    9960
tttccaaact agccctatat atatcagagc tagggaggga tattgctgca acatgcatca  10020
cgaggtacag atatataatt agggttctgc tgcaatgttt tgactataga tcgttagtga  10080
tctgctgtaa ttaataataa tggtgatctc gaagcaattc taaacatcat agtagcaggc  10140
ccaggtacct tcgaagttaa cgcttattaa tcttatgttt tcctgcggtt cgtgttcacc  10200
atgcagccgc ttgaagcagg gacctggcac gcgtgctgca atggatggca ggaggggaga  10260
ggaataagaa gtgtttccat ttcacagtga gagcagtcga gctccaacgt tgtcgtcgtc  10320
gtcgtcttct tcttttgata ttcagactct gtcttgcggt ctatatcatc agcataataa  10380
taataaaata agtaaaacca aaccatgcat gaccatgcta tacatgttgc gagttccagc  10440
gagacggtta actataatga ctgcaacaaa ggattctgtt cgttttgaca cgtgatcacg  10500
taagaatacc gctcaggaga ccaacacgga tggtctaaac cactatctcc aaagtaaacc  10560
atactcaagt cttaaaaccg caagagctac agttgttctg aaatctgaat gtagaactgc  10620
ccatctgcac agtcagatcg aaacacctcc gtttcagagc acagaagatg gcgacgggat  10680
ctctagagat cagtaatcat tcaaccgctg cagtattttc atgaacacac gccaggcacg  10740
atctaaatga ccgattttat aagtgcatat actactcgac cataactcca gaaccttgta  10800
```

```
ctctacgcag acggttttc taggaacaga gcttcctgct tgctagtgag accgagatcg   10860
ctcagtgaca tctggctctc caattcagtg aaggcacgcc tgggataaga cctcgcctgt   10920
ccaaagaaaa agggcgaatt cgagctcggt accctgggat ccgatatcga tgggccctgg   10980
ccgaagcttg gtcacccggt ccgggcctag aaggccagct tcggccgccc cgggcaactt   11040
tattatacaa agttgataga tatctggtct aactaactag tcctaaggac ccggcggacc   11100
gattaaactg attcggtccg aagcttaagc catggcccgg gaatcttagc ggccgcctgc   11160
agagttaacg gcgcgccgac tagctagcta aggtaccgag ctcgaattca ttccgattaa   11220
tcgtggcctc ttgctcttca ggatgaagag ctatgtttaa acgtgcaagc gctactagac   11280
aattcagtac attaaaaacg tccgcaatgt gttattaagt tgtctaagcg tcaatttgtt   11340
tacaccacaa tatatcgtgt atatcgttat taagt                               11375
```

<210> SEQ ID NO 15
<211> LENGTH: 21
<212> TYPE: DNA
<213> ORGANISM: Artificial Sequence
<220> FEATURE:
<223> OTHER INFORMATION: primer

<400> SEQUENCE: 15
gaaggaaacg agtgaagcgg t                                              21

<210> SEQ ID NO 16
<211> LENGTH: 23
<212> TYPE: DNA
<213> ORGANISM: Artificial Sequence
<220> FEATURE:
<223> OTHER INFORMATION: primer

<400> SEQUENCE: 16
gcgtcaattt gtttacacca caa                                            23

<210> SEQ ID NO 17
<211> LENGTH: 26
<212> TYPE: DNA
<213> ORGANISM: Artificial Sequence
<220> FEATURE:
<223> OTHER INFORMATION: probe

<400> SEQUENCE: 17
caacttaata acgatataca cgatat                                         26

<210> SEQ ID NO 18
<211> LENGTH: 22
<212> TYPE: DNA
<213> ORGANISM: Artificial Sequence
<220> FEATURE:
<223> OTHER INFORMATION: primer

<400> SEQUENCE: 18
cggactaatg ctgctttgtc ag                                             22

<210> SEQ ID NO 19
<211> LENGTH: 20
<212> TYPE: DNA
<213> ORGANISM: Artificial Sequence
<220> FEATURE:
<223> OTHER INFORMATION: primer

<400> SEQUENCE: 19

```
tgtttgcaat gcagcacaag                                                    20

<210> SEQ ID NO 20
<211> LENGTH: 29
<212> TYPE: DNA
<213> ORGANISM: Artificial Sequence
<220> FEATURE:
<223> OTHER INFORMATION: probe

<400> SEQUENCE: 20
gaaaagacgt tatgcagtgt cgtgctgct                                          29

<210> SEQ ID NO 21
<211> LENGTH: 25
<212> TYPE: DNA
<213> ORGANISM: Artificial Sequence
<220> FEATURE:
<223> OTHER INFORMATION: primer

<400> SEQUENCE: 21
tgcttcatct acaaggtgaa gttca                                              25

<210> SEQ ID NO 22
<211> LENGTH: 19
<212> TYPE: DNA
<213> ORGANISM: Artificial Sequence
<220> FEATURE:
<223> OTHER INFORMATION: primer

<400> SEQUENCE: 22
aagaagacca tgggctggg                                                     19

<210> SEQ ID NO 23
<211> LENGTH: 21
<212> TYPE: DNA
<213> ORGANISM: Artificial Sequence
<220> FEATURE:
<223> OTHER INFORMATION: probe

<400> SEQUENCE: 23
cggcgtgaac ttcccctccg a                                                  21

<210> SEQ ID NO 24
<211> LENGTH: 77
<212> TYPE: DNA
<213> ORGANISM: Artificial Sequence
<220> FEATURE:
<223> OTHER INFORMATION: amplicon

<400> SEQUENCE: 24
gaaggaaacg agtgaagcgg tgtggggcaa cttaataacg atatacacga tatattgtgg        60
tgtaaacaaa ttgacgc                                                       77

<210> SEQ ID NO 25
<211> LENGTH: 80
<212> TYPE: DNA
<213> ORGANISM: Artificial Sequence
<220> FEATURE:
<223> OTHER INFORMATION: amplicon

<400> SEQUENCE: 25
cggactaatg ctgctttgtc agatctcaag gaaaagacgt tatgcagtgt cgtgctgctg        60
tgtttgcaat gcagcacaag                                                    80
```

-continued

```
<210> SEQ ID NO 26
<211> LENGTH: 82
<212> TYPE: DNA
<213> ORGANISM: Artificial Sequence
<220> FEATURE:
<223> OTHER INFORMATION: amplicon

<400> SEQUENCE: 26
tgcttcatct acaaggtgaa gttcatcggc gtgaacttcc cctccgacgg ccccgtgatg    60
cagaagaaga ccatgggctg gg                                             82

<210> SEQ ID NO 27
<211> LENGTH: 23
<212> TYPE: DNA
<213> ORGANISM: Artificial Sequence
<220> FEATURE:
<223> OTHER INFORMATION: primer

<400> SEQUENCE: 27
ttggactaga aatctcgtgc tga                                            23

<210> SEQ ID NO 28
<211> LENGTH: 22
<212> TYPE: DNA
<213> ORGANISM: Artificial Sequence
<220> FEATURE:
<223> OTHER INFORMATION: primer

<400> SEQUENCE: 28
gctacatagg gagccttgtc ct                                             22

<210> SEQ ID NO 29
<211> LENGTH: 16
<212> TYPE: DNA
<213> ORGANISM: Artificial Sequence
<220> FEATURE:
<223> OTHER INFORMATION: probe

<400> SEQUENCE: 29
gcgtttgtgt ggattg                                                    16

<210> SEQ ID NO 30
<211> LENGTH: 79
<212> TYPE: DNA
<213> ORGANISM: Artificial Sequence
<220> FEATURE:
<223> OTHER INFORMATION: amplicon

<400> SEQUENCE: 30
ttggactaga aatctcgtgc tgattaattg ttttacgcgt gcgtttgtgt ggattgtagg    60
acaaggctcc ctatgtagc                                                 79

<210> SEQ ID NO 31
<211> LENGTH: 1440
<212> TYPE: DNA
<213> ORGANISM: Artificial Sequence
<220> FEATURE:
<223> OTHER INFORMATION: junction sequence

<400> SEQUENCE: 31
aaacacaccc ttgatcgcgc acagcaagtt catcgcattt aggaggtacc tgccttatac    60
tgctgggttg tacctgccta gtacgtatac tccagctgat gacagatcaa ttgcaggaat   120
aaaaaagaac taaaatctgc gaaggggcaa taggttgtcg tccctatcca tccatctcat   180
```

| | | |
|---|---|---|
| acgcacgtag tacgcagctg caaacatgca acacaaggac acggggctcg tgctagctgg | 240 | |
| gactcgatca aaagttgact attaaaaaaa attggcatgc tgagctgctc aactgtgtat | 300 | |
| gtcttgcttg ttgggcgtgg tgtatcctga tgttggagga ctgcaccgac tcggcatggt | 360 | |
| cacgttatct atgatgataa cgctagctta aggtcaaacg agctactgtg atgataatga | 420 | |
| ttttgatatt gattttaac aacaacaaaa aaaaaacact attagcttca tgaattatgg | 480 | |
| tatgagcagt acacacctgt tgtttacaaa agatgctagc catagccaac gttgcgaaca | 540 | |
| cacgtcaagc ttatcgactc aagaggaatt aacaaaggac agagacatgg gaattcttgt | 600 | |
| tttttttct tgcaaaaag tcagattatt aaatatatat tgaatttaaa ttccagtaac | 660 | |
| cttttagatg gaagcttttg gcaacaatcc acttgtcatt tcacaaacat atcttagtag | 720 | |
| tacgtgtttc actaaaaaga gaagaaaaaa agtgcctaca cacatacatc caaggtaaaa | 780 | |
| ggagggtctg aacgacacca gtttgaaga agatttagta ttatacaaga gcaaagatac | 840 | |
| acgataaaac caacaaaaag cgacctcaac ccatggtacc ctcttataca catcaacagg | 900 | |
| atcactcctt gttttgaaat ctaatttgat ggtaattttc gacgaaccat caaatattca | 960 | |
| ccgcttacat tcttttccaa agaaaccatg tcatctaagg cattgttcga ttattctcat | 1020 | |
| cccatacttt ttttttgct ttaggaaagt cagtggtttc cttaactgct ttctctacct | 1080 | |
| ggaaaaagtt cgcaaggcac agcacagcac agctgtcgca atcgcatcgt tttggctagg | 1140 | |
| ctccggttag caactttgta gcaatacaag agaggggacg aagtggtgaa caaccgacgt | 1200 | |
| tattgtattt gatactcctc tccgaacaag tagctaagca aaggcagatt cagatagccg | 1260 | |
| tgctgctgcg caaatgtgct gcaataatgc agatgaggat gatttttttt atatatatac | 1320 | |
| aaaaaagacc caaatccaa cccggaacca aaccgccgcc gccgttgaat ggtcgggtag | 1380 | |
| agaacgcaac catggttaag tccaggcccct ttaaaagccg agccggggc tcaaacactg | 1440 | |

<210> SEQ ID NO 32
<211> LENGTH: 1331
<212> TYPE: DNA
<213> ORGANISM: Artificial Sequence
<220> FEATURE:
<223> OTHER INFORMATION: junction sequence

<400> SEQUENCE: 32

| | | |
|---|---|---|
| acaatatatc gtgtatatcg ttattaagtt gccccacacc gcttcactcg tttccttccg | 60 | |
| atccatacac accgcgcacg tacgcgtact ccatcgtccc gtacgtgccc gtcctctcct | 120 | |
| ccccgtgtgt cgtgtgtgcc tgagctccaa gagatcgaga gcatcaatgg caggctttgg | 180 | |
| tccccaaggc tgcttgctaa tgcgcgctcg ctgccgtttc tctgtgtgca gggtgcaggc | 240 | |
| gggttcacgt acgagctcga tcggccgaga cgagatggcg acgccgaacg ggcttgctcg | 300 | |
| gatcgagacg aacggggcga cgaagcccga caacggcgtg tgccacgacg acagctcggc | 360 | |
| gccggtgcgc gcgcagacca tcgacagagct gcactgctg cagcggaagc ggtcggcgcc | 420 | |
| aaccacgccc atcaaggacg cgccgcctc gaccttcgcc gccgcgctct ccgaggagga | 480 | |
| gcgccacagg cagcagctgc agtccatcag gtgacgcccc ccgcgccagc ctgcttctcg | 540 | |
| cttgcctttc tctcagccgt attgccgcct ggttctgcag caactagatg cctagcctac | 600 | |
| tggagtactc cctccgtttc ttttatttg tcgctggata gtgcaatttt acactattca | 660 | |
| gcgacaaata aaaagaaacg gagggagtat atattaaacg aattggtgaa aacgatttat | 720 | |
| tcattggatg gggtttggtt cgttactaat gaagaagagc ttcacgacaa tggccaatca | 780 | |
| ggaacatgaa aggctgagcg gagatgaatt ccttttttcct ttttggagag aaaaacaaaa | 840 | |

```
acaaaatatt ttgacgtctg ctgaacttct tgtggagatg aacgaacgga acacatcaaa      900
cggagttctg cttccgacgg tcaggcggaa atcacagccg gcccgcctga catatactac      960
tagcacttgt acatttctaa attagtagag tcctccagat tttctaaacc ccaatccccg     1020
actagctaca gctaaataaa ataaatcgat attctagaaa ataaaaaaat caatgctaaa     1080
aggagaagca aaatagggtg acgctcacgc cagttacagt gtcatccaca cgatacagtg     1140
tctagctagt ttataccttc cgtcccacgt cttttccac acaaaagcac aagcaccctc      1200
gggagtgaga cacagaggcg ggagccgagg gaatgccgtg acgccgcgcc ggatcggtgg     1260
gtcggttccc agtctggttt cacctaaaaa ctgagtccaa cattgaataa ccaagaactc     1320
cttccgtttc g                                                         1331
```

<210> SEQ ID NO 33
<211> LENGTH: 495
<212> TYPE: PRT
<213> ORGANISM: Zea mays

<400> SEQUENCE: 33

```
Met Ala Ala Thr Met Ala Val Thr Thr Met Val Thr Arg Ser Lys Glu
1               5                   10                  15

Ser Trp Ser Ser Leu Gln Val Pro Ala Val Phe Pro Trp Lys Pro
            20                  25                  30

Arg Gly Gly Lys Thr Gly Gly Leu Glu Phe Pro Arg Ala Met Phe
        35                  40                  45

Ala Ser Val Gly Leu Asn Val Cys Pro Gly Val Pro Ala Gly Arg Asp
50                  55                  60

Pro Arg Glu Pro Asp Pro Lys Val Val Arg Ala Ala Cys Gly Leu Val
65                  70                  75                  80

Gln Ala Gln Val Leu Phe Gln Gly Phe Asn Trp Glu Ser Cys Lys Gln
                85                  90                  95

Gln Gly Gly Trp Tyr Asn Arg Leu Lys Ala Gln Val Asp Asp Ile Ala
            100                 105                 110

Lys Ala Gly Val Thr His Val Trp Leu Pro Pro Ser His Ser Val
        115                 120                 125

Ser Pro Gln Gly Tyr Met Pro Gly Arg Leu Tyr Asp Leu Asp Ala Ser
130                 135                 140

Lys Tyr Gly Thr Ala Ala Glu Leu Lys Ser Leu Ile Ala Ala Phe His
145                 150                 155                 160

Gly Arg Gly Val Gln Cys Val Ala Asp Ile Val Ile Asn His Arg Cys
                165                 170                 175

Ala Glu Lys Lys Asp Ala Arg Gly Val Tyr Cys Ile Phe Glu Gly Gly
            180                 185                 190

Thr Pro Asp Asp Arg Leu Asp Trp Gly Pro Gly Met Ile Cys Ser Asp
        195                 200                 205

Asp Thr Gln Tyr Ser Asp Gly Thr Gly His Arg Asp Thr Gly Glu Gly
210                 215                 220

Phe Ala Ala Pro Asp Ile Asp His Leu Asn Pro Arg Val Gln Arg
225                 230                 235                 240

Glu Leu Ser Ala Trp Leu Asn Trp Leu Arg Ser Asp Ala Val Gly Phe
                245                 250                 255

Asp Gly Trp Arg Leu Asp Phe Ala Lys Gly Tyr Ser Pro Ala Val Ala
            260                 265                 270

Arg Met Tyr Val Glu Ser Thr Gly Pro Pro Ser Phe Val Val Ala Glu
```

-continued

```
                275                 280                 285
Ile Trp Asn Ser Leu Ser Tyr Ser Gly Asp Gly Lys Pro Ala Pro Asn
290                 295                 300

Gln Asp Gln Cys Arg Gln Glu Leu Leu Asp Trp Thr Arg Ala Val Gly
305                 310                 315                 320

Gly Pro Ala Met Ala Phe Asp Phe Pro Thr Lys Gly Leu Leu Gln Ala
                325                 330                 335

Gly Val Gln Gly Glu Leu Trp Arg Leu Arg Asp Ser Ser Gly Asn Ala
                340                 345                 350

Ala Gly Leu Ile Gly Trp Ala Pro Glu Lys Ala Val Thr Phe Val Asp
                355                 360                 365

Asn His Asp Thr Gly Ser Thr Gln Lys Leu Trp Pro Phe Pro Ser Asp
370                 375                 380

Lys Val Met Gln Gly Tyr Ala Tyr Ile Leu Thr His Pro Gly Val Pro
385                 390                 395                 400

Cys Ile Phe Tyr Asp His Met Phe Asp Trp Asn Leu Lys Gln Glu Ile
                405                 410                 415

Ser Thr Leu Ser Ala Ile Arg Ala Arg Asn Gly Ile Arg Ala Gly Ser
                420                 425                 430

Lys Leu Arg Ile Leu Val Ala Asp Ala Asp Ala Tyr Val Ala Val Val
                435                 440                 445

Asp Glu Lys Val Met Val Lys Ile Gly Thr Arg Tyr Gly Val Ser Ser
450                 455                 460

Val Val Pro Ser Asp Phe His Pro Ala Ala His Gly Lys Asp Tyr Cys
465                 470                 475                 480

Val Trp Glu Lys Ala Ser Leu Arg Val Pro Ala Gly Arg His Leu
                485                 490                 495

<210> SEQ ID NO 34
<211> LENGTH: 225
<212> TYPE: PRT
<213> ORGANISM: Discosoma sp.

<400> SEQUENCE: 34

Met Ala Ser Ser Glu Asn Val Ile Thr Glu Phe Met Arg Phe Lys Val
1               5                   10                  15

Arg Met Glu Gly Thr Val Asn Gly His Glu Phe Glu Ile Glu Gly Glu
                20                  25                  30

Gly Glu Gly Arg Pro Tyr Glu Gly His Asn Thr Val Lys Leu Lys Val
                35                  40                  45

Thr Lys Gly Gly Pro Leu Pro Phe Ala Trp Asp Ile Leu Ser Pro Gln
                50                  55                  60

Phe Gln Tyr Gly Ser Lys Val Tyr Val Lys His Pro Ala Asp Ile Pro
65                  70                  75                  80

Asp Tyr Lys Lys Leu Ser Phe Pro Glu Gly Phe Lys Trp Glu Arg Val
                85                  90                  95

Met Asn Phe Glu Asp Gly Gly Val Ala Thr Val Thr Gln Asp Ser Ser
                100                 105                 110

Leu Gln Asp Gly Cys Phe Ile Tyr Lys Val Lys Phe Ile Gly Val Asn
                115                 120                 125

Phe Pro Ser Asp Gly Pro Val Met Gln Lys Lys Thr Met Gly Trp Glu
                130                 135                 140

Ala Ser Thr Glu Arg Leu Tyr Pro Arg Asp Gly Val Leu Lys Gly Glu
145                 150                 155                 160
```

```
Thr His Lys Ala Leu Lys Leu Lys Asp Gly Gly His Tyr Leu Val Glu
            165                 170                 175

Phe Lys Ser Ile Tyr Met Ala Lys Lys Pro Val Gln Leu Pro Gly Tyr
        180                 185                 190

Tyr Tyr Val Asp Ala Lys Leu Asp Ile Thr Ser His Asn Glu Asp Tyr
    195                 200                 205

Thr Ile Val Glu Gln Tyr Glu Arg Thr Glu Gly Arg His His Leu Phe
210                 215                 220

Leu
225

<210> SEQ ID NO 35
<211> LENGTH: 815
<212> TYPE: DNA
<213> ORGANISM: zea mays
<220> FEATURE:
<221> NAME/KEY: CDS
<222> LOCATION: (78)..(437)

<400> SEQUENCE: 35
atcctggcca cacccacaca gcaagccagc agagcagaaa gcagccgcag ccccagcccc    60
cacaagacga ggcaaca atg gcg cta gaa gca gcc acc gcc ccc cgc gca      110
                   Met Ala Leu Glu Ala Ala Thr Ala Pro Arg Ala
                     1               5                  10 ctc ctc gcc gcg tgc ctc gtc ctg ctg gtc ctc ggc ggc ggc acc ggc    158
Leu Leu Ala Ala Cys Leu Val Leu Leu Val Leu Gly Gly Gly Thr Gly
            15                  20                  25 ccg tcg tcg gtg ctg cgc ggc gcc ggg gcg cag gcc ggc ggg cag tgc    206
Pro Ser Ser Val Leu Arg Gly Ala Gly Ala Gln Ala Gly Gly Gln Cys
        30                  35                  40 ctg ccg cag ctg aac cgc ctc ctg gcg tgc cgc gcg tac ctg gtg ccc    254
Leu Pro Gln Leu Asn Arg Leu Leu Ala Cys Arg Ala Tyr Leu Val Pro
    45                  50                  55 ggc gcg ccg gac ccc agc gcg gac tgc tgc agc gcg ctg agc gcc gtg    302
Gly Ala Pro Asp Pro Ser Ala Asp Cys Cys Ser Ala Leu Ser Ala Val
60                  65                  70                  75 tcg cac gag tgc gcc tgc agc acc atg ggc atc atc aac agc ctg ccc    350
Ser His Glu Cys Ala Cys Ser Thr Met Gly Ile Ile Asn Ser Leu Pro
                80                  85                  90 ggc cgg tgc cac ctc gcc caa gcc aac tgc tgt aag ctt gta gcc agg    398
Gly Arg Cys His Leu Ala Gln Ala Asn Cys Cys Lys Leu Val Ala Arg
            95                 100                 105 ccg caa cgg ctt cgt ctc ttc atc tcg gtg cta tgc taa gcttattaat    447
Pro Gln Arg Leu Arg Leu Phe Ile Ser Val Leu Cys
        110                 115 cttatgtttt cctgcggttc gtgttcacca tgcagccgct tgaagcaggg acctggcacg    507
cgtgctgcaa tggatggcag gaggggagag gaataagaag tgtttccatt tcacagtgag    567
agcagtcgag ctccaacgtt gtcgtcgtcg tcgtcttctt cttttgatat tcagactctg    627
tcttgcggtc tatatcatca gcataataat aataaaataa gtaaaaccaa accatgcatg    687
accatgctat acatgttgcg agttccagcg agacggttaa ctataatgac tgcaacaaag    747
gattctgttc gttttgacac gtgatcacgt aagaataccg ctcaggagac caacacggat    807
ggtctaaa                                                             815

<210> SEQ ID NO 36
<211> LENGTH: 119
<212> TYPE: PRT
<213> ORGANISM: zea mays
```

<400> SEQUENCE: 36

Met Ala Leu Glu Ala Ala Thr Ala Pro Arg Ala Leu Leu Ala Ala Cys
1               5                   10                  15

Leu Val Leu Leu Val Leu Gly Gly Gly Thr Gly Pro Ser Ser Val Leu
            20                  25                  30

Arg Gly Ala Gly Ala Gln Ala Gly Gly Gln Cys Leu Pro Gln Leu Asn
        35                  40                  45

Arg Leu Leu Ala Cys Arg Ala Tyr Leu Val Pro Gly Ala Pro Asp Pro
    50                  55                  60

Ser Ala Asp Cys Cys Ser Ala Leu Ser Ala Val Ser His Glu Cys Ala
65                  70                  75                  80

Cys Ser Thr Met Gly Ile Ile Asn Ser Leu Pro Gly Arg Cys His Leu
                85                  90                  95

Ala Gln Ala Asn Cys Cys Lys Leu Val Ala Arg Pro Gln Arg Leu Arg
            100                 105                 110

Leu Phe Ile Ser Val Leu Cys
        115

<210> SEQ ID NO 37
<211> LENGTH: 815
<212> TYPE: DNA
<213> ORGANISM: Zea mays
<220> FEATURE:
<221> NAME/KEY: CDS
<222> LOCATION: (78)..(437)

<400> SEQUENCE: 37
atcctggcca cacccacaca gcaagccagc agagcagaaa gcagccgcag ccccagcccc      60
cacaagacga ggcaaca atg gcg cta gaa gca gcc acc gcc ccc cgc gca        110
                   Met Ala Leu Glu Ala Ala Thr Ala Pro Arg Ala
                    1               5                   10 ctc ctc gcc gcg tgc ctc gtc ctg ctg gtc ctc ggc ggc ggc acc ggc        158
Leu Leu Ala Ala Cys Leu Val Leu Leu Val Leu Gly Gly Gly Thr Gly
            15                  20                  25 ccg tcg tcg gtg ctg cgc ggc gcc ggg acg cag gcc ggc ggg cag tgc        206
Pro Ser Ser Val Leu Arg Gly Ala Gly Thr Gln Ala Gly Gly Gln Cys
        30                  35                  40 ctg ccg cag ctg aac cgc ctc ctg gcg tgc cgc gcg tac ctg gtg ccc        254
Leu Pro Gln Leu Asn Arg Leu Leu Ala Cys Arg Ala Tyr Leu Val Pro
    45                  50                  55 ggc gcg ccg gac ccc agc gcg gac tgc tgc agc gcg ctg agc gcc gtg        302
Gly Ala Pro Asp Pro Ser Ala Asp Cys Cys Ser Ala Leu Ser Ala Val
60                  65                  70                  75 tcg cac gag tgc gcc tgc agc acc atg ggc atc atc aac agc ctg ccc        350
Ser His Glu Cys Ala Cys Ser Thr Met Gly Ile Ile Asn Ser Leu Pro
                80                  85                  90 ggc cgg tgc cac ctc gcc caa gcc aac tgc tgt aag ctt gta gcc agg        398
Gly Arg Cys His Leu Ala Gln Ala Asn Cys Cys Lys Leu Val Ala Arg
            95                  100                 105 ccg caa cgg ctt cgt ctc ttc atc tcg gtg cta tgc taa gcttattaat        447
Pro Gln Arg Leu Arg Leu Phe Ile Ser Val Leu Cys
        110                 115 cttatgtttt cctgcggttc gtgttcacca tgcagccgct tgaagcaggg acctggcacg      507
cgtgctgcaa tggatggcag gaggggagag gaataagaag tgtttccatt tcacagtgag      567
agcagtcgag ctccaacgtt gtcgtcgtcg tcgtcttctt cttttgatat tcagactctg      627
tcttgcggtc tatatcatca gcataataat aataaaataa gtaaaaccaa accatgcatg      687

```
accatgctat acatgttgcg agttccagcg agacggttaa ctataatgac tgcaacaaag    747
gattctgttc gttttgacac gtgatcacgt aagaataccg ctcaggagac caacacggat    807
ggtctaaa                                                              815

<210> SEQ ID NO 38
<211> LENGTH: 119
<212> TYPE: PRT
<213> ORGANISM: Zea mays

<400> SEQUENCE: 38

Met Ala Leu Glu Ala Ala Thr Ala Pro Arg Ala Leu Leu Ala Ala Cys
1               5                   10                  15

Leu Val Leu Leu Val Leu Gly Gly Gly Thr Gly Pro Ser Ser Val Leu
            20                  25                  30

Arg Gly Ala Gly Thr Gln Ala Gly Gly Gln Cys Leu Pro Gln Leu Asn
        35                  40                  45

Arg Leu Leu Ala Cys Arg Ala Tyr Leu Val Pro Gly Ala Pro Asp Pro
    50                  55                  60

Ser Ala Asp Cys Cys Ser Ala Leu Ser Ala Val Ser His Glu Cys Ala
65                  70                  75                  80

Cys Ser Thr Met Gly Ile Ile Asn Ser Leu Pro Gly Arg Cys His Leu
                85                  90                  95

Ala Gln Ala Asn Cys Cys Lys Leu Val Ala Arg Pro Gln Arg Leu Arg
            100                 105                 110

Leu Phe Ile Ser Val Leu Cys
        115

<210> SEQ ID NO 39
<211> LENGTH: 815
<212> TYPE: DNA
<213> ORGANISM: Zea mays
<220> FEATURE:
<221> NAME/KEY: CDS
<222> LOCATION: (78)..(437)

<400> SEQUENCE: 39
atcctggcca cacccacaca gcaagccagc agagcagaaa gcagccgcag ccccagcccc    60
cacaagacga ggcaaca atg gcg cta gaa gca gcc acc gcc ccc cgc gca       110
                    Met Ala Leu Glu Ala Ala Thr Ala Pro Arg Ala
                    1               5                   10 ctc ctc gcc gcg tgc ctc gtc ctg ctg gtc ctc ggc ggc ggc acc ggc       158
Leu Leu Ala Ala Cys Leu Val Leu Leu Val Leu Gly Gly Gly Thr Gly
            15                  20                  25 ccg tcg tcg gtg ctg cgc ggc gcc ggg gtg cag gcc ggc ggg cag tgc       206
Pro Ser Ser Val Leu Arg Gly Ala Gly Val Gln Ala Gly Gly Gln Cys
    30                  35                  40 ctg ccg cag ctg aac cgc ctc ctg gcg tgc cgc gcg tac ctg gtg ccc       254
Leu Pro Gln Leu Asn Arg Leu Leu Ala Cys Arg Ala Tyr Leu Val Pro
        45                  50                  55 ggc gcg ccg gac ccc agc gcg gac tgc tgc agc gcg ctg agc gcc gtg       302
Gly Ala Pro Asp Pro Ser Ala Asp Cys Cys Ser Ala Leu Ser Ala Val
60                  65                  70                  75 tcg cac gag tgc gcc tgc agc acc atg ggc atc atc aac agc ctg ccc       350
Ser His Glu Cys Ala Cys Ser Thr Met Gly Ile Ile Asn Ser Leu Pro
                80                  85                  90 ggc cgg tgc cac ctc gcc caa gcc aac tgc tgt aag ctt gta gcc agg       398
Gly Arg Cys His Leu Ala Gln Ala Asn Cys Cys Lys Leu Val Ala Arg
            95                  100                 105
```

-continued

```
ccg caa cgg ctt cgt ctc ttc atc tcg gtg cta tgc taa gcttattaat    447
Pro Gln Arg Leu Arg Leu Phe Ile Ser Val Leu Cys
        110                 115 cttatgtttt cctgcggttc gtgttcacca tgcagccgct tgaagcaggg acctggcacg  507
cgtgctgcaa tggatggcag gaggggagag gaataagaag tgtttccatt tcacagtgag  567
agcagtcgag ctccaacgtt gtcgtcgtcg tcgtcttctt cttttgatat tcagactctg  627
tcttgcggtc tatatcatca gcataataat aataaaataa gtaaaaccaa accatgcatg  687
accatgctat acatgttgcg agttccagcg agacggttaa ctataatgac tgcaacaaag  747
gattctgttc gttttgacac gtgatcacgt aagaataccg ctcaggagac caacacggat  807
ggtctaaa                                                          815
```

<210> SEQ ID NO 40
<211> LENGTH: 119
<212> TYPE: PRT
<213> ORGANISM: Zea mays

<400> SEQUENCE: 40

```
Met Ala Leu Glu Ala Ala Thr Ala Pro Arg Ala Leu Leu Ala Ala Cys
1               5                   10                  15

Leu Val Leu Leu Val Leu Gly Gly Gly Thr Gly Pro Ser Ser Val Leu
            20                  25                  30

Arg Gly Ala Gly Val Gln Ala Gly Gly Gln Cys Leu Pro Gln Leu Asn
        35                  40                  45

Arg Leu Leu Ala Cys Arg Ala Tyr Leu Val Pro Gly Ala Pro Asp Pro
    50                  55                  60

Ser Ala Asp Cys Cys Ser Ala Leu Ser Ala Val Ser His Glu Cys Ala
65                  70                  75                  80

Cys Ser Thr Met Gly Ile Ile Asn Ser Leu Pro Gly Arg Cys His Leu
                85                  90                  95

Ala Gln Ala Asn Cys Cys Lys Leu Val Ala Arg Pro Gln Arg Leu Arg
            100                 105                 110

Leu Phe Ile Ser Val Leu Cys
        115
```